United States Patent [19]

Kaiser et al.

[11] Patent Number: 4,527,247

[45] Date of Patent: Jul. 2, 1985

[54] ENVIRONMENTAL CONTROL SYSTEM

[75] Inventors: Fredrick P. Kaiser, Orange; Theodore R. Lapp, Mission Viejo, both of Calif.

[73] Assignee: IBG International, Inc., Prairie View, Ill.

[21] Appl. No.: 621,884

[22] Filed: Jun. 19, 1984

Related U.S. Application Data

[63] Continuation of Ser. No. 288,740, Jul. 31, 1981, abandoned.

[51] Int. Cl.[3] .......... G06F 15/46; H04Q 11/00

[52] U.S. Cl. .......... 364/550; 364/557; 364/506; 364/514; 364/900; 340/870.03; 340/310 A

[58] Field of Search .......... 364/131, 132, 138, 418, 364/493, 506, 557, 514, 550, 551, 900; 340/310 A, 310 CP, 310 R, 870.03, 870.11; 165/22; 98/116; 236/49, 51; 318/603, 64

[56] References Cited

U.S. PATENT DOCUMENTS

| | | | |
|---|---|---|---|
| 1,888,555 | 11/1932 | Hund . | |
| 2,457,607 | 12/1948 | Seymour | 171/97 |
| 2,479,243 | 8/1949 | Larsen | 236/49 |
| 2,494,873 | 1/1950 | Hall | 171/97 |
| 2,580,539 | 1/1952 | Goodwin | 177/352 |
| 2,812,141 | 11/1957 | Sueda | 236/49 X |
| 2,860,324 | 11/1958 | Berger et al. | 340/310 |
| 2,962,702 | 11/1960 | Derr et al. | 340/180 |
| 3,063,195 | 11/1962 | Ravich | 47/17 |
| 3,067,405 | 12/1962 | Hurlimann et al. | 340/164 |
| 3,121,859 | 2/1964 | Furniss | 340/150 |
| 3,124,903 | 3/1964 | Truhan | 47/17 |
| 3,181,791 | 5/1965 | Axelrod | 236/44 |
| 3,233,146 | 2/1966 | Vacha | 315/97 |
| 3,234,543 | 2/1966 | Thompson et al. | 340/345 |
| 3,338,519 | 8/1967 | Kreuter et al. | 237/8 |
| 3,388,863 | 6/1968 | Andersen et al. | 236/44 |
| 3,400,374 | 9/1968 | Schumann | 340/172.5 |
| 3,445,814 | 5/1969 | Spalti | 340/151 |
| 3,450,192 | 6/1969 | Hay | 165/1 |
| 3,450,194 | 6/1969 | Barthel | 165/18 |
| 3,460,121 | 8/1969 | Wattenburg | 340/310 CP X |
| 3,462,756 | 8/1969 | Mills | 340/310 |
| 3,478,817 | 11/1969 | Shaw | 165/21 |
| 3,481,073 | 12/1969 | Yoshida et al. | 47/17 |
| 3,483,546 | 12/1969 | Ausfeld | 340/310 |
| 3,508,243 | 4/1970 | Nyfeler et al. | 340/310 |
| 3,509,537 | 4/1970 | Haberly | 340/163 |
| 3,540,030 | 11/1970 | Hartz | 340/310 |
| 3,594,584 | 7/1971 | Woods | 307/3 |
| 3,613,092 | 10/1971 | Schumann et al. | 340/413 |
| 3,644,891 | 2/1972 | McCrea | 340/147 |
| 3,644,897 | 2/1972 | McCrea et al. | 340/172.5 |
| 3,673,733 | 6/1972 | Allen | 47/58 |
| 3,683,343 | 8/1972 | Feldman et al. | 340/178 |

(List continued on next page.)

OTHER PUBLICATIONS

McArthur, N., Wingfield, A. J., Witten, I. H., "The Intelligent Plug", *Wireless World*, vol. 85, No. 1528, (Dec. 1979), pp. 46-51.

*Primary Examiner*—Edward J. Wise
*Attorney, Agent, or Firm*—Fitch, Even, Tabin & Flannery

[57] ABSTRACT

An environmental control system for use in greenhouses or other structures requiring the control of a temperature regulating element in response to sensed temperatures. The environmental control system includes a plurality of sensor elements and actuator elements comprising peripheral control elements each of which communicate bidirectionally with individual communication interface units. A central control processor bidirectionally communicates with another communication interface unit. All of the interface units bidirectionally communicate with each other over fixed AC power lines by frequency shift keying the information onto and from the lines. The control processor receives operator inputs which cause it to assign time slots to different peripheral control elements to configure the system whereby each peripheral control element can be interrogated by addressing it during its time slot. In response to an interrogation, a sensor replies with data corresponding to a sensed parameter while an actuator replies with an acknowledgement and awaits control commands. A unique framing character is generated at the beginning of each time slot for alerting all peripheral elements that the next character generated will be an element address and for synchronizing multiple control processors to an identical time slot clock.

39 Claims, 25 Drawing Figures

U.S. PATENT DOCUMENTS 3,702,460 11/1972 Blose .......... 340/150
3,710,373 1/1973 Watanabe et al. .......... 340/310
3,721,830 3/1973 Oishi et al. .......... 307/3
3,746,080 7/1973 Mallory .......... 165/20
3,747,501 7/1973 Honda et al. .......... 98/33
3,801,008 4/1974 Wenger .......... 236/46
3,807,088 4/1974 Jones .......... 47/1.2
3,815,814 6/1974 Burgess .......... 236/44
3,826,963 7/1974 Lorenz .......... 236/49 X
3,840,176 10/1974 Baysinger .......... 236/44
3,870,873 3/1975 Mallory .......... 240/1.1
3,913,344 10/1975 Holloway et al. .......... 62/176
3,914,677 10/1975 MacWade .......... 318/640 X
3,933,197 1/1976 Zimmer et al. .......... 165/2
3,949,607 4/1976 Nodolf .......... 73/336
3,951,625 4/1976 Follette .......... 55/232
3,999,329 12/1976 Brais .......... 47/17
4,003,160 1/1977 Miller .......... 47/58
4,020,358 4/1977 Wyland .......... 307/39
4,028,847 6/1977 Davis et al. .......... 47/65
4,044,823 9/1977 Biesecker .......... 165/16
4,055,113 10/1977 Monroe .......... 98/116 X
4,073,089 2/1978 Maginnes et al. .......... 47/17
4,077,158 3/1978 Clarke .......... 47/59
4,078,721 3/1978 Okuhara .......... 236/49
4,090,248 5/1978 Swanson et al. .......... 364/900
4,094,166 6/1978 Jeries .......... 62/158
4,113,175 9/1978 Sutton, Jr. .......... 236/46
4,123,796 10/1981 Shih .......... 364/900
4,136,732 1/1979 Demaray et al. .......... 165/16
4,146,993 4/1979 Freeman, Sr. .......... 47/17
4,147,002 4/1979 Kautz .......... 52/306
4,156,194 5/1979 Mueller .......... 340/310 A X
4,161,660 7/1979 Gallant .......... 307/118
4,162,486 7/1979 Wyler .......... 340/310 CP X
4,163,342 9/1979 Fogg et al. .......... 47/58
4,166,339 9/1979 Heller et al. .......... 47/17
4,174,517 11/1979 Mandel .......... 340/310 CP X
4,186,873 2/1980 Geisler .......... 340/310 A X
4,189,094 2/1980 Robinson .......... 236/46
4,196,544 4/1980 Davis et al. .......... 47/17
4,197,991 4/1980 D'Amato .......... 236/44
4,200,910 4/1980 Hall .......... 364/104
4,205,381 5/1980 Games et al. .......... 364/505
4,217,646 8/1980 Caltagirone .......... 340/310 R X
4,222,035 9/1980 Lohoff .......... 340/167
4,232,531 11/1980 Mangam, Jr. .......... 62/171
4,234,926 11/1980 Wallace .......... 364/131 X
4,253,153 2/1981 Bitterli et al. .......... 364/505
4,293,846 10/1981 Allison .......... 340/310
4,294,404 10/1981 Gajjar .......... 236/49
4,332,013 5/1982 Chelcun .......... 364/418 X
4,338,556 7/1982 Hetzel .......... 318/640 X
4,350,286 9/1982 Suton .......... 236/49 X 210
U1, PIN27
U1, PIN28
U1, PIN29
U1, PIN30
U1, PIN31
U1, PIN32
U1, PIN33
U1, PIN34

220
221
222
U8
U9
+Vc
CLK
TO U1, PIN35
DATA 2
TO U1, PIN 17
DATA 1
TO U1, PIN 36
ENABLE
TO U1, PIN 34

1240
1243
1247
1244
1248
1241
1242
1246
1295
1297
1298
F.O. SWITCH
F.C SWITCH
1296
1280
1281
1282
1283
1284
1285
1270
7474
460A
460B
1261
1252
1250
1251
MOTOR
1214
VOLT-AGE REG.
460C
1230
SOLID STATE RELAY
COMPUTE TO MCI
INTEGRATOR
FULL WAVE RECTIFIER
1220
1210
1212
POWER SUPPLY
450
1260
1290
1291
465D RACK TOOTH INDICATION
RACK TOOTH SENSOR
FORWARD
REVERSE
Vc+
Vc

ENVIRONMENTAL CONTROL SYSTEM

This application is a continuation of application Ser. No. 288,740 filed July 31, 1981 now abandoned.

BACKGROUND OF THE INVENTION

The invention relates to an environmental control system and, more particularly, to an environmental control system for use in greenhouses or the like and preferably utilizing existing power transmission lines for communication among elements of the control system.

Control of the temperature, humidity and the other measurements in a greenhouse or the like to permit the control of the environment therein can necessitate monitoring and controlling numerous sensing and control devices at various locations within the building being environmentally controlled. Due to the large number of measurements and functions that are needed to be performed, computer based or computer compatible systems have been used to centrally control the monitoring and operating functions of an environmental control system, such as in a large building.

With the advent of complex systems of environmental control a great need has evolved for monitoring systems capable of monitoring a myriad of points with respect to conditions which must be continuously observed in order to assure proper and safe operation. Similarly, alarm conditions at the points must be immediately discovered and corrected, thus requiring systems that are capable of indicating alarm conditions as well as scanning the points.

Due to the great number of remote field points that must be monitored, conventional monitoring systems utilize a control center as a receiving and sending station for monitoring the remote points which generally are scattered over great distances. Some conventional systems utilize pulse width modulation or frequency modulation to address and monitor the field points; however, these systems are extremely complex and expensive and are desirable only where extremely great distances are involved or in underdeveloped or inaccessible locations where the use of cable wires is impractical.

For environmental control in a building or complex of buildings pulse width modulation and frequency modulation systems are impractical, and systems for such application are generally based on the matrix concept as can be seen from U.S. Pat. No. 3,300,759. While the use of matrices and binary coded addresses for field points does reduce the number of wires required below the nunber of wires required for each point to be individually connected to the control central, the reduction in the number of wires is not as great as is desirable, and the number of wires required is dependent upon the number of points monitored thereby decreasing sysem flexibility. These conventional systems suffer from the disadvantages of difficult installation due to the different addresses associated with each field location and difficult system modification once the system has been installed as well as high cost of wiring. That is, each field location must be designed for a specific address thereby increasing inventory and installation time; and, if at any time additional field locations are desired to expand the system beyond the original design, additional wires are required to be installed.

Systems have been devised for reducing the number of dedicated communications wires resquired, such as shown in U.S. Pat. No. 3,613,092, but still suffer from the cost, time, and reliability disadvantages of requiring dedicated custom installed communications wiring.

Greenhouses provide weather protection for tender plants. Cultivation of the plants requires the atmosphere within the greenhouse to be maintained at a selected temperature and humidity level. Factors affecting the greenhouse atmosphere include heat gains and heat losses. For example, during long periods of sun exposure, abnormal amounts of solar energy enter the greenhouse which tends to raise the temperature.

Logical control of greenhouse environmental conditions has heretofore utilized, for example, 24 volt control systems with relays and solenoids individually wired together and strung out, or a computer based equivalent system (such as a programmable controller) with dedicated wires for communication and control strung out and wired among all control points and sensors. These systems have proved less than adequate in terms of cost, time for installation, each of maintenance, repair, and update of equipment. Additionally, communication among elements of the environmental control system has been restricted to dedicated control and communications custom wiring. Thus, expansions required a new wiring installation or modification requires a rewiring of the system.

A significant disadvantage of many prior systems involved the system reliability and maintainability, in that a breakdown in one part of the system could effectively shut down other parts of the system. Thus, to increase reliability, redundant or backup equipment was often necessitated.

SUMMARY OF THE INVENTION

Accordingly, a general object of the invention is to provide a new and improved environmental control system which has general applicability to buildings of all kinds including but not limited to greenhouses.

A further object of the present invention to provide a control system not requiring dedicated independent wires for communication among elements of the control system.

Another object of the present invention is to permit expansion of an original control system without the necessity of running additional wires from a control center.

Another object of the present invention is to utilize similar communications interfaces at each field point to reduce inventory.

It is a further object of the present invention to provide an improved environmental control system especially suited for use in a greenhouse which provides for bidirectional communications between a central controller and peripheral elements of an environmental control system utilizing existing AC power transmission line wiring.

BRIEF DESCRIPTION OF THE DRAWINGS

Other objects and advantages will become apparent upon reading the following detailed description while referring to the attached drawings, in which:

FIGS. 13A-13C are detailed electrical schematic diagrams of a modular communications interface control processor hardware system, such as that of FIGS. 1 and 2, additionally illustrating the electronics for the outdoor and indoor aspirators;

BRIEF DESCRIPTION OF THE SOFTWARE LISTINGS

A software listing of the program for the Modular Communication Interface Control Processor is located at pgs. 61-82; and A software listing of the program for the Central Control Processor illustrating the vent control embodiment is located at pgs. 83-178.

DETAILED DESCRIPTION OF THE PREFERRED EMBODIMENTS

Figure 1:
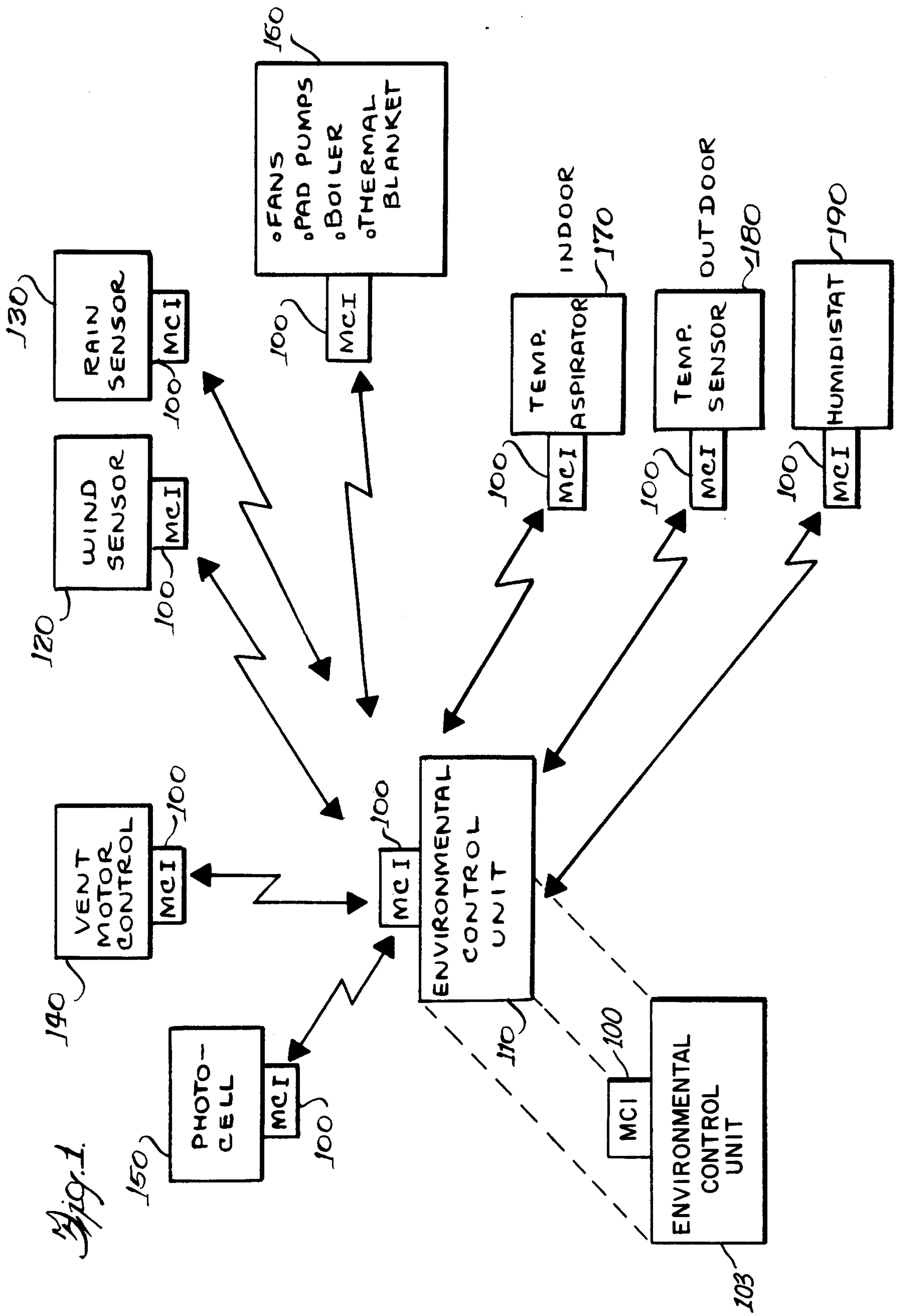
FIG. 1 is a block diagram of a system embodying the present invention.

Referring now to the drawings, and particularly to FIG. 1, a system embodiment of the present invention is shown. A plurality of modular communications interface (MCI) means 100 are coupled preferably to an AC power transmission line, and are additionally coupled individually to an environmental control unit 110 and to respective peripheral control means, elements 120, 130, 140, 150, 160, 170, 180 and 190. The modular communications interface means 100 provides for bidirectional data communications among the environmental control unit 110 and peripheral control means preferably over existing power transmission lines. Thus, address, command, and data signals can be intercoupled between elements of the system utilizing existing power wiring without necessitating special dedicated communications wiring. The peripheral control elements can be of many types. For example in an environmental control system, the peripheral control elements may be sensors, such as wind sensor 120, rain sensor 130, photocell sensor 150, temperature aspirator (sensor) 170, temperature sensor 180, and humidistat 190. Each of these peripheral control element sensors is individually addressable, and is responsive to a predefined address as received via the respective associated modular communications interface means. When a proper address signal is received and decoded by the peripheral control element, and a proper command is received, the respective sensor provides a sensor output signal in accordance with its functionality. These sensors can detect not only absolutes (e.g. presence or absence), but can also detect relative values (e.g. values above a predefined threshold) in accordance with the system definition and configuration. Other types of peripheral control elements include vent motor control means 140 which provides control of speed and direction of vent movement, single speed fan controllers, dual speed fan controllers, single and dual function low voltage control systems, boiler control means, heat and humidity controllers, etc., as shown by functional block 160 of FIG. 1. For controlling environments in structures other than greenhouses, the peripheral control elements may vary in terminology and in function from that described herein and still fall within the purview of this invention. Likewise, it is possible to use radio frequency communication or dedicated lines rather than the power transmission lines and still use many of the claimed features of the present invention as will become apparent hereinafter from reading the description of the invention and a reading of the appended claims.

Figure 2:
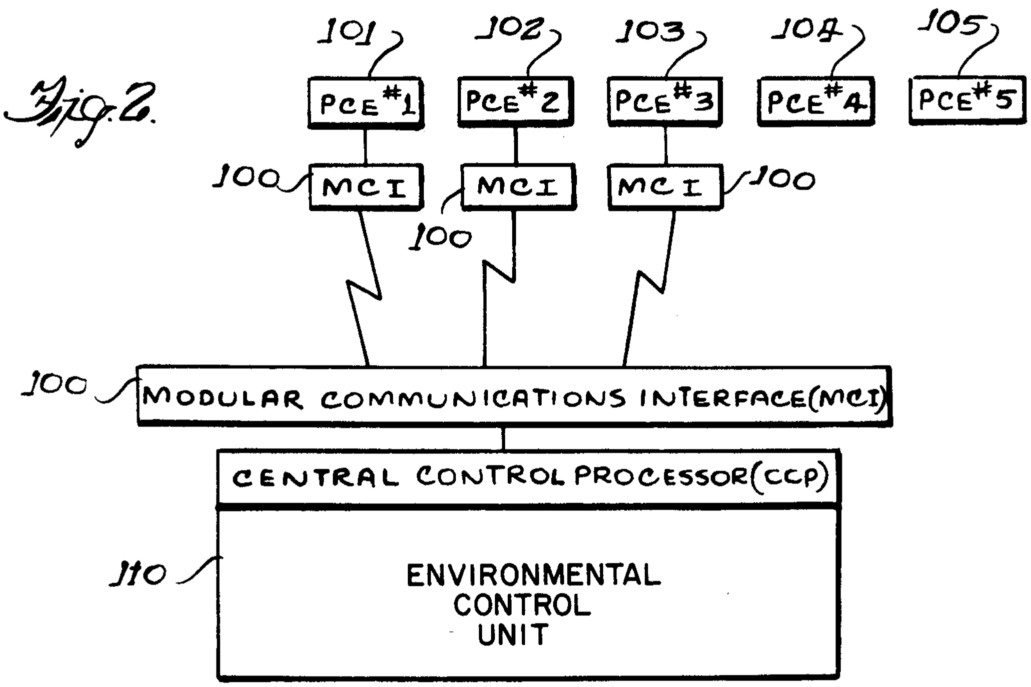
FIG. 2 is a system block diagram of an alternate embodiment of the present invention.

Referring to FIG. 2, an alternate embodiment of the invention illustrating a programmable environmental control system is shown. An environmental control unit or central control processor 110 is coupled to an associated modular communications interface means 100 which provides for bidirectional communication between he processor 110 and selected peripheral control elements 101, 102, and 103, over existing power transmission lines via respective other modular communications interface means 100. Thus, the central control processor 110 can communicate with peripheral control elements 101, 102, and 103, via the modular control interface means 100 associated (independently) with each of the peripheral control elements and with the central control processor, over existing AC power transmission lines. Additionally, some peripheral control elements may perform functions offline, and thus do not require communications with the central control processor 110. These peripheral control elements thus do not require a modular communications interface 100 to be associated with them. Programmable control elements 104 and 105 illustrate off network peripheral control elements.

In this illustrated embodiment, the environmental control unit 110 performs a number of functions. First, it provides a central control processor (CCP) comprising a central processing unit, and memory, coupled to input means such as a keyboard and/or switches, and coupled to a display means, such as a cathode-ray tube video display or a printer. Additionally, nonvolatile magnetic storage can be provided such as by disc tape, bubble memory, etc. The central control processor of the environmental control unit 110 in accordance with stored program instructions, user input data, command sequences, set points, and threshold values, performs the functions of system configuration control, task sequencing for control of the PCES, communications linkage and protocol, system diagnostics, user interface, and storage and archiving.

Figure 7:
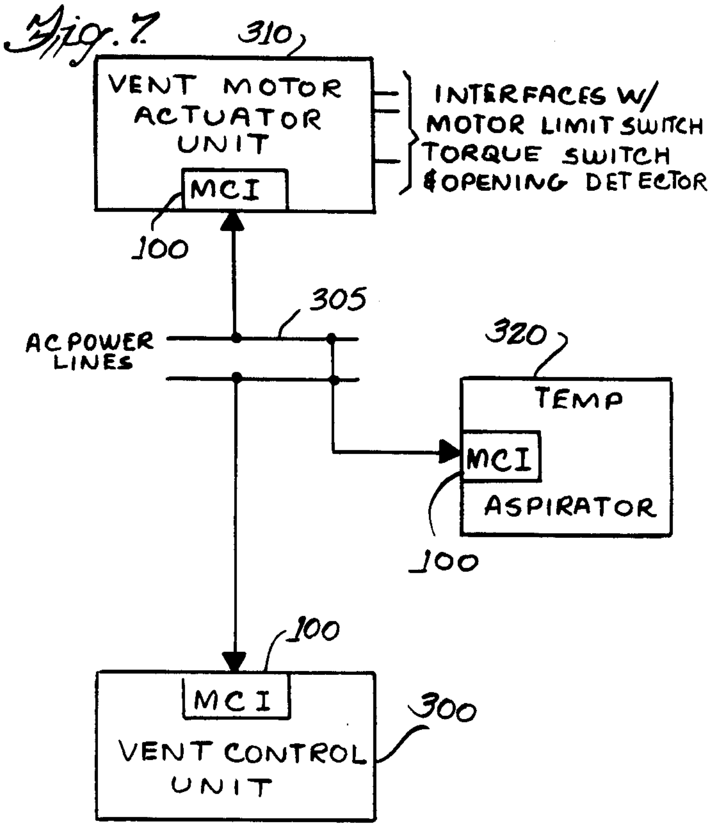
FIG. 7 is a block diagram of a vent control system embodiment of the present invention, illustrating a stand alone vent control system.

In another implementation vent controller unit may be utilized as the environmental control unit in conjunction with a vent motor actuator means emboding a PCE to provide for a stand alone vent, control system, as discussed with reference to FIGS. 7–9, hereinafter. A software listing of one embodiment of a vent control unit is included after the detailed description as pages 84–180. The modular communications interface means 100 may be comprised of a stand alone system, packaged on a single printed circuit card, or may be combined with sensing and control functions in a single system.

Figure 3:
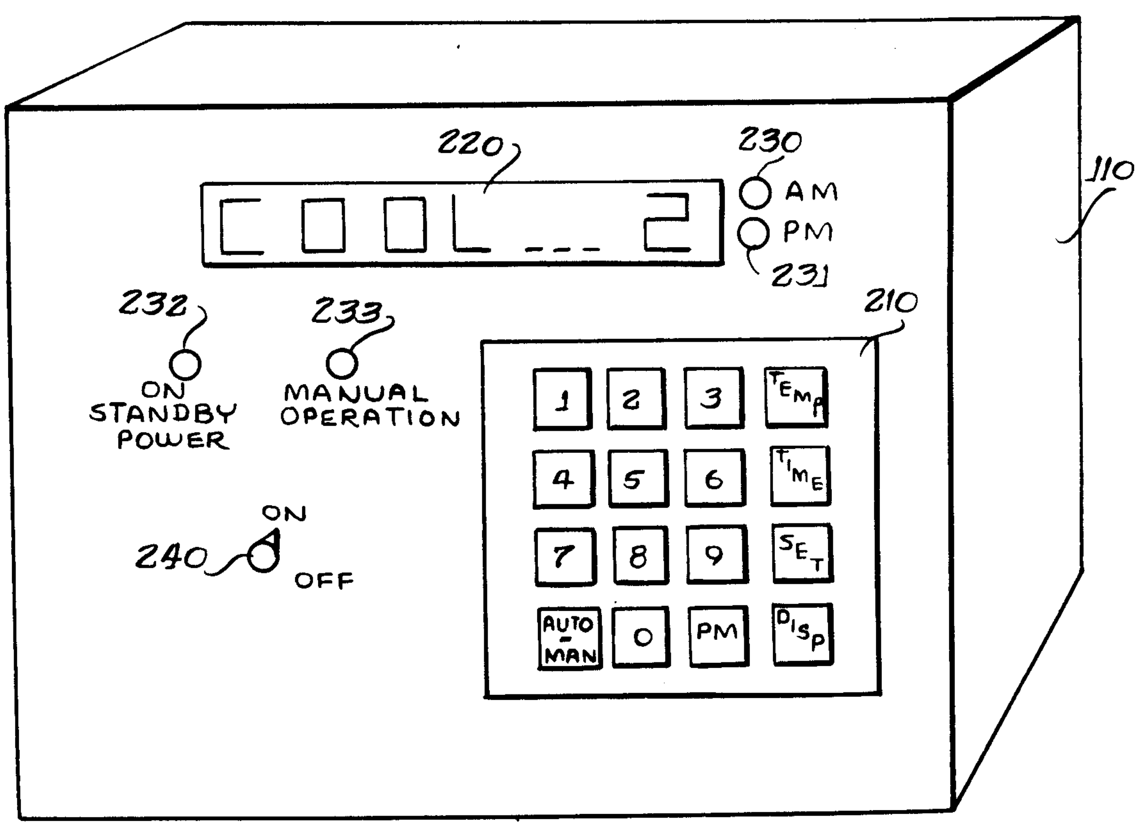
FIG. 3 is a front perspective view of a user interface and environmental control unit embodiment of the present invention.

Referring to FIG. 3, an illustrative embodiment of the housing and front panel of an environmental control unit 110, as discussed with reference to FIGS. 1 and 2, is shown. The front panel is comprised of a keyboard 210, which contains keys which allow user input of numerics (0–9), and function specification (e.g. temperature, time, set, displacement, AM, PM, and auto or manual). The user enters appropriate data via the keyboad 210 for utilization by the central control processor of the environmental control unit 110. A master on/off switch 240 is provided to allow user control of system status. Display is provided on the front panel by means of alphanumeric display means 220, such as 7, 9, 11, or 13 segment LED, LCD, electrochrometic, vacuum fluorescent, etc. display means. Additionally, individual point light displays, such as light emitting diodes, can be used to indicate AM, 230, PM, 231, manual operational mode 233, and standby power, 232. Alternatively, other combinations of number and type digit displays, individual point displays, and number and function keys within the keyboard 210 can be provided according to the system requirements and user needs. Alternatively, other input means may be provided, such as a typewriter style keyboard, or a plurality of switches, or other appropriate means.

Figure 4A:
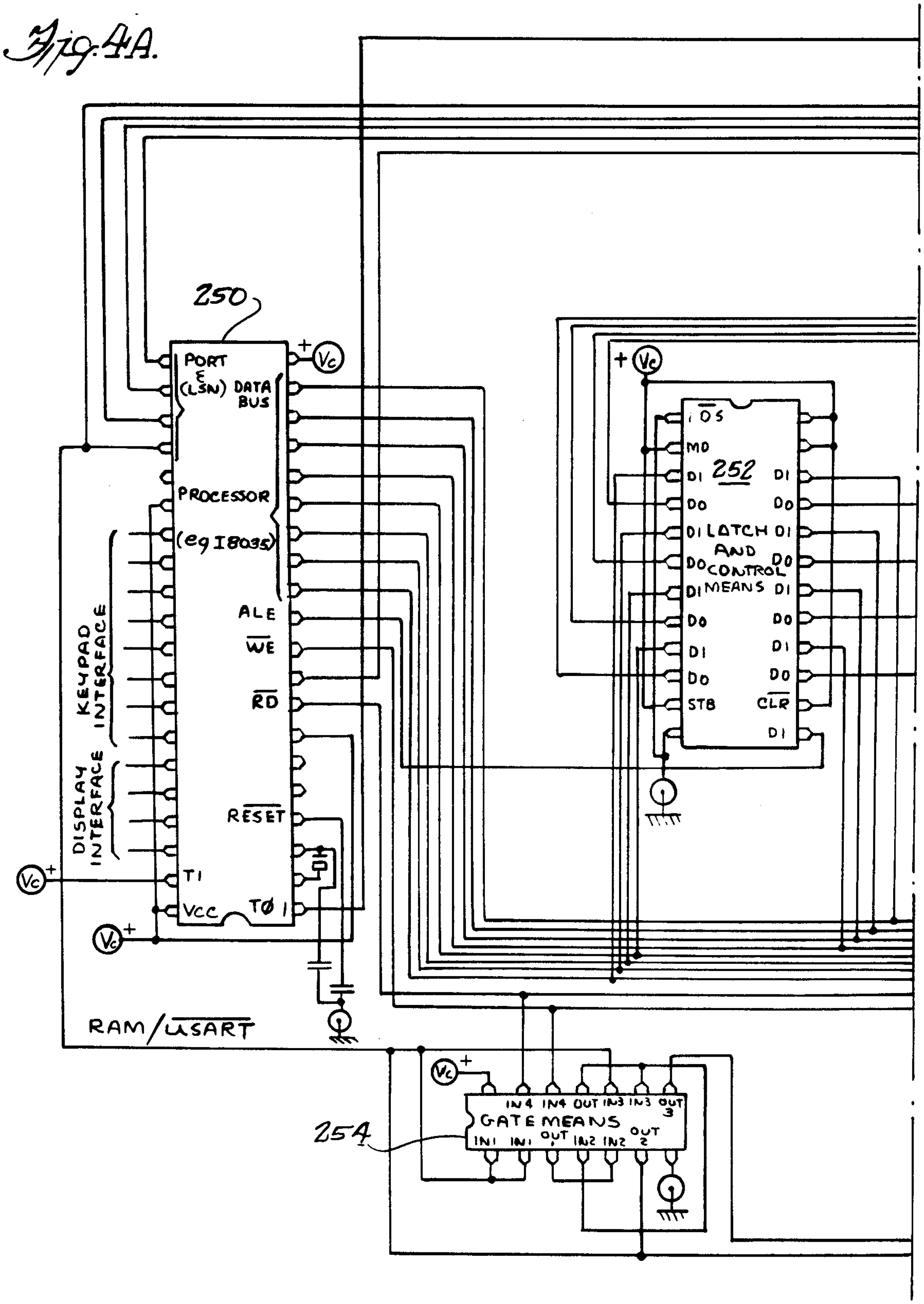
FIGS. 4A-4C are detailed schematic drawings of the electronic circuitry comprising the digital electronics of the environmental control unit of FIG. 3.
Figure 4B:
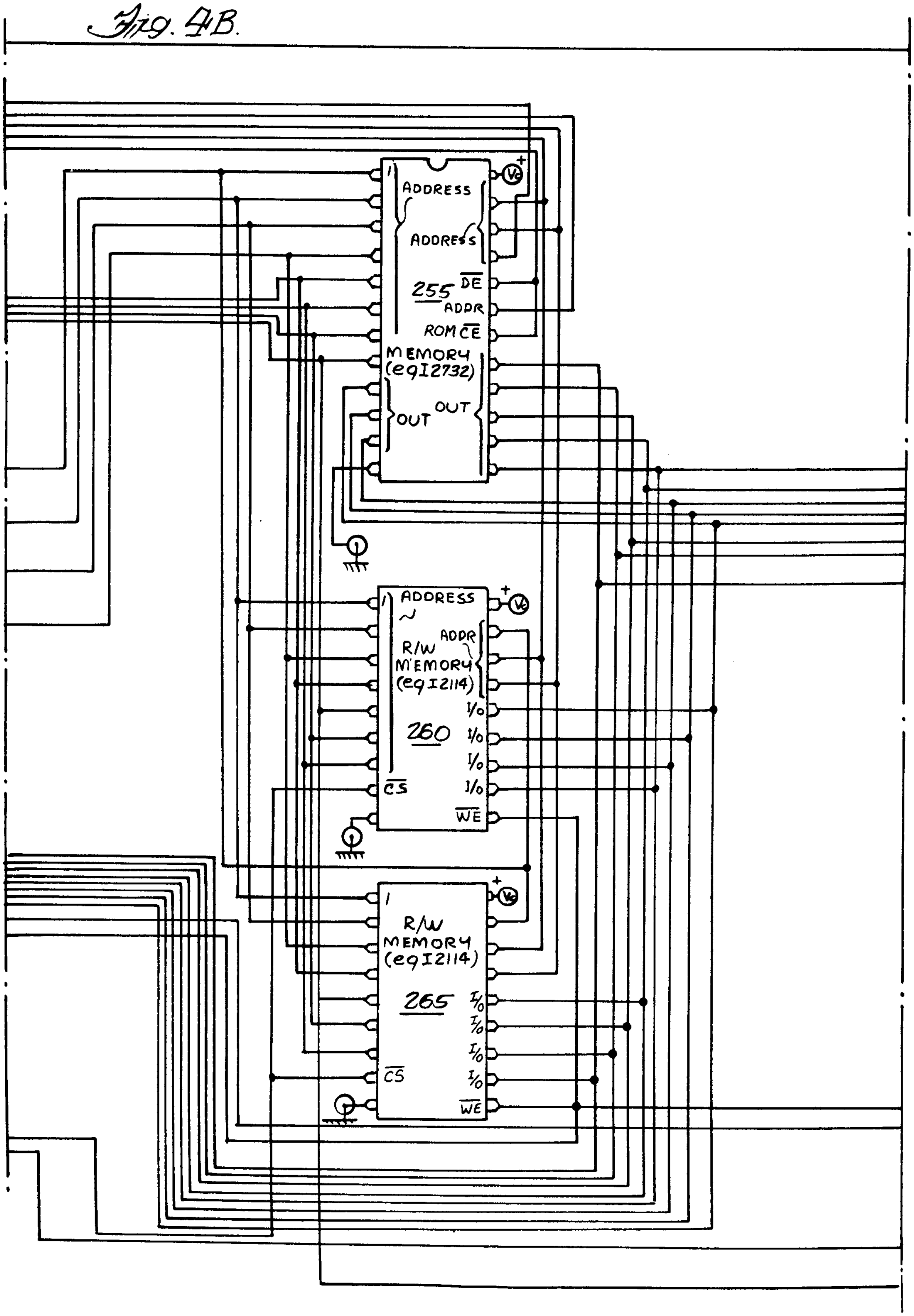
Figure 4C:
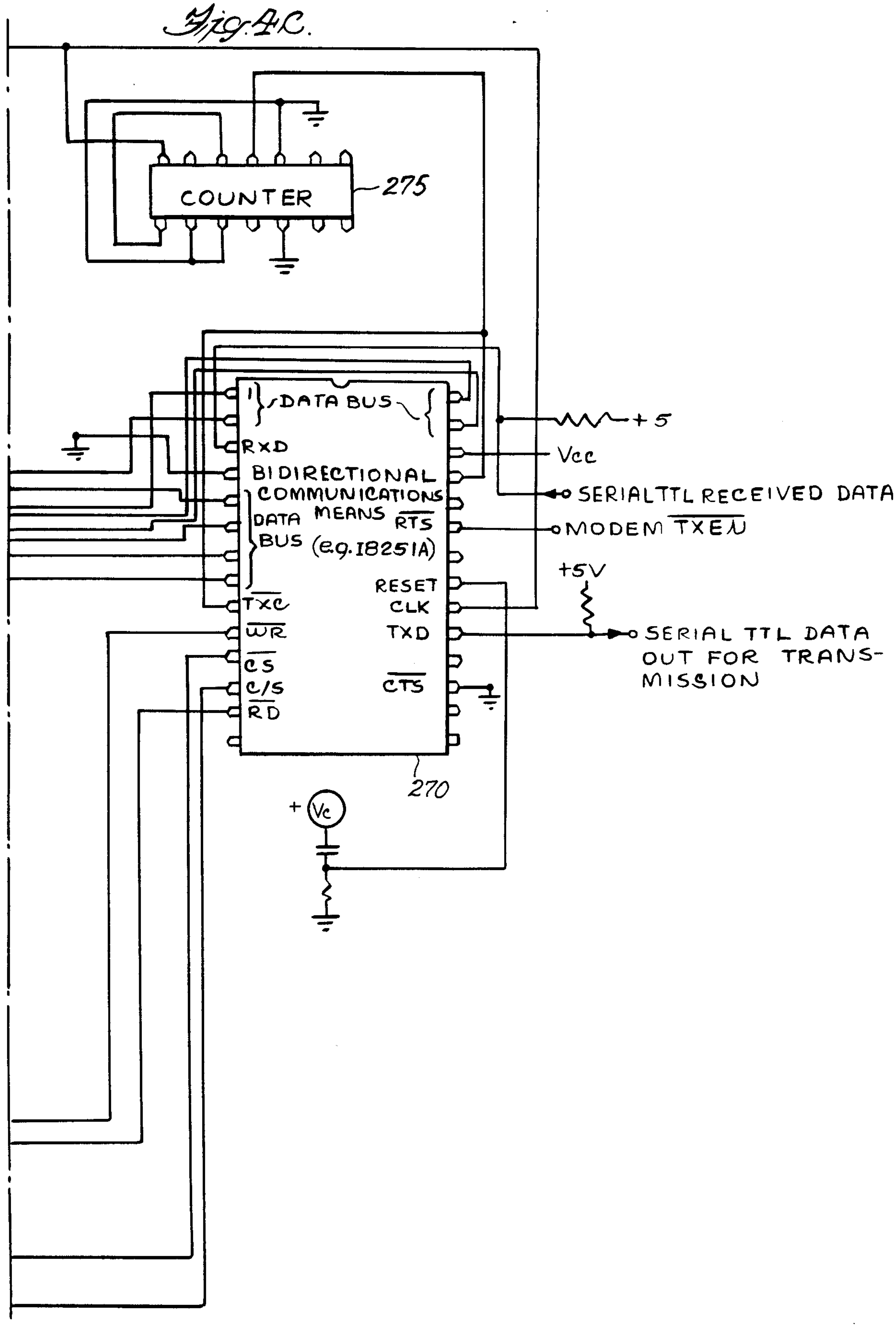

Referring to FIGS. 4*a–c*, an electrical schematic diagram is provided illustrating the electronics contained within the embodiment of FIG. 3. A central processing unit 250 performs keyboard, switch, and display interface functions in accordance with stored program instructions as output from memory 255 (nonvolatile ROM in the illustrated embodiment) and in accordance with stored data signals from read write memories 260 and 265. In the illustrated embodiment, an Intel 8035 microprocessor is utilized. This processor has a multiplexed address and data busses, and therefore requires the utilization of a latch 252 to prolong address signed outputs after multiplexing occurs to place the data signals on the multiplexed bus. Alternatively, the processor 250 and latch 252 may be replaced by other types of central processing units, either with or without external memory so as to obviate the need for the latch 252, EPROM 255, and RAMS 260 and 265. Alternatively, other types of discrete logic or microprocessor based systems may be used requiring different combinations of read-write memory and read only memory. Logic circuit 254, a 74LSOO quad NAND gate in the illustrated embodiment, provides device select functions for differentiating between addressing of the read-write memories 260 and 265, the read only memory 255, and a Universal-Synchronous-Asynchronous-Receiver-Transmitter (USART) 270. In the illustrated embodiment, the USART 270 is an Intel 8251A integrated circuit. Alternatively, other types of receiver-transmitter systems can be utilized, such as a UART (Universal-Asynchronous-Receiver-Transmitter) or this function may be included as a programmed function performed by the microprocessor 250. A counter 275 divides the master clock frequency as output from the microprocessor 250 to a compatible clock frequency for use with transmission and reception of data via USART 270. Programmed functions which are performed by the processor 250 in conjunction with stored instructions and user input data can include system configuration control, task sequencing for controlling the PCEs, communications linkage and protocol, user interface, diagnostics, archiving, and other features and functions as desired or needed.

Figures 5, 6:
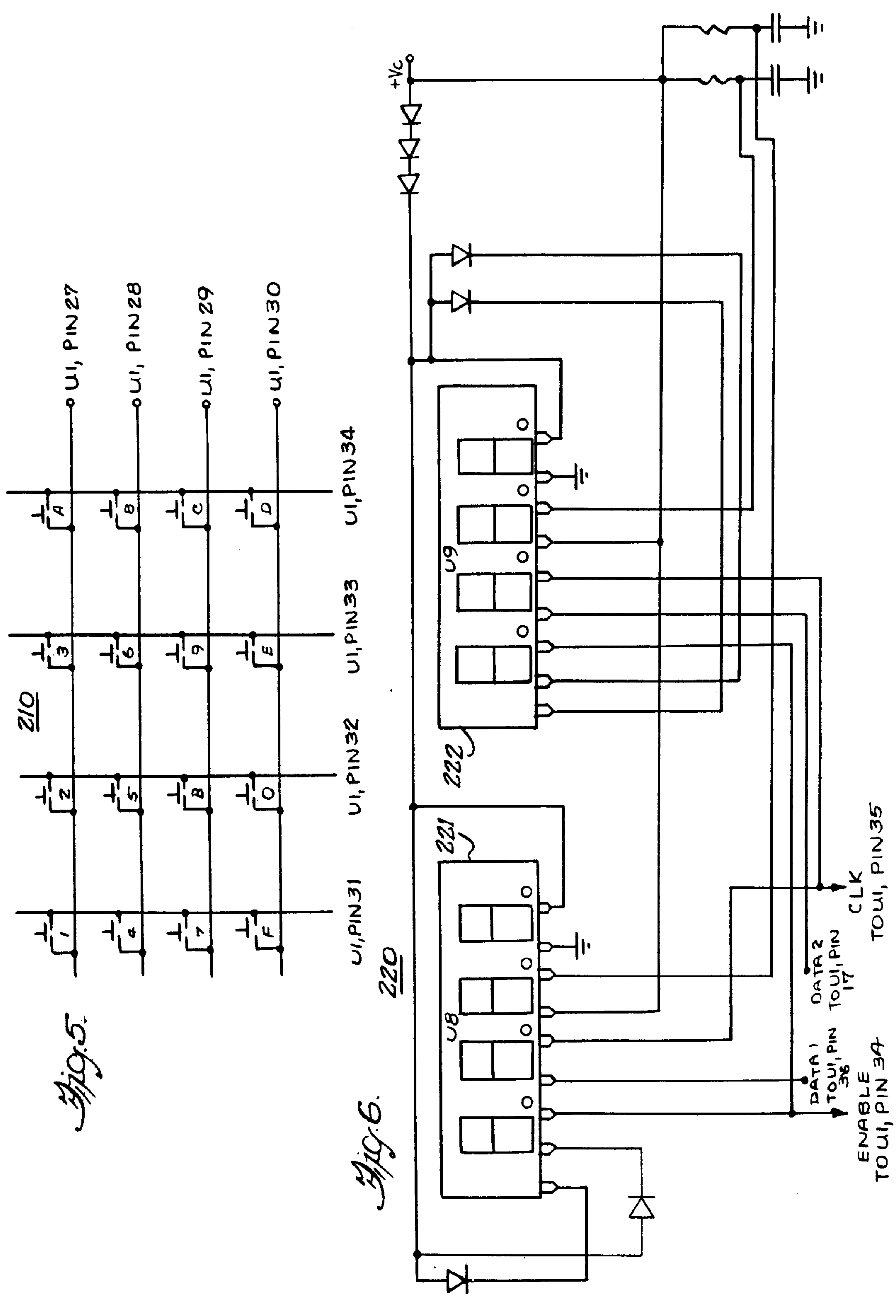
FIG. 5 is a schematic of the keyboad of the environmental control unit of FIG. 3 illustrating the interconnect to the electronics of FIGS. 4A-4C.
FIG. 6 is an electrical schematic diagram of the display of the electronic control unit of FIG. 3, illustrating the interconnect to the electronic circuitry of FIGS. 4A-4C.

Referring to FIG. 5, a detailed schematic of the keyboard 210 of FIG. 3 is shown. The intercoupling of the keyboard 210 to central processing unit 250 is shown, illustrating the correlation of pin assignments from matrix wires of the keyboard matrix 210 to the corresponding pins of the microprocessor 250.

Referring to FIG. 6, the display 220 of FIG. 3 is shown in electrical schematic form. The intercoupling of the display 220 to the microprocessor 250 is shown, illustrating the correlation of pin numbers of the display subelements 221 and 222 to the pin coupling designations of the microprocessor 250 (designated integrated circuit U1).

The environmental control unit 110 has the capability of separately addressing a plurality of remote peripheral control elements via the modular communication interface means 100. In the illustrated embodiments of FIGS. 4–6, the environmental control unit can separately address 128 remote elements via modular communications interface means 100. This capability can be easily expanded by proper selection of microprocessor and memory. Utilizing the embodiment illustrated in FIGS. 4–6, the environmental control unit can address up to 512 remote modular communications interface means 100. In the illustrated embodiment, the remote modular communications interface means 100 (MCI) are petitioned into 28 sensor units and 100 controller units. However, other partitions can be chosen and configured. The illustrated environmental control unit (ECU) senses and controls functions within a single zone. However, the environmental control unit may alternatively sense and control functions and values in a plurality of zones. When a plurality of zones are being monitored and controlled, a separate point light display (LED) can be used to denote which zone the currently displayed data represents. Heating, cooling, and set point stages are programmed in accordance with keyboard entries. A stage is a type of operation based on the status of sensors and the current operational mode of the system. Each stage represents a priority level of operational protocol for the system, and is utilized in selecting and implementing task scheduling. The number of stages which the system can handle is flexible, according to user definition. The illustrated embodiment of FIGS. 4–6 provide a maximum of 9 stages. However, with appropriate selection of central processing unit and memory, a greater number of stages can be utilized. The temperature thresholds for each stage are entered via the keyboard. Additionally, addresses for each remote peripheral control element (equipment) to be controlled during each stage is entered via the keyboard. Temperature thresholds, including set point values, can be entered in either Fahrenheit or Celsius denominations.

A number of additional functions can be performed by the environmental control unit. An outdoor temperature override senses the outside temperature and causes changes in the indoor temperature/stage relationships to be effected by external temperature changes. Also, the temperature hysteresis associated with each stage transition can be taken into account as a processor function (in the processor software). In the illustrated embodiments of FIGS. 4–6, the temperature hysteresis is equal to one degree Fahrenheit. Other values of temperature hysteresis can be selected by means of appropriate processor software. Capability can be provided for manual override of preprogrammed functions, wherein the system operates completely under manual control from the keyboard 210. A dehumidification function can be selected by the user, and is programmed from the keyboard. The parameters to be entered can include the time to begin the cycle, the duration of the cycle, and states to occur simultaneously during the cycle. Where a humidistat is utilized, automatic dehumidification can be provided. For example, when the control sequence being performed under processor 250 control is at the appropriate set point stage, and the humidity exceeds the desired level as determined by the humidistat in accordance with user provider stored data, the environmental control unit switches the system to a dehumidifier stage. However, in the illustrated embodiment, temperature control will override the dehumidification process, as this is deemed generally a more critical factor in greenhouse environmental control. Equipment which is to remain idle when the system is operating under night conditions can be so specified when the system is initially programmed. Thus, the equipment to be locked out during a particular stage at night is specified from the keyboard by the operator. A photocell can be utilized to control the day/night points and corresponding temperature controlled stages of the system. Additionally, a time delay variable can be entered from the keyboard to take advantage of solar gain after dark, and to minimize the solar loss after daylight. Furthermore, a rain override function can be provided to protect against excessive rain entering the controlled environment through open vents. When rain crosses the rain sensing device, a signal is output to the processor which causes the temperature control to be overriden, resulting in the selective closing of the vents to a predetermined position. The vents are closed to the predetermined position only if the vents are open more than the predetermined position. The predetermined position may be specified (is programmable) via the keyboard 210. The system functions described herein can be added to, or deleted from, according to system needs. This may be done by appropriate selection of central processor, memories, remote sensors, and equipment, and by appropriately programming the processor system to selectively control equipment responsive to said sensors.

An important functional feature in greenhouse environmental control is vent control. A stand alone vent control system is shown in FIGS. 7–9. In the stand alone vent control system, a vent control unit 300 performs a subset of the functions and features performed by the environmental control unit as discussed above. Referring to FIG. 7, a stand alone vent control system is shown in block diagram form. A vent control unit 300 is coupled via a modular communications interface means 100 to a power transmission line 305. A temperature aspirator (temperature sensing means) 320 is coupled to an associated modular communications interface means 100 which is coupled to the power transmission line 305. Upon interrogation of the temperature aspirator 320 by the vent control unit 300, a digital word representing the current indoor temperature is transmitted from the temperature aspirator 320 via the modular communication interfaces 100 to the vent control unit 300. A vent motor actuator unit 310 is coupled to an associated modular communications interface means 100 which is coupled to the power transmission line 305. The vent motor actuator unit 310 interfaces with a vent motor (not shown), positional limit switches, torque overload sensor switches, and a vent opening detector. The vent control unit 300 transmits control signals via the modular communications interface means 100 to the vent motor actuator unit 310 responsive to the sensed temperature signal received from the temperature aspirator 320. The operation of the vent motor actuator unit is discussed in greater detail with reference to FIGS. 11–13. Referring to FIG. 8, an alternative embodiment of the stand alone vent control system is shown, differing from that of FIG. 7 in that the temperature aspirator (sensor) 320 is directly coupled to the vent control unit 300. Communications between the vent control unit 300 and motor actuator unit 310 is still accomplished via modular communications interfaces 100 and over the power transmission line 305.

Figure 8:
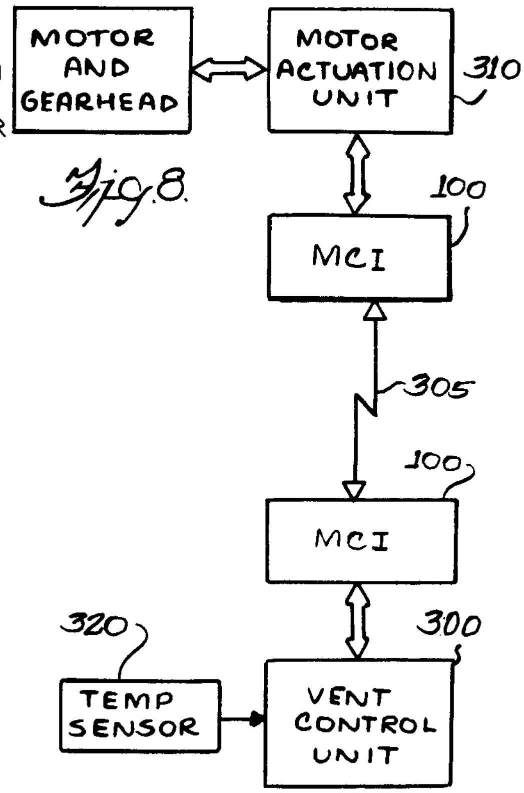
FIG. 8 is a block diagram of an alternate embodiment of the present invention illustrating an alternate stand alone vent control system.
Figure 9A:
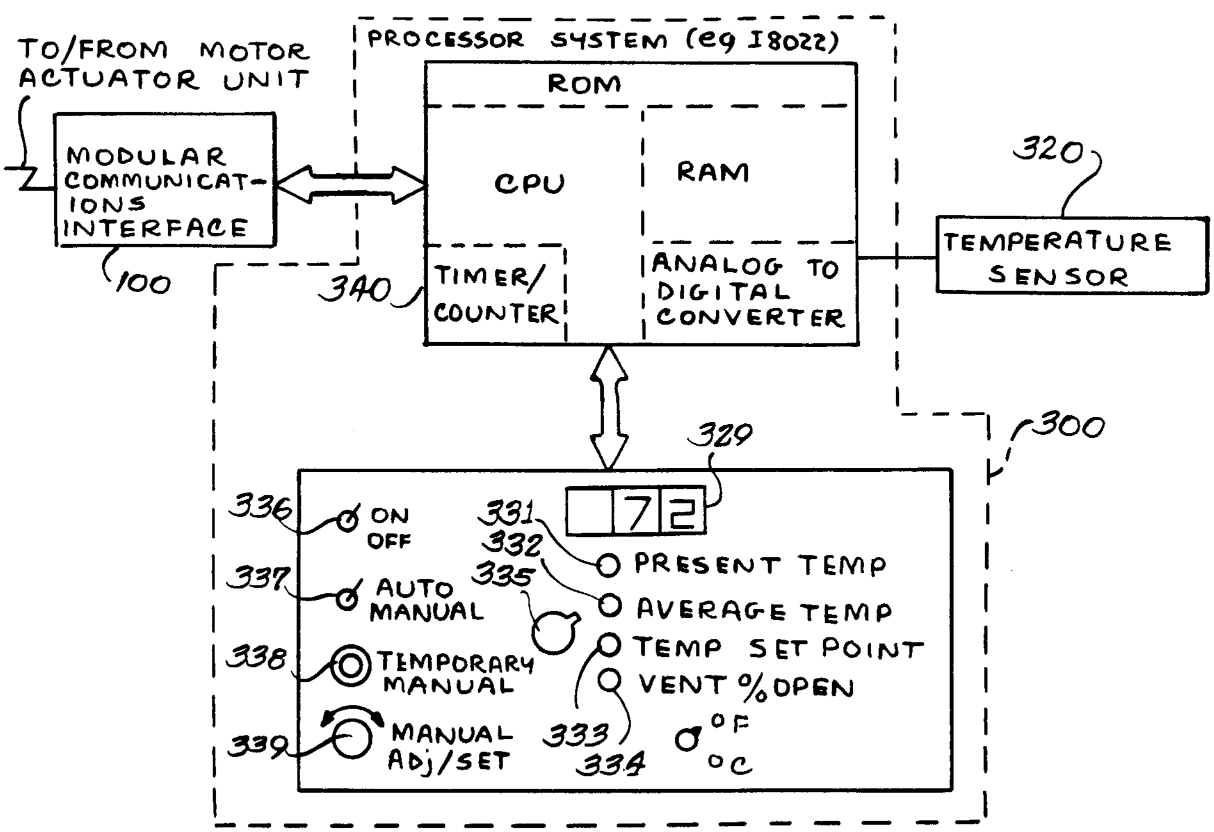
FIG. 9 is a functional block diagram illustrating the stand alone vent control system of FIG. 8 in more detailed block diagram form.

Referring to FIG. 9, a detailed block diagram of the stand alone vent control system of FIG. 8 is shown illustrating functional features of the system. The vent control unit 300 is shown with a front panel display and switches, including alphanumeric display 329, display indicator lights 331, 332, 333, and 334, selection switch 335, on/off switch 336, auto manual selection switch 337, manual temperature selection means 338, and manual adjust/set selector 339. The vent control unit 300 contains a processor and memory, an analog to digital converter, and a timer counter, as illustrated. In the illustrated embodiment of FIG. 9, all of these features are within a microcomputer such as an Intel 8022 microprocessor system. This microprocessor contains 2 kilobytes of ROM, 64 bytes of read-write memory, an analog to digital converter, a central processing unit, a timer and counter, and multiple input, output, address, and data ports. Alternatively, other processor means and memory means could be utilized, and external analog to digital converters and timer counters could be utilized, or may be included within the selected processor system. For example, the processor system discussed with reference to FIGS. 4 through 13 could be utilized. The motor control communications output from the processor 340 is coupled to a modular communications interface means 100 which may form an integral part of the vent controller unit 300 or may form a separate system to which the motor control outputs of the vent control unit are coupled. The modular communications interface 100 converts digital data to a form acceptable for communications over power transmission lines, and converts data received from power transmission lines back to digital data format for use by the digital system of the vent control unit and of the peripheral control elements. The temperature sensor 320 provides an analog signal, in the illustrated embodiment, which is coupled to the vent control unit 300, as shown in FIG. 8. The analog value output of a temperature sensor 320 is coupled to the analog to digital converter of the processor system 340, where the analog value is converted to a digital value for use by the processor system. Alternatively, the temperature sensor could provide a direct digital output, or the analog to digital converter could be a separate system from the processor subsystem 340.

Figure 10:
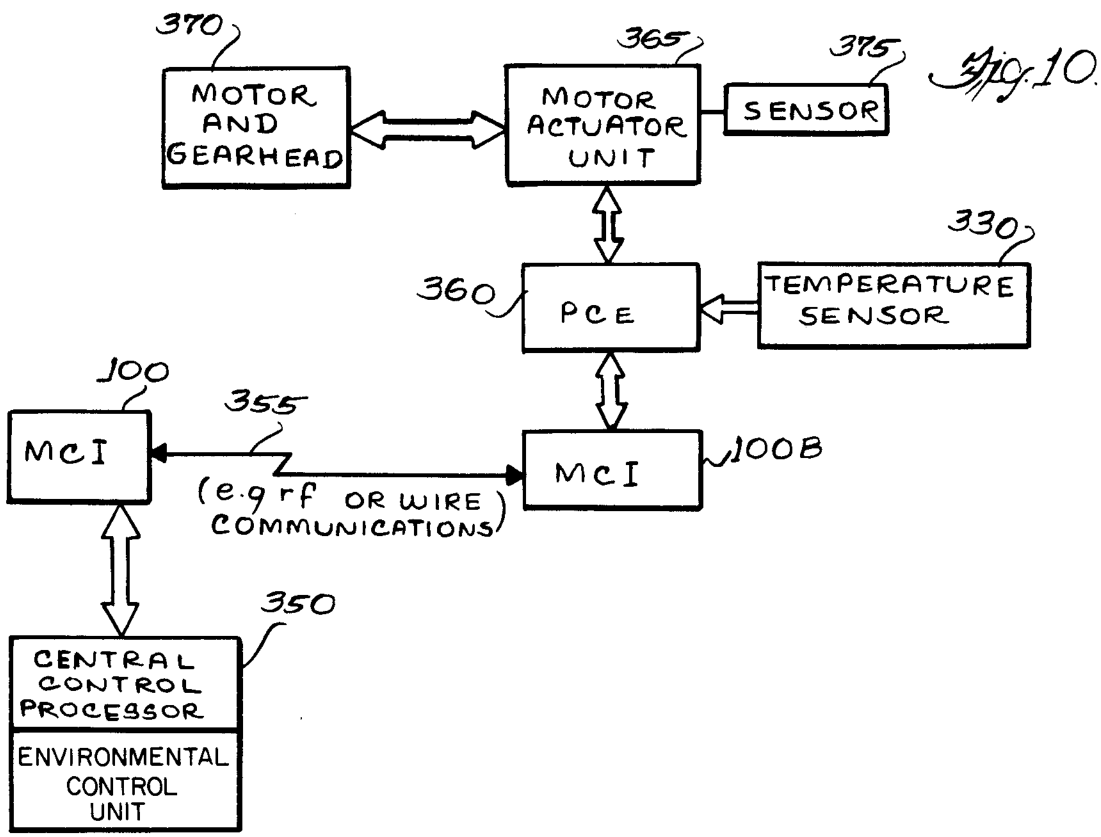
FIG. 10 is a block diagram of a centralized control vent control system embodiment of the present invention illustrated.

Referring to FIG. 10, a centrally controlled vent control system is shown, utilizing an environmental control unit in the place of the vent control unit. An environmental control unit 350 provides the central control processor for the system. Communications to and from the environmental control unit 350 is via a modular communications interface means 100 and therefrom over the power transmission line 355. The communications from the environmental control unit 350 are coupled via the power transmission line to a second modular communications interface **100*b* which provides bidirectional communications interface between the power transmission line and a peripheral control element 360. The peripheral control element 360 can be a vent control unit, or may be a stand alone digital logic or processor based system, or may be an integral part of a motor actuator unit 365. A temperature sensor 330 outputs its temperature sensed signal to the peripheral control element 360. The peripheral control element 360 detects when a predefined address has been received via modular communications interface means 100*b*, and appropriately couples signals either to or from the temperature sensor 330 or the motor actuator unit 365. The motor actuator unit 365 is coupled to a motor and gearhead assembly 370 and to sensor 375. The motor actuator unit provides direction and speed control signals to the motor 370 responsive to received command signals from the environmental control unit 350 via the peripheral control element 360 and modular communications interface means 100*b* and 100. The speed and direction of the motor of assembly 370 is controlled by the motor actuator unit 365 responsive to the outputs received from the sensor 375** and the control signal received from the environmental control unit.

Figure 11:
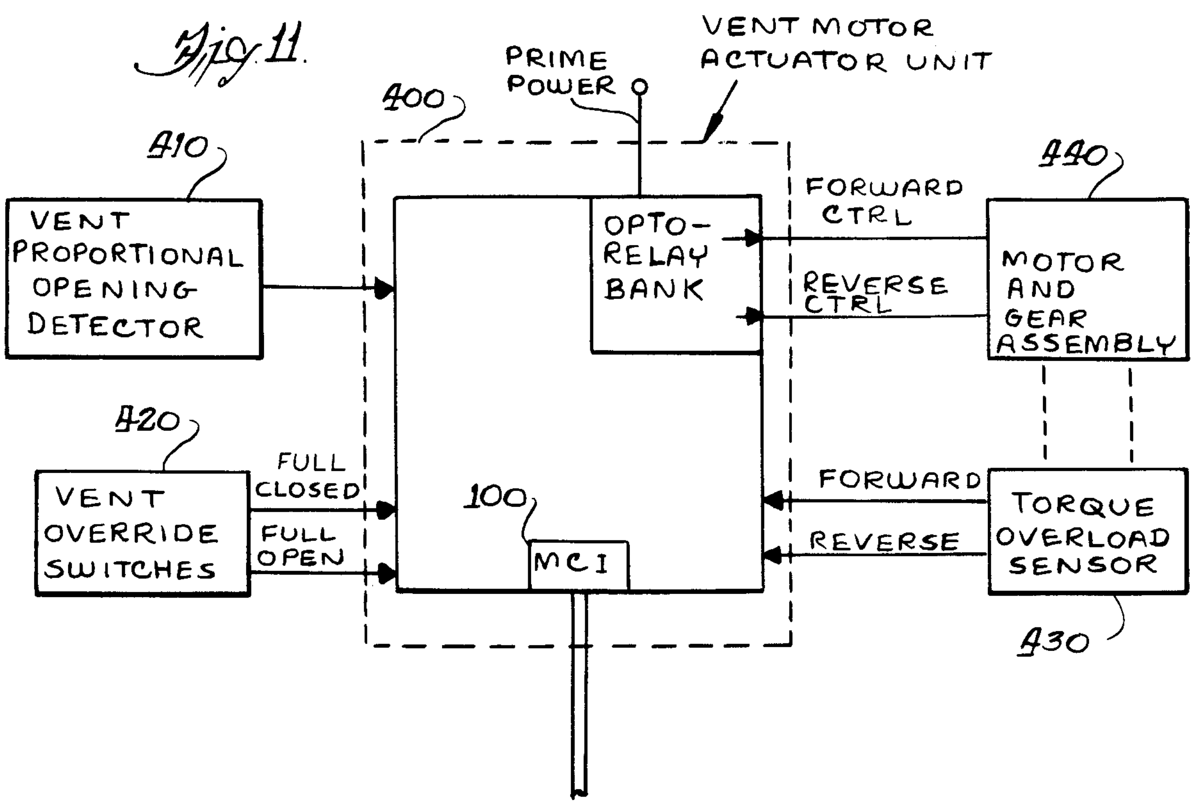
FIG. 11 is a block diagram of a vent motor actuator system and interfaces detailing the vent motor actuator unit of FIGS. 8 and 10.

Referring to FIG. 11, a vent motor actuator unit 400 is shown with sensor and motor interfaces. The vent motor actuator unit 400 is coupled to a vent proportional opening detector 410, which provides an output to the vent motor actuator unit 400 representative of the proportional opening of the vent. Vent override sensing means, such as switches 420, provide full closed and full open output signals to the vent motor actuator unit 400 representative of the fully closed or fully opened position of the vent. A modular communications interface means 100 is either included integrally within the vent motor actuator 400 or may be an external system coupled to the vent motor actuator unit. Communications between the vent motor actuator unit 400 and the vent control unit of FIG. 7 or environmental control unit of FIG. 10 is accomplished via respective modular communications interface means 100. The respective control unit provides control signals to the vent motor actuator unit. The vent motor actuator unit 400 provides motor control outputs, forward control and reverse control (corresponding to vent open and vent close commands) to the motor and gear assembly 440, which are responsive to the control signals received via the modular communications interface means 100, and responsive to the full open and full closed signals. The full open and full closed signals provide a system override feature whereby the control signals received via the modular communications interface means 100 are overriden responsive to in response to either of the full open or full closed signals. The motor control signals (vent open and vent close) are responsive to the control signals received from the central control unit (ECU or VCU) via the modular communications interface, and to the vent proportional opening signal, vent closed and vent full open signals. The status of the fully closed and fully open signals, vent proportional openings signal, can alternatively be communicated to the vent control unit (or environmental control unit) from the vent motor actuator unit via the modular communications interface 100.

The controller (whether it is a vent control unit or environmental control unit) performs a number of specific functions and features. First, the opening of the vent is controlled in discrete steps. In the illustrated embodiment, the vent opening is a function of the temperature difference between a set point and the measured indoor temperature (actual). The relationship between the vent opening, temperature differential, and stage, are preprogrammed and can be modified from the keyboard of the vent control unit (or environmental control unit). Numerous preset vent positions can be programmed into the system, such as close (0% open), crack (5% open), 25% open, 50% open, 75% open, and fully open. Alternatively, more, less, and different percentage open positions may be selected (programmed). The vent override limit switches 420 detect the full open and full closed positions of the vent. When one of these limit switches is triggered, a corresponding output signal is activated, which is transmitted to and sensed by the vent motor actuator unit 400 which then initiates a command to shut off the motor of assembly 440. Excessive torque is sensed by a torque overload sensor 430. Upon indication of torque overload, by either a forward or a reverse torque overload signal, the vent motor actuator unit 400 (or environmental control or vent control unit where appropriate) initiates a command to shut off the motor. The percentage opening of the vent for a particular setting (e.g., vent crack = 5% nominally) can be controlled on the basis of a particular stage which the system is in, the actual temperature and/or the time of day. The vent opening option can also be controlled manually, such as manual control of the crack option. The vent control unit (or environmental control unit) can be programmed to insert a time delay, such as ten seconds, between the time the motor is shut off and the time it is started again. The length of this delay can be determined by appropriate programming.

The vent motor actuator unit 400 provides an interface between the environment control unit or vent control unit and the motor/gear assembly 440 of a vent. The vent motor actuator unit 400 can be a stand alone product which can be mounted physically in the vicinity of the vent assembly. For example, it can be an enclosed unit with an on/off switch and an indicator light.

Figure 12A:
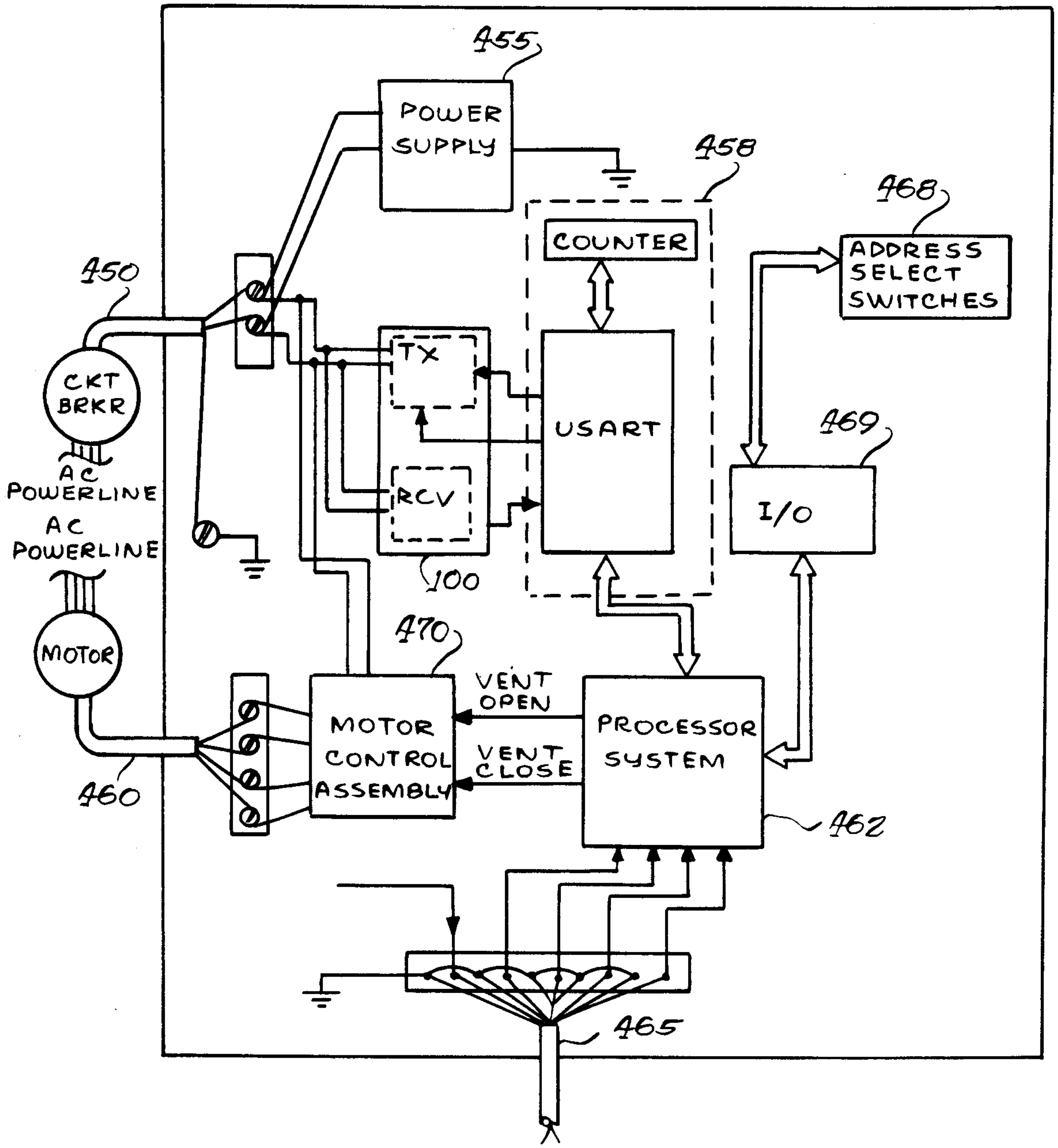
FIG. 12A is a detailed block diagram detailing functional electronic blocks within the motor actuator unit of FIG. 11.

Referring to FIG. 12A, a detailed block diagram of the system of FIG. 11 is shown. For example, the diagram of FIG. 12 can represent a printed circuit board block layout drawing. Before discussing the specifics of the vent motor actuator unit components, as shown in FIGS. 12 and 13, a number of specific features of the vent motor actuator unit shall be discussed. The inputs and outputs of the vent motor actuator unit consist of the AC power line 450 (110/220 volts AC), 110/220 VAC vent motor power connection 460, and low voltage wires 465 from the vent full open/closed limit switches and vent proportional opening indicator. In the illustrated embodiment of FIG. 12A, the modular communications interface means 100 is built into the vent motor actuator unit. Vent override switches 420 of FIG. 11, provide detection and signals indicative of the vent full open and full closed positions. The signals representing vent full open and vent full close positions are coupled to the vent motor actuator unit via wires 465. When either a vent full open or vent full closed signal is received, the motor controlled by the vent motor actuator unit 400 is turned off. Similarly, when torque overload is sensed, the motor is turned off. The vent proportional opening detector 410, in the illustrated embodiment, determines the degree of vent opening based on counting the teeth in the rack and pinion assembly comprising a vent open/close drive assembly. A photo emitter and detector pair can be utilized to count the teeth in the rack and pinion assembly. Only the change in status of the photo detector output is stored within the vent motor actuator unit 400. This change in status is coupled to the vent control unit or environmental control unit which contains a counter to maintain an accurate positional status indication. The counter can be zeroed and the vent fully closed to initialize a zero reference position. Thereafter, the number of teeth passing the photo sensor as compared to the total number of teeth comprising the rack will equal the percentage that the vent is open. In the illustrated embodiment, two messages must be received from the vent control unit or environmental control unit prior to activating reversal in the vent opening.

Referring again to FIG. 12A, the vent motor actuator unit 400 is further comprised of a power supply 455 which is coupled to the main power wires 450 and provides a digital logic voltage supply to the remainder of the vent motor actuator unit components. Communications between the modular communications interface means 100 and the rest of the vent motor actuator unit is accomplished via USART device 458 which is coupled to processor system 462. The low voltage sensing lines 465 are coupled to the motor control assembly and therefrom to the processor system 462. Vent motor actuator unit 400 address selection and identification is selected and programmed via address select switches 468 using I/O expansion device 469. Alternatively, where the processor system 462 has adequate numbers of inputs, the I/O expansion device 469 is not required. The processor system 462 outputs vent open and vent close control signals to control the motor and gear assembly 470. The vent open and vent close signals are output from the processor 462 to a motor control assembly 470 and therefrom to the motor via power wires 460.

Figure 12B:
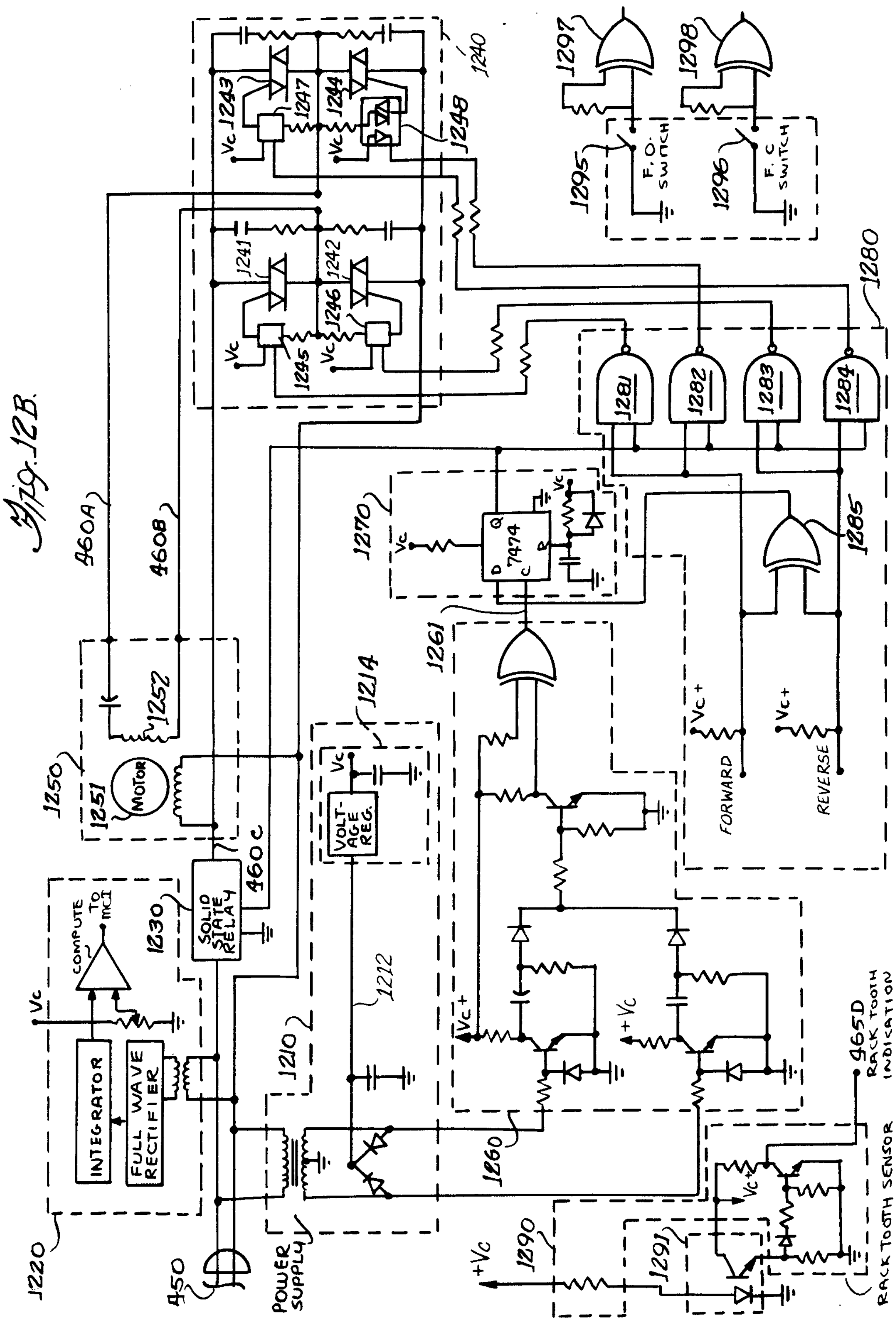
FIG. 12B is a detailed schematic of an embodiment of the vent motor actuator unit of FIGS. 11-12.

Referring to FIG. 12B, a detailed electrical schematic of the vent motor control assembly 470 of FIG. 12A is shown. The power line 450 is coupled to a power supply 1210 which provides regulated, 1214, and unregulated, 1212, DC voltage outputs. The power line 450 is also coupled to switching means, 1230, (such as a solid state relay), to electronic torque overload sensing means 1220, and to power switching network means 1240.

The torque overload sensing means 1220 is comprised of current sensing means coupled to the power line 450 and senses the current provided to the motor unit 1250 via switching means 1230 and power switching network means 1240. When current is sensed above a predefined threshold, a torque overload signal is output to the processor system (462 of FIG. 12A) and forces the drive to the motor 1250 to be shut off. Alternatively, torque overload sensors can be placed in the motor means 1250, and a torque overload signal is output to the low voltage lines 465, and therefrom to the processor 462.

The power supply 1210 additionally couples a transformer isolated AC signal, which tracks the power line AC signal, to a zero crossing network 1260. When a zero crossing is detected, the network 1260 outputs a signal 1261 which is coupled to the clock input of a latch 1270, such as an SN7474 D-type flip-flop. The output of latch 1270 is coupled to the control input of the switching means 1230, and when active, causes the switching means 1230 to couple one phase of the AC power line 450, as output 460C, to one side of run winding 1251, and to one side of power switching network 1240. The other side of run winding 451 is directly coupled to the power line 450.

The output of the latch 1270 is also coupled to one input each of NAND gates 1281–1284 of control network 1280.

The forward and reverse motor control signals are each coupled to one input of exclusive OR gate 1285 which has its output coupled to the data input D of latch 1270. The exclusive OR gate 1285 in conjunction with latch 1270 enables an output of an active signal from the latch 1270 only when one or the other of the motor control signals is active, but not when both are active.

The forward motor control signal is also coupled to the other input of each of NAND gates 1281 and 1282 while the reverse motor control signal is also coupled to the other input of each of NAND gates 1283 and 1284.

The NAND gates 1281–1284 provide logic decoding of the motor direction control signals to effectuate proper activation and selection of switching paths within switching network 1240. The output from NAND gates 1281, 1282, 1283, and 1284, respectively, are coupled via current limitting resistors to the control inputs of triacs 1241, 1244, 1242, and 1243, respectively. The switching network 1240 outputs are power signals 460B and 460A which are coupled to the starter winding 1252 of the motor 1250.

The motor 1250 is activated when both the start and run windings, 1252 and 1251, respectively, are activated. The direction of motor movement is controlled by the starter winding 1252, which is controlled by the switching network 1240. When triacs 1241 and 1244 are on (active) and triacs 1242 and 1243 are off, and switching means 1230 is on, the motor is driven in a forward direction. Conversely, when triacs 1242 and 1243 are on, triacs 1241 and 1244 are off, and switching means 1230 is on, the motor is driven in a reverse direction.

In the illustrated embodiment, the outputs of NAND gates 1281-1284 are optically isolated from the inputs of triacs 1241-1244 by optical isolators 1245-1248.

The rack tooth sense input, 465D, indicates movement of the vent along its rack and pinion assembly. The processor 462 is coupled to the rack tooth sense input signal 465D, and counts the rack tooth sense signals to determine the percentage opening of the vent. A opto-reflective sensor 1291 mounted in the pinion assembly senses passage of a tooth of the rack and pinion assembly by the sensor. A level shift buffer 1290, within the assembly 470 is coupled to the opto-reflector assembly and provides as its output the rack tooth sense signal 465D responsive to the opto-reflective sensor.

A full open and full closed limit switch, 1295 and 1296 respectively, are located on the pinion assembly for the vent. The switches 1295 and 1296 are coupled to exclusive OR gates 1297 and 1298, respectively within the assembly 470, which provide debounce and buffering. Full open limit and full closed limit signals are output from gates 1297 and 1298, respectively, to the processor 462. If either the full open or full closed limit signals are active, the vent motor is shut off.

Figure 13A:
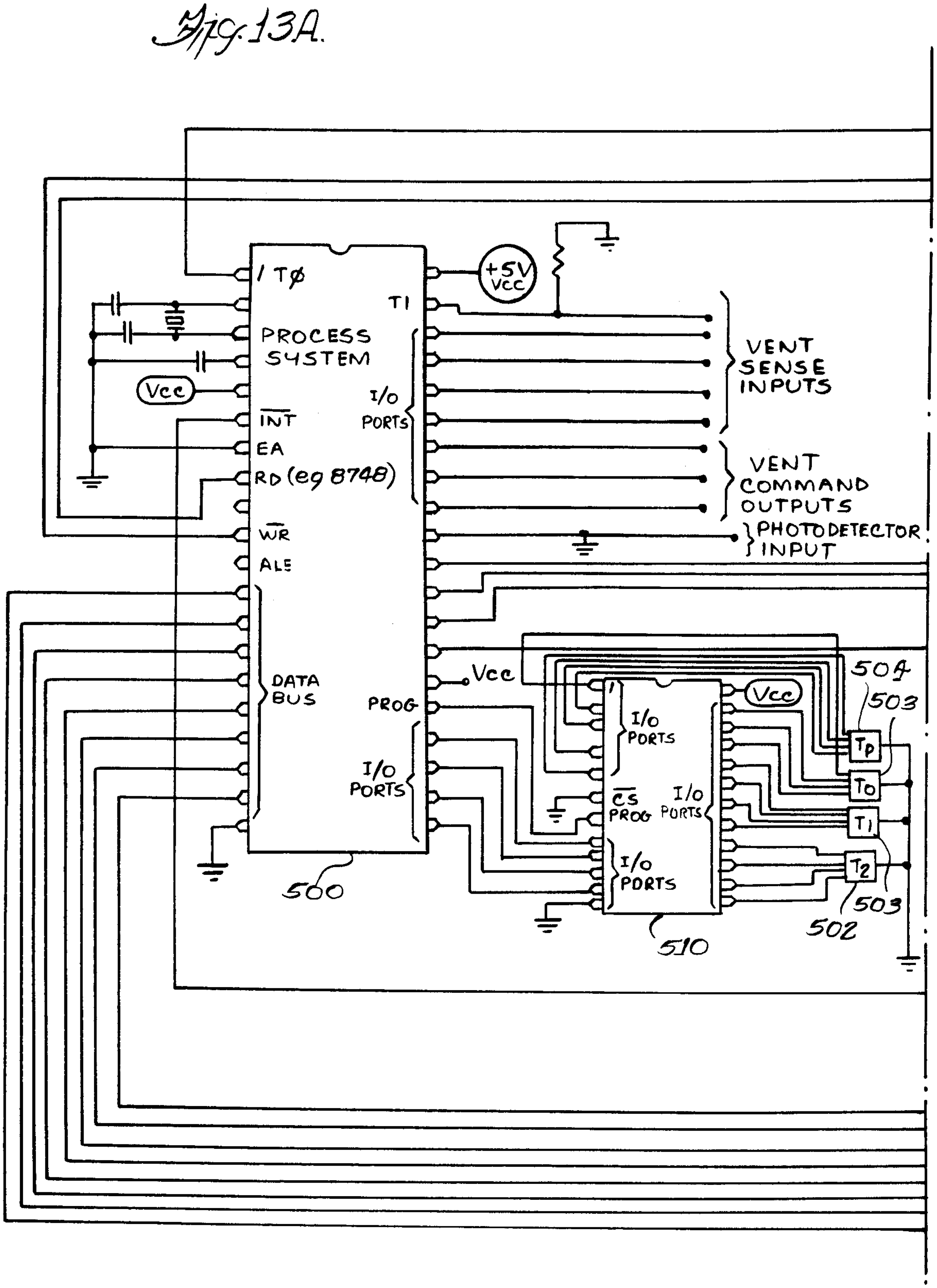
Figure 13B:
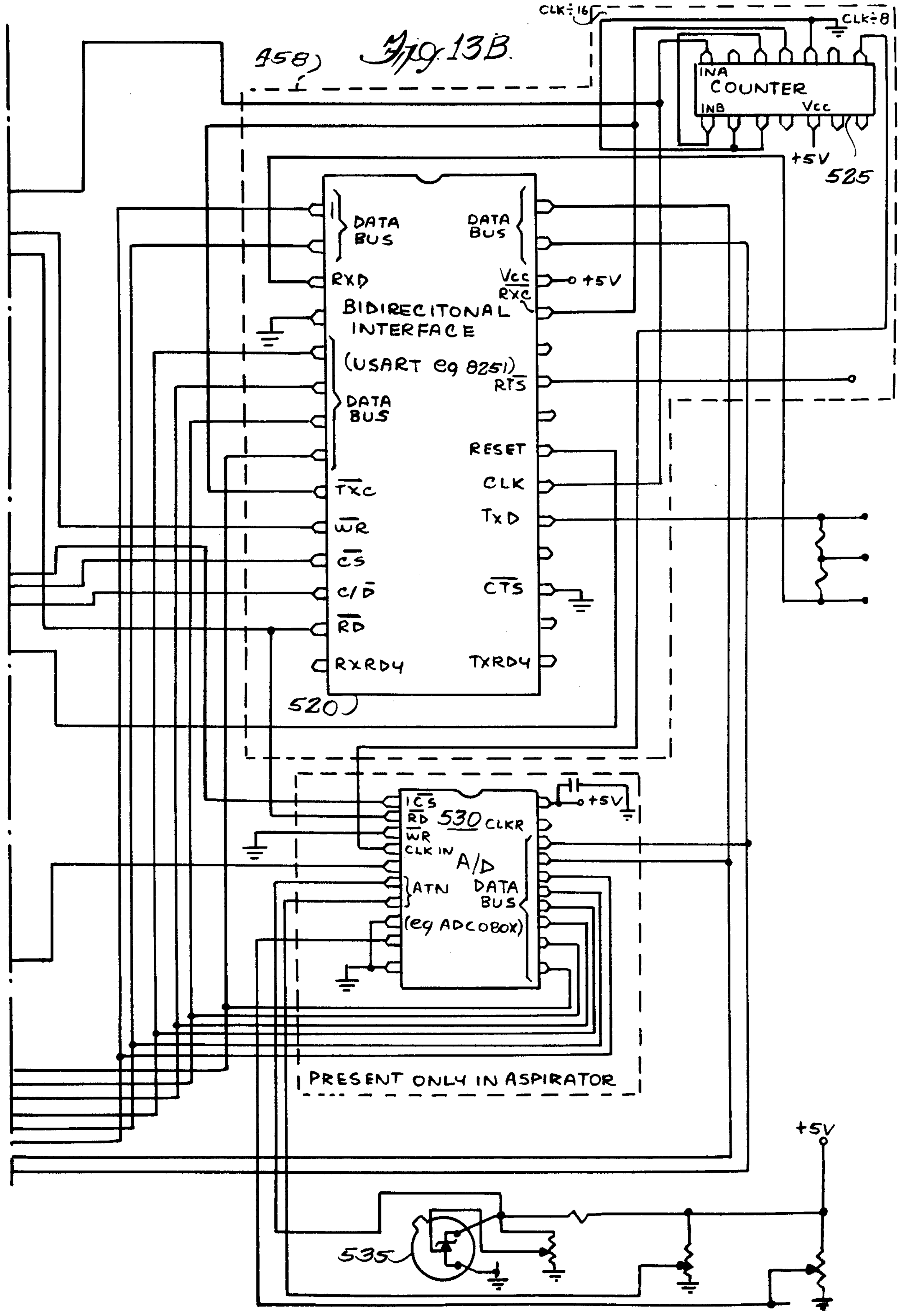

Referring to FIGS. 13*a–c*, a detailed electrical schematic diagram of the processor system 462, USART transmitter system 458, I/O expansion device 469, and address select switches 468 is shown in detailed schematic form. Any microcomputer can be used, such as an independent microprocessor with separate read only and read-write memories or other type of processor system having memory and I/O. In the illustrated embodiment, the Intel 8748 microprocessor (or 8048 microprocessor) system 500 is utilized as processor system 462 having on board read only memory and read-write memory. A plurality of sensed inputs are coupled to the processor 500 via its I/O ports. Device address selection is accomplished via switches 502, 503, 504 and 505 coupled to I/O expansion device 510, an Intel 8243 in the illustrated embodiment. As dicussed above, the I/O expansion device can be eliminated where an appropriate processor is chosen. The I/O device 510 is also coupled to the processor 500 for coupling address selection information thereto. The processor 500 is additionally coupled to the USART 458. The USART 458, as shown in FIG. 13*b*, is comprised of a universal synchronous asynchronous transmitter 520, an Intel 8251*a*, in the illustrated embodiment, and a counter circuit, a TTL SN7493 integrated circuit, 525. The counter circuit 525 divides the master clock frequency received from the processor system 500 and provides suitable clock frequencies to the USART 520. The same electronics of FIGS. 13*a–b* can be utilized in the peripheral control elements for outdoor and indoor aspirators (temperature sensors), with the addition of an analog to digital converter and temperature calibrator as shown in FIG. 13*b*. As shown in FIG. 13*b*, the data bus signals denoted D, from the processor 500 are coupled to A to D converter 530, an ADC080X (such as is available from Analog Devices, Texas Instruments, etc.) but may alternatively be other types of analog to digital converters. A thermistor, 535, a National Semiconductor LM 235A in the illustrated embodiment, is coupled to appropriate biasing circuitry which is then appropriately calibrated to achieve proper temperature calibration. The output from the thermistor 535 is coupled to the A to D converter where the analog voltage from the temperature sensor is converted to a digital signal equivalent which is coupled to the processor 500 via the bus designated D.

Referring again to FIG. 1, the interaction of the environmental control unit 110 with the peripheral control elements 120, 130, 140, 150, 160, 170, 180, and 190 via the modular communications interface means 100 will now be discussed in greater detail. The environmental control unit 110 interfaces with each sensing peripheral control element (such as wind sensor 120, rain sensor 130, indoor temperature aspirator 170, outdoor temperature sensor 180, humidistat 190, and photocell 150) according to a predefined protocol. The protocol utilized in the illustrated embodiment is as follows. First, a read command is output from the environmental control unit to each of the sensing units or only those sensing units desired, periodically. The rate of interrogation, i.e., the cycle time, is only limited by the speed of the processing units within the environmental control unit and peripheral control elements, and the communications transmission speed of the selected modular communications interface means. Typically, the sensing units are interrogated once every fraction of a second or few seconds. The modular communications interface means associated with each peripheral control element sensing unit receives the read command signal output from the environmental control unit and either the modular communications interface means or the peripheral control element has means to decode an address associates therewith to determine if that particular sensor is being addressed. The addressed sensor transmits back to the environmental control unit appropriate data regarding the status of the sensor. The modular communications interface means 100 associated with the addressed sensor transmits the data signal via the power transmission line back to the modular communications interface means 100 associated with the environmental control unit 110. Modular communications interface means 100 associated with the environmental control unit 110 decodes the transmitted data and provides it in digital form to the environmental control unit for processing. The environmental control unit thereupon updates its file for the sensor interrogated. The environmental control unit updates its file for each sensor as that sensor is interrogated and reported. This protocol can also be utilized with the vent control unit 300 as described with reference to FIGS. 7-9. However, the vent control unit typically interfaces only with the temperature aspirator unit 170, with or without respective modular communication interface means depending upon the respective locations of the temperature aspirator 170 and the vent control unit.

The temperature aspirator 170 draws air through from ambient surroundings within the indoor environment being controlled. A temperature sensor provides an indication of the ambient air temperature which is drawn through the aspirator. The environmental control unit 110 (or the vent control unit in a stand alone configuration) interfaces with the temperature aspirator 170 through modular communication interface means 100. Upon interrogation and proper address decode, the temperature sensor within the temperature aspirator responds to the interrogation with a digital word representing the current indoor temperature. As discussed above, the environmental control unit 110 then updates its file for the temperature aspirator accordingly.

The outdoor temperature sensor 180 provides an indication of the outdoor temperature. The environmental control unit 110 interfaces with the outdoor temperature sensor 180 via respective modular communications interface means 100. Upon interrogation and proper address decode, the temperature sensor 180 responds by outputting a digital word representing the current outdoor temperature to the environmental control unit. The environmental control unit then updates its outdoor temperature sensor file accordingly.

The photocell sensor 150 provides an indication of the light level at the location of the photocell. Environmental control unit 110 interfaces with the photocell sensor 150 via respective modular communications interface means. Upon interrogation and command, and proper address decode, the photocell sensor 150 responds with a status bit (logic 1 or logic 0) indicating the present state of the sensor. The environmental control unit 110 then updates its photocell file accordingly. If there are more than one of a given type sensor, only the appropriate file is updated.

The wind sensor 120 provides an indication of wind velocity, and can also be utilized to indicate wind direction where desirable. The environmental control unit interfaces with the wind sensor 120 via respective modular communications interface means 100. The wind sensor compares the sensed wind velocity with a predefined threshold level. Upon command and proper interrogation, and proper address decode, the wind sensor 120 responds by outputting a status bit (logic 1 or 0) indicating whether the current state of the sensor is above or below the predefined threshold. The wind sensor 120 can give a proportional reading, and utilizing an A to D convertor and a modular communications interface means 100 can communicate proportional data back to the environmental control unit 110.

In the illustrated embodiment, the rain sensor 130 detects and provides an indication of outside moisture. The environmental control unit 110 interfaces with the rain sensor 130 via respective modular communications interface means 100. Upon proper command and interrogation, and proper address decode, the rain sensor 130 responds by outputting a status bit (logic 1 or 0) indicating that the current sensed state of the sensor is greater than a predefined threshold. Alternatively, proportional, relative, or absolute value sensing and transmission can be provided.

A humidistat 190 can be provided in the system to detect the humidity level, either in absolute terms, or in relative terms above or below a set point. The environmental control unit 110 interfaces with the humidistat via respective modular communications interface means 100. Upon proper command and interrogation, and proper address decode, the humidistat responds by outputting a status bit (logic 0 or 1) indicating whether the humidity is above or below the set point. Alternatively, other data regarding humidity can be provided and transmitted.

Communications between the environmental control unit and each remote peripheral control element is via respective modular communications interface means 100. There are two communications protocols which can be utilized in the illustrated embodiment. First, the transmission can be unidirectional from the environmental control unit 110 to the addressed unit to be controlled or sensed. The environmental control unit 110 transmits the current desired status bits to each functional unit or units, one transmission at a time, once every second or fraction of a second (depending on the cycle time). In a cycle in which the command from the environmental control unit is rejected by the peripheral control element, no action is initiated by the addressed function until a correct message is received.

Alternatively, the transmission between the environmental control unit 110 and the addressed remote peripheral control element or elements can be bidirectional. In this mode, command is transmitted by the environmental control unit 110 to a remote unit (peripheral control element), via respective modular communication interface means, and, if properly decoded and accepted, is acted upon by the addressed remote unit or units, and a status bit activated, which is output (transmitted) to the environmental control unit 110 via the modular communications interface means. In this mode, the command continues to be retransmitted at predefined time intervals until a positive response is received from the addressed remote unit. If a positive response is not received after a predefined number of transmissions, an alarm routine is engaged by the environmental control unit (a program is actuated) which causes the non-responding modular communications interface address number to be flashed on the display until it is manually reset by the operator. This bidirectional transmission mode provides fault isolation and can be tied into an alarm system if desired.

Many additional functions and features can be added to the environmental control system in the greenhouse control setting. To utilize the central environmental control unit requires that many of these functions be interfaced to the environmental control unit via respective modular communications interface means. These include single speed and two speed exhaust fans, evaporative cooling pumps, unit heaters (both gas fired and steam heaters), and FACT impellers (which can consist of a fan motor and motorized shutter assembly).

Figure 14:
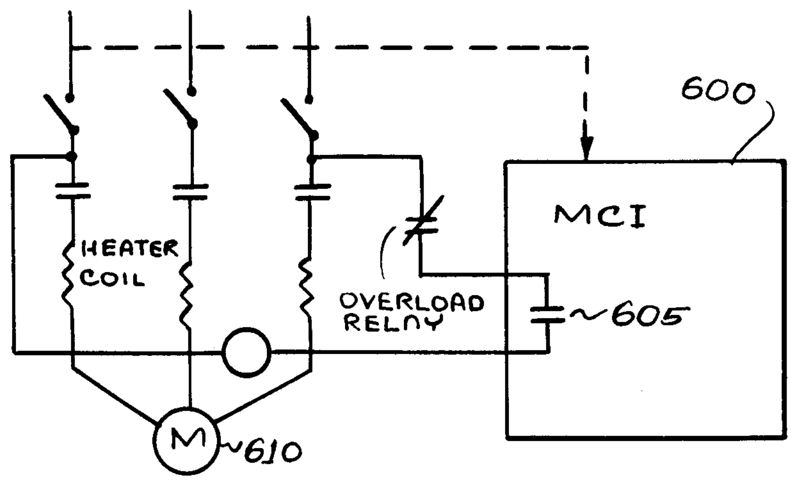
FIG. 14 is a partial schematic partial block diagram illustrating a single speed exhaust fan control system embodiment of the present invention.

Referring to FIG. 14, a partial schematic partial block diagram of a single speed exhaust fan interfaced to a modular communications interface circuit is shown. The modular communications interface means 600, as illustrated, contains a switching means 605 for providing a selective coupling. For example, a single relay (e.g. single pole) in the modular communication interface means 600 can be utilized to switch either the line voltage or a control signal. The voltage to be controlled can vary from 24 volts AC to 440 volts AC depending upon the electric service and the type of exhaust fan control utilized. Typically, the power to be switched is approximately 40 watts. A controller circuit within the modular communications interface 600 provides the necessary signal for activating the relay (switch) 605, which thereupon activates the motor 610 to cause the exhaust fan to be turned on.

Figure 15:
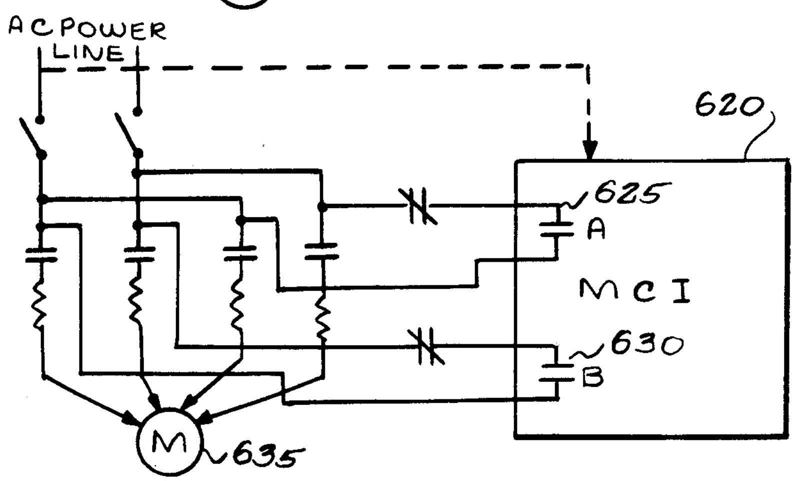
FIG. 15 is a partial schematic partial block diagram of a two speed exhaust fan embodiment of the present invention.

Referring to FIG. 15, a partial schematic partial block diagram of a two speed exhaust fan interface with a modular communications interface system is shown. As illustrated, the modular communications interface means 620 contains two relays (switches) providing double pole switching, which can be independently or simultaneously controlled. Where the selected fan motor 635 has two speeds which must be controlled remotely, two relays 625 and 630, or other appropriate switching means, can be incorporated into the modular communications interface means 620. The same voltage switching combinations are possible as noted above for the single speed option of FIG. 14. The relays are activated by signals from a controller means forming a part of the modular communications interface 620. Where independent control of each relay is desired, two control signals are required from the controller means.

Figure 16:
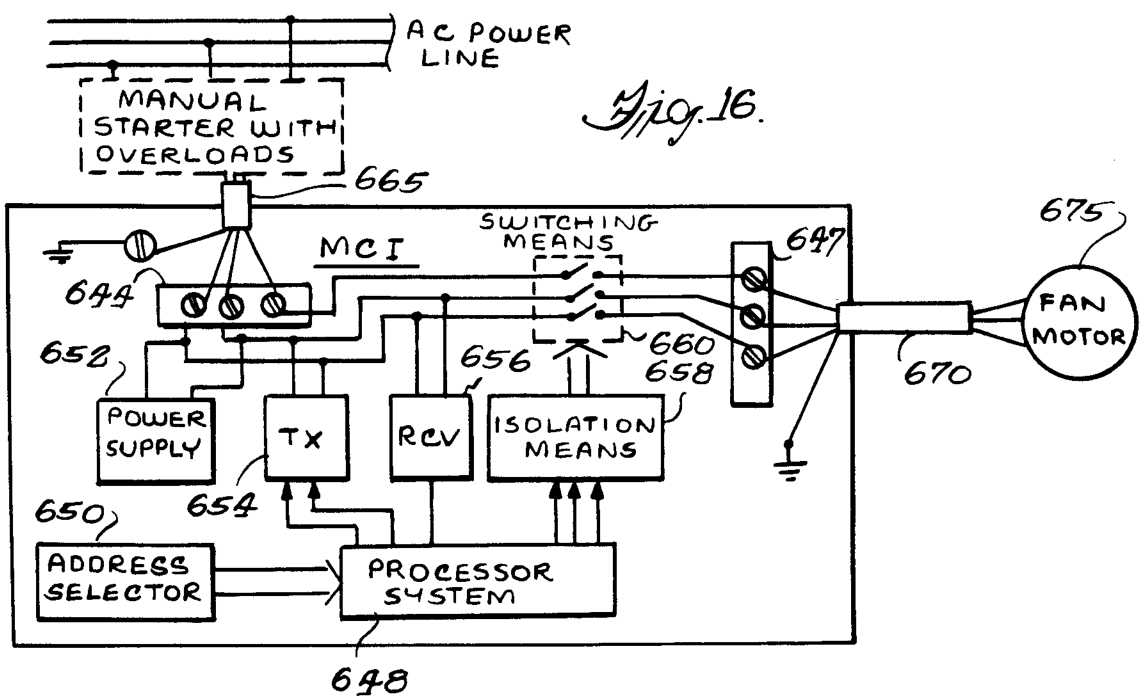
FIG. 16 is a detailed electrical block diagram of the single speed exhaust fan controller and modular communications interface of FIG. 14.

Referring to FIG. 16, a detailed block diagram for a single speed exhaust fan controller and modular communications interface means, such as 600 of FIG. 14, is shown with associated components.

The single speed exhaust fan modular communications interface means 640 may also be used for an evaporative cooling pad pump or for control of a gas unit heater without a venter. The modular communications interface means 640 is comprised of terminal strips 644 and 647, central processor system 648, address selector 650, power supply 652, transmitter means 654, receiver means 656, signal isolation means 658, and power switching means 660. A cable of wires 665, power transmission line wires, is coupled to the power transmission lines, whether it be single phase requiring only two wires, or 220 volts-two phase or 440 volts-three phase. The voltage and phase of the power transmission line system utilized affects selection of the power supply means 652. The power supply 652 converts the AC power line voltage to DC logic power supply voltage levels for utilization by other circuitry in the modular communications interface means 640. The transmitter 654 and receiver 656 can be coupled to a single phase of the power supply transmission system (or may alternatively be coupled to one some, or all phases of a multi phase power transmission system, depending on the system circuit design utilized). In the illustrated embodiment, the transmitter 654 and receiver 656 are coupled to a single phase power transmission system. The transmitter 654 and receiver 656 are also coupled to a central processing system 648, containing a central processing unit, memory, and input and output ports. In the illustrated embodiment, an 8048 microcomputer (e.g. Intel) is utilized, but other processor systems, whether single chip or multichip, can be utilized as desired in accordance with system needs and cost constraints. The processor system 648 is coupled to an address selection means 650. The address selection means 650 is set to the desired modular communications interface address to which the modular communications interface means 640 is to respond. The receiver 656 converts communications data signals received from the power transmission line via cable 665 to digital signals which are output to the processor system 648. The processor first compares the received address to the preselected address of the address selector 650. If a proper address is selected, then the processor system 648 responds in a proper manner according to a preprogrammed function.

When appropriate, the processor system 648 transmits a digital message to the transmitter 654. This message is converted to a form compatible for transmission via the power transmission line and is output as communicated data onto the power transmission line via cable 665. Additionally, when appropriate, the processor 648 provides outputs to the isolation means 658 so as to activate the power switching means 660. In the illustrated embodiment, optically isolated triac drivers are utilized for the signal isolation means 658 and triac switches are utilized in the power switching means 660. The number of triacs and the number of isolators utilized is a function of the number of phases and the AC voltage and current levels being switched. The power switching means 660 is coupled to the incoming power tranmission line via the terminal 644 and cable 665. The switch outputs from the triac switches 660, or other switching means are coupled to the terminal strip 647 and therefrom to cable 670, containing wires which lead to and contact to a remote fan or motor 675. The fan motor 675 can also be an evaporative cooling pad pump, or gas unit heater without venter, each of which typically require less than five amps. However, the power requirements of the load may be adjusted for by appropriate selection of a power supply 652 and switching means 660.

Figure 17:
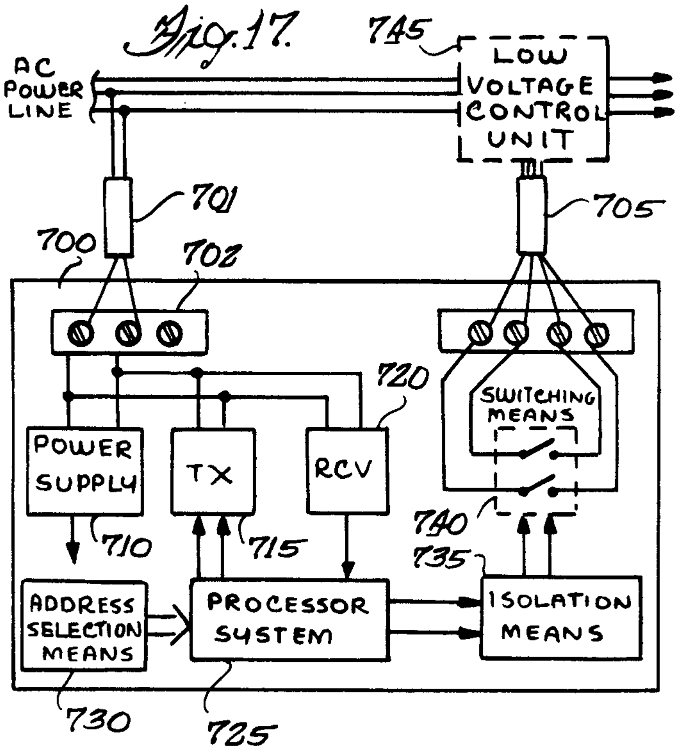
FIG. 17 is a detailed electrical block diagram of a dual function low voltage controller embodiment of the present invention.

Referring to FIG. 17, a dual function low voltage modular communications interface means 700 is shown which may be utilized for controlling a two speed fan, a unit heater with venter, a unit heater with electronic ignition, or a FACT impeller. The dual function low voltage modular communications interface means 700, as illustrated, is comprised of terminal strips 702 and 704, power supply 710, transmitter 715, receiver 720, central processing systems 725, address selection means 730, voltage isolation means 735, and power switching means 740. The power transmission lines 690, whether they be single phase 110 volt, two phase 120 volt, or three phase 440 volt, are coupled to the modular communications interface 700 via connection means 701, such as a multiwire cable. The connection from cable 701 connects to terminal strips 702 and therefrom to the power supply 710, transmitter 715, and receiver 720. The power supply 710 converts the AC voltage to a DC logic power supply voltage utilized for the electronic components within the modular communications interface means 700. Communications signals received from the environmental control unit over the transmission lines 690 are decoded by the receiver 720 and converted to digital signal form. In the illustrated embodiment the transmission and decode are serial in nature. The processor system 725, containing a central processing unit, memory, and input and output ports, in accordance with preprogrammed functions, decodes the received data signals and compares the reconstituted receved address signal to the preselected address signal as set by address selector means 730. If the proper address is decoded, the processor systems 725 responds in accordance with programmed functons. The processor system 725 may be the same processor system as 648 of FIG. 16, programmed differently, or operating off different subportions of a master program. Alternatively, other processor systems can be utilized as discussed with reference to FIG. 16. In a similar manner, as discussed with reference to FIG. 16, where appropriate, the processor system 725 outputs digital signals through the transmitter 715, which converts those signals to proper format and level for power line transmission. The transmitter 715 then outputs the appropriate signals via the connection means 701 back onto the power transmission line 690, where the signals are thereafter received and decoded and acted upon by the modular communications interface means 100 associated with the environmental control unit and are thereafter acted upon by the central control processor of the environmental control unit. Additionally, where appropriate (responsive to the received address and command from the environmental control unit), the processor system 725 provides control outputs representative of the desired power switching states. These outputs are coupled to the inputs of isolation means 735, which in the illustrated embodiment are optically isolated triac isolators. The output from the isolator means 735, corresponding to the control outputs of the processor system 725, are then used to control the switching means 740 to selectively close switches therein. In the illustrated embodiment, triac switches are utilized in the switching means 740 to provide two switching channels. The number and types of triacs are dependent upon the voltage and currents being switched. In the illustrated embodiment, low voltage (e.g. 24 volts AC) signals are coupled from an external low voltage control unit 745 via cable 705 to terminal strip 704 and therefrom to the input of the switching means 740. The output of the switching means are coupled to the terminals 704 and therefrom to the cables 705 back to the low voltage control unit 745. The low voltage control unit 745 selectively switches the power line voltage, or other desired voltage, to the dual speed fan, unit heater with venter, unit heater with electronic ignition, FACT impeller, or other selected equipment. Alternatively, the low voltage control unit can be replaced by a power line control voltage level unit, in which case the inputs to the terminal strip 704 and therefrom to the switching means 740 would be from the power transmission line 690 itself, in a manner similar to that discussed with reference to FIG. 16.

As discussed with reference to FIG. 16, the single function modular communications interface means 640 can be utilized to control a single speed exhaust fan, evaporative cooling pad pump, gas unit heater without venter, or other single function devie. However, although the same basic modular communications interface is required for each of these functions, certain applications may require some modifications to the switching means 660 dependent on the power requirements of the motor being controlled. Some pad pump motors can be twice as large as the typical exhaust fan motor. For example, a typical exhaust fan motor is one-horsepower requiring five amps. In some locations, pad pump motors can require as much as ten horsepower motors. Obviously, by selection of high power switching devices for the switching means 660, one system can handle all requirements. However, by appropriate selection of optimally sized switching means 660, the cost can be reduced for those applications requiring less power.

As discussed with reference to FIGS. 16 and 17, unit heaters can also be controlled by the single function (gas unit heater without venter) and dual function modular communications interface means. In accordance with the illustrated embodiment, there are at least two types of unit heaters which can be controlled. One is gas fired, and the other is steam or hot water powered. The modular communication interface means of FIG. 17 can accomodate the various options which the gas fired units can present. Simple on-off control requires only one relay (or other appropriate switching means) on the modular communications interface means. Typically, a one-sixth horsepower motor is utilized requiring 120 volts power line voltage to be switched. This application can be handled by the modular communications interface means as discussed with reference to FIG. 16. Where the gas fired heater includes a venter, two relays or switching means are required on the modular communications interface, such as the modular communications interface of FIG. 17. One relay (or other appropriate switch) is required for switching 24 volts AC at two amperes to provide for heat control, in the illustrated embodiment. The second relay (or other switching means) is needed for fan control and must be able to switch 24 volts AC one amp, in the illustrated embodiment. Typically, the heater fan motor will be three-fourths horsepower, 230 volts. The low voltage control unit 745 switches power to the fan motor responsive to the second relay control signal. A gas fired heater having a two stage heater requires three relays on the modular communications interface means. One relay is required for fan control, and the other two for the two stages of heat control. The relays can be solid state, electromechanical or otherwise, as desired. A gas heater with electronic ignition requires two relays or switches on the modular communications interface, such as a system of FIG. 17. One of the relays (switches) is required for gas flow control. The other relay (switch) is required for fan motor control, as discussed above.

Figure 18:
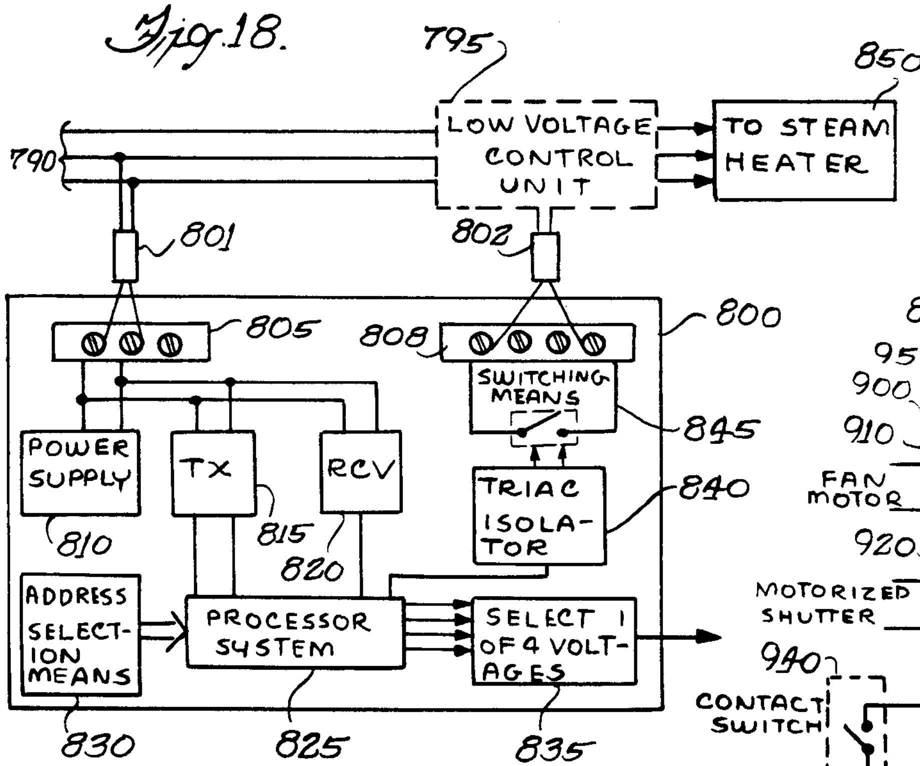
FIG. 18 is a block diagram of a modular communications interface and steam heater controller embodiment of the present invention.

Referring to FIG. 18, a steam heater low voltage modular communications interface means 800 is shown. The steam heater 850 requires control of a fan and a proportional steam valve. The fan control is based on a simple on/off control which requires only one relay or switching means 845. The proportional steam valve control interfaces with an actuator which is fully open when driven by a first voltage level, three volts DC in the illustrated embodiment, and is fully closed at a second voltage level, six volts DC in the illustrated embodiment, However, in the illustrated embodiment, intermediate voltages of four and five volts DC are also required. The power transmission line 790 (the voltage and phase dependent on the power tansmission system being utilized) is coupled via connection means 801 (such as a cable) to the terminal strip 805 of the modular communications interface means 800. The power supply 810, transmitter 815, and receiver 820 are each coupled to the power transmission line via terminal strip 805. The power supply 810 converts the AC voltage to DC logic power supply voltage levels for utilization by electronic components within the modular communications interface means 800. The receiver converts received communications signals from the power transmission lines to digital signal equivalents, coupling the digital signals to the processor system 825.

The processor system 825 contains a central processing unit, memory, and input and output ports. Alternatively, discrete logic can be utilized to perform necessary functions or other types of processor or logic can be utilized. For example, the processor can be an Intel 8048, as described with reference to FIG. 16, or can be implemented by other appropriate processors or logic. The processor compares the received communications address with a preselected address as output from the address selection means 830. The address selection means 830 is preset to the desired modular communcations interface address to which this modular communications interface is desired to respond. Responsive to receiving and decoding appropriate address and command signals, the processor 825 responsively performs respective functions, accordingly, either responsive to a predefined program, or in accordance with other logic control means. When appropriate, the processor 825 transmits digital signals (corresponding to an appropriate response) to the transmitter 815, which converts the digital signals to appropriate form and level for output to the power transmission line 790 via terminal strip 805 and cable 801. Additionally, when appropriate, responsive to received address and command signals, the processor system 825 provides output control signals to select one of four voltage options. The voltage control signal may either be encoded, requiring two signals, or unencoded, requiring four signals. The voltage selection signals are output to the voltage selection means 835 which provide one of the four voltage outputs (3, 4, 5 or 6 volts DC in the illustrated embodiment) on a single actuator output, responsive to the received voltage selection inputs. The actuator output is coupled to the steam heater proportional valve control and provides a drive signal therefore. Additionally, where appropriate, the processor system 825 provides a separate fan control signal output. The fan control signal output is coupled to the voltage isolation means 840, and therefrom to the power switching means 845. The isolation means 840, in the illustrated embodiment, is an optically isolated solid state switching circuit, such as a triac or transistor based switch. The output of the isolation means 840 is coupled to the switching means 845, which can be a relay or triac assembly, or other appropriate voltage switching means.

A low voltage control unit 795 provides a 24 volt AC fan control signal, in the illustrated embodiment, via conductor 802 to terminal strip 808 of the modular communications interface 800. This signal is coupled to the input of the switching means 845. The output of the switching means 845 is coupled to a different terminal of the terminal strip 808 and coupled therefrom to the conductor 802 to the low voltage control unit 795. Responsive to the output of the switching means 845, the low voltage control unit 795 selectively switches the power transmission line voltage signals at its inputs to its outputs and therefrom to the steam heater 850 providing fan control.

As discussed with reference to FIG. 17, the dual function low voltage modular communications interface means can be utilized for control of the FACT impeller. The FACT impeller can consist of a fan motor and a motorized shutter. The fan motor can be controlled by a simple on/off control which requires one relay or switch on the modular communications interface, the relay or switch having a capacity in accord with the fan motor specifications. The FACT impeller also has a motorized shutter which requires an on/off control signal, thus requiring a second relay or switch on the modular communications interface for the FACT impeller.

Figure 19:
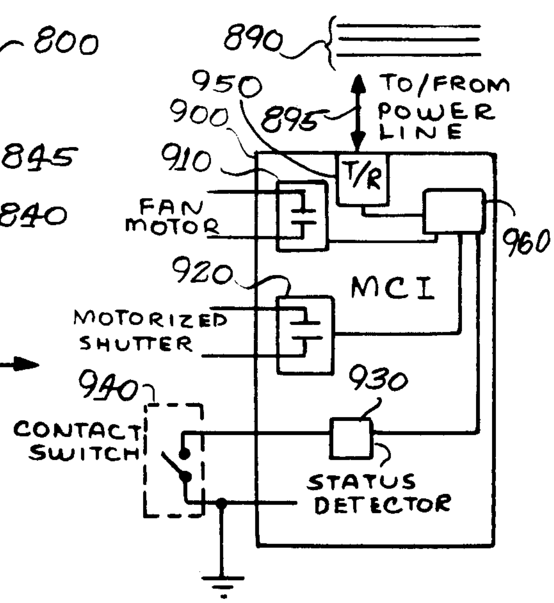
FIG. 19 is a block diagram of a modular communications interface and FACT Impeller system embodiment of the present invention.

Referring to FIG. 19, a modular communications interface means for a FACT impeller is shown. The modular communications interface 900 is coupled to the power line 890 by coupling means 895. The coupling means 895 couples the power line to the transmitter-receiver 950 of the modular communications interface 900. Received communication signals are converted to digital signal form which are then coupled from the receiver portion of the transmitter receiver system 950 to the processor system 960 of the communications interface 900. The processor system 960 reconstitutes the received address and command signals, detects and confirms proper address selection for this particular modular communications interface in accordance with the predefined address selection. When a proper address selection is confirmed, the commands received are interpreted and acted upon by the processor system 960. Where appropriate and responsive, the processor system 960 couples a digital signal output to the transmitter portion of the transmitter-receiver system 950, which converts the received digital signal to a form and voltage compatible for transmission over the power line 890 via cable 895. Where appropriate, responsive to a fan motor "on" command, the processor system 960 provides an output signal coupled to first switching means 910 which actuates the fan motor. The switching means 910 can be a relay, or solid state switches, or other appropriate means. Additionally, where appropriate, in response to a properly decoded address and command, the processor system 960 outputs a control signal to a second switching means 920 so as to cause the motorized shutter to be turned on, or off, respectively, according to the received commands. The second switching means 920 can also be a relay, either electromechanical or solid state, or can be other appropriate switching means. Thus, the fan motor and motorized shutter may be individually and selectively turned on and off by the FACT impeller modular communications interface responsive to received commands from the central environmental control unit. Where it is desirable to have a positive indication that the shutter has responded as commanded, a contact switch 940 can be mounted on each shutter, external to the modular communications interface means 900, which, when activated, momentarily closes a circuit. The contact switch 940 is coupled to the modular communications interface means 900 to a status detector circuit 930 within the modular communications interface 900. Upon detection of momentary closure of the contact switch, the status detector 930 couples this status determination to the processor system 960, which in turn transmits the information via the transmitter portion of the transmitter-receiver 950 over the power line to the environmental control unit. If a positive indication is not received from the status detector 930 by the environmental control unit, the environmental control unit causes the appropriate modular communications interface address number of the respective FACT impeller modular communications interface 900 to be flashed on its display until it is manually reset. A single modular communications interface for a FACT impeller, such as 900, can also handle multiple FACT impeller systems. For example, the modular communications interface 900 of FIG. 19 could be expanded to handle tens or hundreds of FACT impeller systems by utilization of appropriate processor system hardware and software and/or output decoders and expanders. However, this is often not practical due to the spacial separation of the FACT impeller systems.

Figure 20A:
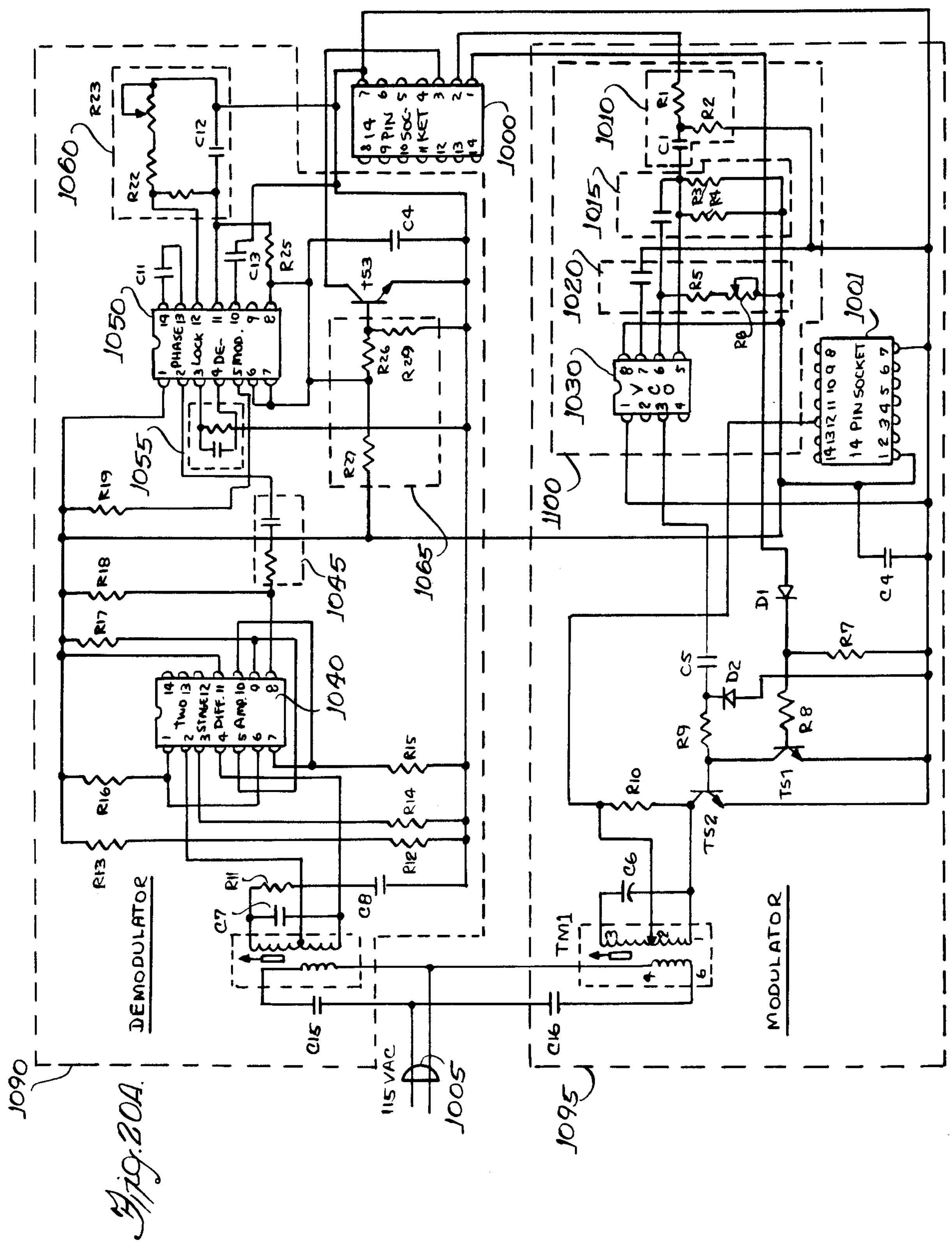
FIG. 20A is a detailed electrical schematic of a first embodiment of the modular communications interface means.
Figure 20B:
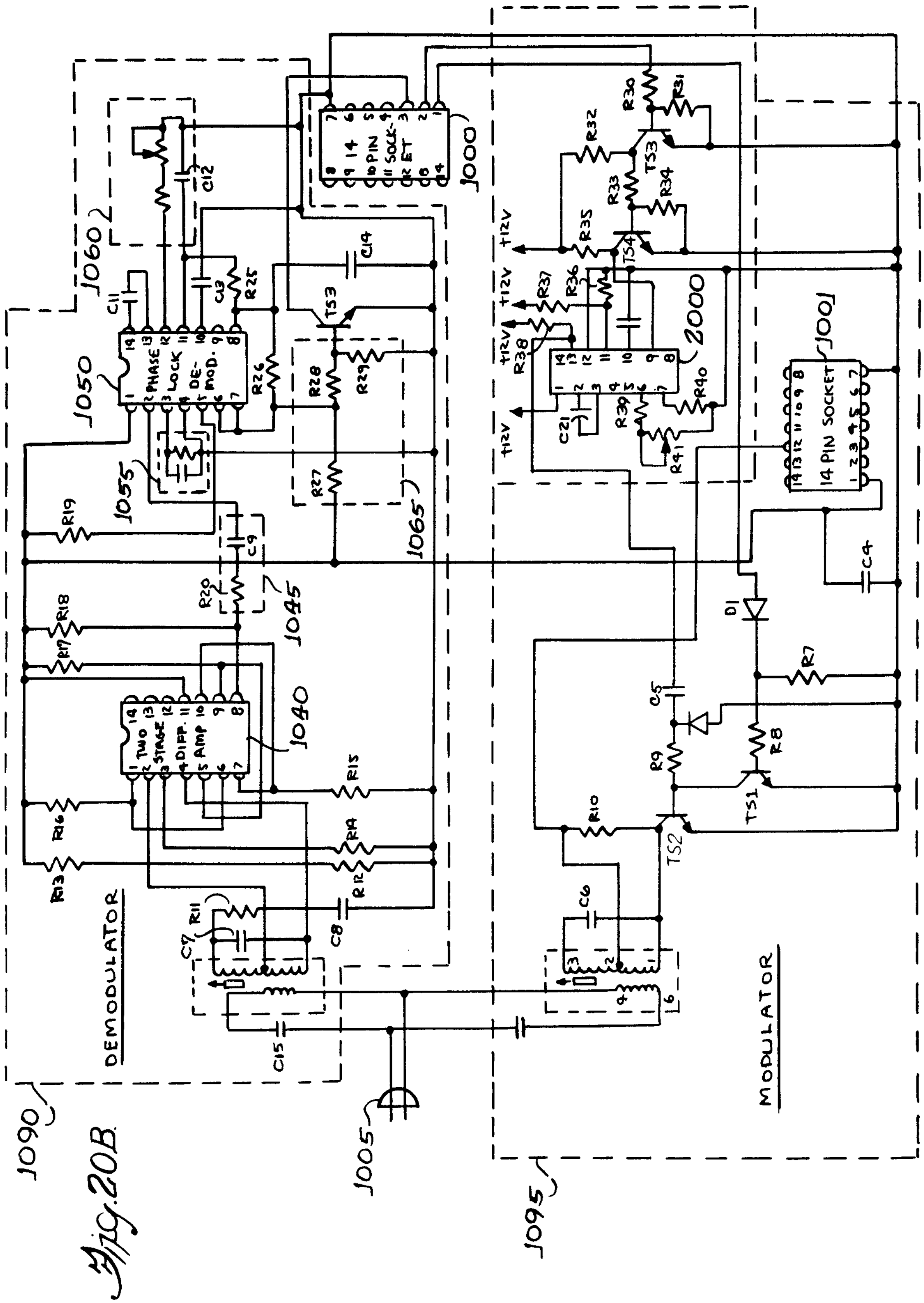
FIG. 20B is a detailed electrical schematic of a second embodiment of the modular communication interface means.

Referring to FIGS. 20A–B, detailed schematic diagrams of alternate embodiments of a modular communications interface means are illustrated. Referring to FIG. 20A, a coupling 1005, such as a power connection plug, couples the modular communications interface means to the AC power transmission line. As illustrated, one side of the power line is coupled via decoupling capacitors C-15 and C-16, respectively, to a receiver transformer TM 2 and a transmitter transformer TM 1 respectively. The receiver and transmitter subsections of the modular communications interface means can alternatively be classified as demodulator and modulator sections of the modular communications interface means. The demodulator section of the modular communications interface means is designated 1090 and the modulator section of the modular communications interface means is designated 1095. A connector 1000, a 14 pin socket connector in the illustrated embodiment, provides coupling from the modular communications interface means (sections 1090 and 1095) to the associated processor system of the remote peripheral control element or environmental control unit (or vent control unit). Alternatively, where the modular communications interface means and controller portions are combined in a single system block, such as in the single speed exhaust fan modular communications interface means, the signals from the connector 1000 are coupled directly to that system processor. The processor system couples a transmit data (TXD) signal and a transmit enable (TXEN/) signal to the connector 1000 coupling therefrom to the modulator 1095. Additionally, as illustrated, a ground reference signal is coupled between the connector 1000 and the processor system attached to the connector 1000. Furthermore, a received demodulated data signal (RXD) is output from the demodulator section 1090 via connector 1000 to the associated processor system.

The transmit enable control signal TXEN/, is coupled from pin 1 of the connector 1000 to the anode of diode D1. Diode D1 can be a small signal diode, such as a 1N 914, or other device. The diode D1 provides voltage bias level isolation of the TXEN/ signal. The cathode of diode D1 is coupled to one end of a resistor R7 which has its other end coupled to ground, and to one end of base current limiting resistor R8 which has its other end coupled to the base of shunting transistor TS1. When the TXEN/ signal is at a low logic level (active), diode D1 blocks the signal from passing to transistor TS1 (diode D1 is reverse biased). The voltage at the cathode of diode D1 is pulled to ground via resistor R7. The ground potential at the cathode of diode D1 is coupled to the base of transistor TS1 via resistor R8. The ground potential signal at the base of TS-1 causes transistor TS1 to be in a non-conducting off state (for the NPN transistor as illustrated). Thus, the collector of TS1 floats at whatever signal voltage level is present thereupon. The collector of transistor TS1 is coupled to the base of transistor TS2 which provides modulator output drive for coupling the modulator signal onto the power line via transformer TM1 as discussed hereafter.

The TXD, transmit data, signal received via connector 1000 is coupled to a voltage controlled oscillator (VCO) 1030 via a control spread network (1010) comprised of resistors R1 and R2 and capacitor C1, and a bias network 1015 as illustrated. The control spread network 1010 fixes the frequency spread between the space (lower frequency) and mark (higher frequency) outputs of the modulator section 1095. For maximum signal to noise ratio of the demodulated signal, the spread should be approximately equal to the digital signal data transmitting rate. The TXD signal is coupled via the control spread network 1010 via biasing network 1015 to the input of the voltage oscillator 1030. The biasing network 1015 has its configuration determined in accordance with the selected voltage control oscillator 1030. The VCO 1030 can be implemented in discrete component or integrated circuit form, such as an LM566 integrated circuit from National Semiconductor and other vendors, or other equivalent circuits. The center frequency of the VCO 1030 is set in accordance with the center frequency control network 1020 comprising resistors R5, R6, and capacitor C3, as is illustrated. The output of the VCO 1030 (pin 3 of integrated circuit 1030 as illustrated) is coupled via coupling capacitor C5 and base current limiting resistor R9 to the base of output drive transistor TS2. Diode D2 provides reverse bias input protection for transistor TS2. When TXEN/ is at an active (low logic) signal level, transistor TS1 is shut off, thereby allowing transistor TS2 to function responsive to the signals as output from VCO 1030. Thus, transistor TS2 is selectively turned on and off responsive to the output of the VCO 1030. When turned on, transistor TS2 causes current to flow through pull up load resistor R10, causing a voltage drop to occur across resistor R10. The center tap and one end tap of transformer TM1 are coupled across resistor R10. Capacitor C6 is coupled across the two end points of the primary winding of transformer TN1 forming part of the tuned circuit of the transformer TM1. In the illustrated embodiment, the transformer, TM1, and TM2, have tuning slugs to allow for tuning of center frequency selection and to provide for impedance matching of the secondary to transformer TM1 and primary of transformer TM2 to the power transmission lines via coupling means 1005. The sensed voltage change across resistor R10 is transformed and coupled in the primary of transformer TM1 to the secondary coil, performing a step down in voltage function and a step up in current function in the transformation process. The transformers TM1 and TM2 form signal tuned filters, in conjunction with associated resistance and capacitance components.

When the TXEN/ signal is in an inactive signal level (logic high), transistor TS1 is turned on, thereby shunting the base of transistor TS2 to a ground (or nearly ground) voltage level. This causes transistor TS2 of be shut off, disabled, thereby preventing any voltage drop across R10, and inhibiting any signal transmission via transformer TM1. Thus, with the transmitter disabled, TXEN/ at an inactive signal level, the driver transistor TS2 of the modulator 1095 is disabled so as to be non-responsive to VCO 1030.

The VCO 1030 converts data from TTL level data signals at connector 1000 to frequency shift keyed signals, above and below a center frequency. The binary logic levels of the TXD signal are converted from the logic 0 and logic 1 voltage levels to frequency tones above or below a carrier center frequency by a predefined spread frequency. The switching between the two frequencies is at the rate of the data input, providing asynchronous transmission capability. As discussed above, the center frequency of the VCO is determined by the center frequency control network 1020. The spread (frequency shift from the center carrier frequency) between the space (logic 0) equivalent and mark (logic 1 equivalent) signals is determined in accordance with the component values of the control spread network 1010. The spread is also a function of the drive provided at the input to the VCO, pin 5 of the illustrated embodiment. Thus, The biasing network 1015 is also a factor affecting the spread. It is desirable to maximize the signal to noise ratio of the signal as output from the modulator section. It has been found the optimal noise protection is obtained when the modulation index is kept close to 1 (unity). The modulation index equals the spread between the mark and space frequencies divided by the data rate of transmission. Thus, by setting the spread between the mark and space frequencies, equal to the data rate of transmission (as received from the processor system via the connector 1000), noise rejection can be optimized.

Power supply voltages are provided to the modulator and demodulator sections 1095 and 1090 respectively, from the associated system (e.g. the processor system) via connector 1001 of 14 pin socket connector in the illustrated embodiment. Alternatively, where the modulator communications interface means forms a stand alone control, power supply voltages may be generated and coupled directly within the modulator communications interface means system.

The demodulator (receiver) system recovers the transmitted data signals from the power transmission line and converts the frequency shift keyed signals back to binary logic level data signals (TTL signals in the illustrated embodiment). The receiver transformer TM2, has its primary coupled to the power transmission line 1005 for receiving frequency shift signals therefrom. One end of the primary of TM1 is coupled directly to one leg of the power transmission line, and is coupled via decoupling capacitor C15 to the other leg of the power transmission line. Capacitors C15 and C16 act as filters to shunt out the 60 Hz frequency components of the power transmission line from the received signals. The receiver transformer TM2 is, in the illustrated embodiment, a tuned filter (about the center frequency) for maximizing the signal to noise ratio of the demodulated output signal (as output from pin 7 from demodulator means 1050). Additionally, transformer TM2 performs a voltage step-up function between primary and secondary. More specifically, the voltage appearing across the primary of TM2 is step up voltage coupled to the secondary across the center tap, pin 2, and one end tap, pin 1, of the secondary of transformer TM2. Pins 1 and 2 of the secondary transformer TN1 are coupled to the plus and minus differential inputs of the differential amplifier means 1040, coupled to pins 2 and 4, respectively. In the illustrated embodiment, the differential amplifier means 1040 is a two stage differential amplifier, such as an LM3046 or equivalent. Capacitor C7 across the two end points of the secondary of transformer TM2 forms a part of the tuned filter circuit of the transformer TM2, which in conjunction with the tuning slug, 1006, provides the resonant tank circuit for the tuned filter transformer TM2. Additionally, resistor R11 and capacitor C8 effect the tuning of the transformer TM2. The amplifier 1040 shapes, amplifies, and provides impedance transformation of the differentially input signal, and provides as an output a symmetrical square wave with output levels compatible with the requirements of the phase lock demodulator 1050 to which the output is coupled. Resistors R12 and R13 form an input biasing network, adjusting the bias level for the signal input coupled into pin 2 of the differential amplifier 1040. Resistors R14 and R15, respectively, provide current source limiting for the first and second differential input stages, respectively, coupling to the common emitter points of the first and second differential input stages. Resistors R16 and R17 are load bias resistors, coupling to the collectors of the first stage input transistors, respectively. Resistor R18 forms an output load resistor, coupled to the collector of the second (output) transistor of the second differential stage of the amplifier 1040. The output from amplifier 1040, at pin 8 of amplifier 1040, is coupled via the coupling and input level control network 1045 to the mixer input (pin 2) of phase lock demodulator 1050.

The phase lock demodulator 1050 can be discrete circuitry or an integrated circuit VCO system providing phase lock demodulation, and can also provide carrier detection. The network 1055, comprising resistor R10 and capacitor C10 are filter determining components which are coupled to the tank inputs of the lock detect filter (carrier detect) inputs (pins 3 and 4) of demodulator 1050 as illustrated. The phase output of the locked detect filter appears at pin 5 of the demodulator 1050, in the illustrated embodiment, and is not utilized outside the demodulator 1050 in the illustrated embodiment. An inverse detector output appears at pin 6 of the illustrated embodiment. The center frequency of the phase lock loop voltage controlled oscillator of the demodulator 1050 is set in accordance with the selected timing capacitor C11 coupled across pins 14 and 13 of the demodulator circuit 1050. A loop phase detect filter is provided with a time constant set according to timing network 1060 as coupled across pins 11 and 2 of the demodulator 1050. The network 1060 aids in the control of the center frequency $F_C$ of the oscillator of the demodulator 1050, and also forms a filter network to remove the carrier and thereby aid in detection of data. The output of the loop phase detector apears at pin 11 of the demodulator 1050, as illustrated, and is coupled via current limiting resistor R25 to one input, pin 8, as illustrated, of a comparator within the demodulator 1050. The other input of the comparator is internally coupled to the reference voltage as output at pin 10, as illustrated. The output of the comparator appears at pin 7, and is commoned to pin 6 and coupled to the input of a voltage level shifting interface network 1065 and is coupled via positive feedback resistor R26 to the comparator input at pin 8. Resistor R26 and capacitor C14 form a comparator feedback network between the output at pin 7 and the input at pin 8. The comparator output at pin 7 is coupled to level shifting network 1065, which converts the demodulated output to a compatible logic voltage level, TTL voltage levels in the illustrated embodiment, in conjunction with transistor TS3. Transistor TS3, an NPN transistor in the illustrated embodiment, is selectively turned on (to a conducting state) responsive to the output from the demodulator 1050. The collector of transistor TS3 is coupled to the RXD pin of connector 1000, which couples the signal received as RXD to the processor system. In the illustrated embodiment, the RXD signal is pulled up to five volts via a pull up resistor in the processor system, such as a 10K Ohm pull up resistor. When the transistor TS3 is on, the RXD signal is at ground voltage potential, as the collector is shunted to the emitter voltage level (the emitter being coupled to ground). When the transistor TS3 is off, the transistor is not conducting, and the voltage at the collector of transistor TS3, is floating, i.e. is at whatever voltage level is otherwise coupled to the collector. As discussed above, where a pull up resistor to five volts (logic one in a TTL system) is coupled to the collector of TS3 via connector 1000, the signal level of RXD in the transistor TS3 off condition is a five volt (logic 1) signal. Thus, logic 0 (0 volts) and logic 1 (5 volts) signals are provided as the decoded output of the frequency shift keyed demodulator section 1090.

Referring to FIG. 20B, an alternate subsystem 1100 of the modulator of FIG. 20A is shown. Resistors R30–R35 and transistors TS3 and TS4 form a buffer-driver amplifier, amplifying the TXD (transmit data) signal from connector 1000 and coupling the amplified signal to the input, pin 9, of voltage controlled oscillator (VCO) 2000.

The VCO 2000, as illustrated can be an EXAR XR2207, or alternatively can be any other type of VCO if appropriate support circuitry is provided. The VCO free-running frequency is determined by appropriate selection of a timing capacitor C21. The upper sideband frequency is determined by selection of resistor R39 and R41. The lower sideband frequency is determined by selection of R40. Resistors R36 and R37 provide input bias control. The frequency shift keyed signal is output from pin 13 of VCO 2000 and is coupled via capacitor C5 and resistor R9 to transistor TS2 for coupling to the power line 1005 and discussed with reference to FIG. 20A.

While the modular communications interface means has been discussed with reference to a particular embodiment, other embodiments may also be used, utilizing different communications protocols and/or similar or different circuitry to implement the system.

In an alternate embodiment, the modular communications interface means provides communications among associated peripheral control elements and control units (environmental control unit or vent control unit) via radio frequency communication, thereby obviating the need for any communications wiring, either power transmission line or dedicated communications lines. To utilize radio frequency communication instead of power line based communication, some of the oscillators and transmission frequencies must be changed, such as VCO 1030 and demodulator 1050. For example, power line communication can be implemented with a center frequency ranging from tens to hundreds of kilohertz. Radio frequency transmission typically utilizes a carrier (center) frequency of tens or hundreds of megahertz. However, conceptually the modular communications interface means would remain the same. In the illustrated embodiments of FIGS. 20A, 20B the demodulator 1050 is an Exar-XR2211 integrated circuit. Alternatively, other commercial integrated circuits could be utilized such as an LM566, LM564 or other VCO based system.

Referring to FIGS. 1 and 2, a communications network is shown. The communication network facilitates the transfer of environmental variables from remote sensing elements to the central controller, and the transfer of command data from the central controller to remote actuator elements. Furthermore, such information transfer must be made utilizing techniques which reduce the probability of error and the probability of a missed message to a negligibly low level.

All information transfers in the environmental control network are accomplished using digital signaling signalling over the existing 60 Hz AC power wiring of the facility. Digital data, in the form of a serial stream of bits, are transformed into a sequence of radio-frequency tones by a frequency-shift keyed (FSK) data apparatus. These tones are inductively coupled to the power line. In order to minimize noise susceptibility, a sampling detector is used to translate the tones back into digital data.

Each remote element, whether a sense element or an actuator element, transmits only in response to interrogation by the central controller. The central controller allocates time slots, each dedicated to communication with a uniquely-addressed remote element. Any number of addresses are possible, with an initial capability of 300 present in the illustrated embodiment. The nature of data transfer is dependent the type of remote element being addressed. For example, in the current configuration, all addresses beginning with "1" are vent motor actuators. Hence, whenever a time slot associated with an assigned vent apparatus is active, the "1" in the address directs the central control computer to first address the unit, wait for an acknowledgement, and then transmit a percentage opening for that particular vent. When the address prefix is "2", the controller sends the address, and subsequently waits for temperature data to be returned from an outdoor temperature sensor. Similarly, a "3" indicates an indoor temperature sensor, which returns both light-level and temperature information.

At the end of each time slot, the central control computer addresses a new time slot, checks to see if this time slot has been assigned by the user, and, if so, commences transmission. During this initial transmission, address data is preceded by a "unique word" which serves to synchronize all remote elements, and indicates that some element's address is forthcoming. The remote element whose address follows the unique word then takes appropriate action, while all others go back to waiting for another unique word.

When there are multiple network masters (net master), i.e., multiple central controllers, present on the network simultaneously as shown by the phantom master controller 103, no contention problem exists as long as: (1) their respective users assign no remote addresses in common, and (2) the central controllers share a common time slot clock. The latter consideration is of course the more difficult. Since even stable crystal oscillators exhibit drift phenomena, an adaptive time slot synchronization scheme is utilized in the system. In this scheme, each net master continually listens (monitors) for the transmission of the unique word by another net master. If one is detected, the ensuing address information is monitored, giving precise information regarding the state of the time slot clock of the other net master. In an adaptive manner, all net masters count time slots in lock-step with one another.

With this communication technique, provision is included for digital data transfer, two-way communication, and multiple net masters.

Although the invention has been described with reference to specific embodiments, this description is not meant to be construed in a limiting sense. Various modifications of the disclosed embodiments, as well as other embodiments of the invention, will become apparent to persons skilled in the art upon reference to the description of the invention. It is therefore contemplated that the appended claims will cover any such modifications or embodiments as fall within the true scope of the invention.

```
ISIS-II MCS-48/UPI-41 MACRO ASSEMBLER, V3.0

LOC  OBJ         LINE        SOURCE STATEMENT


           ;        FILE NAME:  MCI123.LST          VERSION:  1.0

           ; *****************************************************************

           ;      MCI CONTROL PROCESSOR SOFTWARE...FOR USE WITH
           ;                MCI TYPES 1,2, OR 3.  TYPE NUMBERS
           ;                ARE THE SAME AS 'PREFIX' SEGMENTS
           ;                IN THE MCI ADDRESS.

           ;                TYPE 1=VENT CONTROL.

           ;                TYPE 2=OUTDOOR TEMPERATURE ASPIRATOR.

           ;                TYPE 3=INDOOR TEMPERATURE ASPIRATOR.

           ; ****************************************************************

0000                        ORG 0
0000 0409                   JMP START

0003                        ORG 3
0003 0488                   JMP ADCINT              ; ADC INTERRUPT.

0007                        ORG 7
0007 0498                   JMP TMRINT              ; TIMER INTERRUPT.

                    START:
0009 141A                   CALL INIT               ; POWER ON INITIALIZATION.

                    MAINLP:
000B 3400                   CALL COMM               ; UPDATE RECEIVED DATA BUFFER
                                                    ; AND STATUS.  TRANSMIT
                                                    ; WHEN APPROPRIATE.
000D 8AFF                   ORL P2,#0FFH
000F 0C                     MOVD A,P4
0010 D301                   XRL A,#1
0012 960B                   JNZ MAINLP              ; JUMP IF THIS IS NOT A
                                                    ; VENT CONTROLLER.

0014 5400                   CALL POSADJ             ; VENT POSITION ADJUST.

0016 742C                   CALL SENSE              ; UPDATE VENT STATUS BASED
```

```
                                          ; ON RACK-TOOTH COUNTING.

0018 040B               JMP MAINLP

        $EJECT

        ; ==============================================================

        ;          INITIALIZATION ROUTINE...RESPONSIBLE FOR
        ;                  TYPE-DEPENDENT SYSGEN.  IN VENT
        ;                  CONTROL MODE (TYPE 1), THE NUMBER
        ;                  OF RACK TEETH (TUTHMX) IS COUNTED
        ;                  BY CLOSING VENT ALL THE WAY, AND
        ;                  THEN OPENING ALL THE WAY, AND
        ;                  COUNTING TEETH.

        ;                  THE COMMUNICATION FUNCTION IS INITIAL-
        ;                  IZED AS:  ASYNCHRONOUS, X64, ODD-PARITY,
        ;                  8-BIT CHARACTERS, AND SINGLE STOP BIT.

        ; ==============================================================

                INIT:
001A 89FF               ORL P1,#0FFH
001C 993F               ANL P1,#00111111B
                                          ; MOTOR OFF (IF THIS IS A
                                          ; VENT CONTROLLER).

001E 27                 CLR A
001F B83F               MOV R0,#63D
0021 B91F               MOV R1,#31D
                ICLR:
0023 A0                 MOV @R0,A         ; CLEAR RAM.
0024 C8                 DEC R0
0025 E923               DJNZ R1,ICLR

0027 B820               MOV R0,#32D       ; INITIALIZE COMM PROTOCOL.
0029 232E               MOV A,#(LOW RX0)
002B A0                 MOV @R0,A

002C 0C                 MOVD A,P4         ; GET ADDRESS PREFIX.
002D D301               XRL A,#1
002F 966D               JNZ INIT1

                                          ; THIS IS A VENT CONTROLLER;
                                          ; NEED TO FIND TUTHMX.
                INIT3:
0031 0A                 IN A,P2
0032 5320               ANL A,#00100000B
```

```
                                        ; ISOLATE FULL-CLOSED LIMIT.
0034 C642             JZ INIT2

0036 8980             ORL P1,#10000000B       ; CLOSE VENT.
0038 0A               IN A,P2
0039 432F             ORL A,#00101111B        ; TEST FOR FULL OPEN OR
                                              ; RACK-END OR TORQUE LIMITS.
003B 37               CPL A                   ; ACC=0 FOR NO LIMITS.
003C C631             JZ INIT3

              INIT4:
003E 993F             ANL P1,#00111111B       ; MOTOR OFF!!!
0040 043E             JMP INIT4               ; LIMIT VIOLATION, MOTOR
                                              ; GOING WRONG WAY, OR INITIALLY
                                              ; SET UP AT FULL-OPEN LIMIT,
                                              ; OR IT'S JUST STUCK (TORQUE).
                      ; ENDLESS LOOP... REQUIRES RESET (POWER OFF/ON)
                      ;                       FOR RECOVERY.

              INIT2:
0042 993F             ANL P1,#00111111B
                                              ; MOTOR OFF.
0044 25               EN TCNTI
0045 55               STRT T
0046 B824             MOV R0,#36D
              INIT5:
0048 F0               MOV A,@R0               ; WAIT 10 SEC.
0049 D3FA             XRL A,#250D
004B 9648             JNZ INIT5


004D 85               CLR F0
004E 95               CPL F0
004F A5               CLR F1
              INIT6:
0050 8940             ORL P1,#01000000B       ; OPEN VENT.
0052 742C             CALL SENSE              ; UPDATE TUTHCT.
0054 0A               IN A,P2
0055 437F             ORL A,#01111111B                ; TEST FOR TORQUE LIMIT.
0057 37               CPL A
0058 C65C             JZ INIT7                ; JMP ON NO TORQUE LIMIT.
005A 043E             JMP INIT4               ; STOP MOTOR, GO TO
                                              ; ENDLESS LOOP.
              INIT7:
005C 0A               IN A,P2
005D 43AF             ORL A,#10101111B        ; TEST TO SEE IF WE
                                              ; ARE YET AT FULL-OPEN,
                                              ; OR RACK-END.
005F 37               CPL A
```

```
0060 C650                   JZ INIT6

                            ; NOW AT FULL-OPEN...


0062 85                     CLR F0

0063 993F                   ANL P1,#00111111B        ; STOP MOTOR.
0065 B823                   MOV R0,#35D              ; TUTHCT ADDR.
0067 B925                   MOV R1,#37D              ; TUTHMX ADDR.
0069 F0                     MOV A,@R0
006A A1                     MOV @R1,A

006B 14A9                   CALL TMRRST              ; START 10 SEC WAIT AGAIN.

                  INIT1:
006D 0C                     MOVD A,P4
006E D301                   XRL A,#1
0070 C67A                   JZ INIT8

                            ; NON-VENT MODE...

0072 99F7                   ANL P1,#11110111B        ; KICK OFF A/D BY
0074 00                     NOP                      ; SELECTING IT
0075 00                     NOP                      ; MOMENTARILY.
0076 00                     NOP
0077 8908                   ORL P1,#00001000B        ; DE-SELECT A/D.

0079 05                     EN I                     ; ENABLE A/D INTERRUPTS.

                  INIT8:                             ; NOW SET UP 8251 COMM
                                                     ; LINK ENVIRONMENT...

007A 75                     ENT0 CLK                 ; ENABLE 8251 CLOCK.
007B 99FE                   ANL P1,#11111110B        ; REMOVE 8251 RESET.
007D 99FB                   ANL P1,#11111011B        ; 8251 CHIP SELECT.
007F 8902                   ORL P1,#00000010B        ; COMMAND MODE.
0081 235F                   MOV A,#01011111B         ; SET UP: ASYNX64,
                                                     ; 8-BIT CHARACTERS,
                                                     ; ODD PARITY, SINGLE
                                                     ; STOP BIT.
0083 90                     MOVX @R0,A               ; R0 ARBITRARY.

0084 2314                   MOV A,#00010100B         ; COMMAND TX DISABLE,
0086 90                     MOVX @R0,A               ; RX ENABLE, ERROR RESET.

                  ;         INITIALIZATION COMPLETE.
```

```
0087 93                    RETR

                  $EJECT

                  ; ==================================================================

                  ;               ANALOG-TO-DIGITAL CONVERTER
                  ;                       INTERRUPT HANDLER...

                  ;==================================================================

                          ADCINT:
0088 D5                            SEL RB1
0089 AF                            MOV R7,A
008A 8904                          ORL P1,#00000100B       ; DISABLE 8251 CHIP.

008C 99F7                          ANL P1,#11110111B       ; ENABLE ADC080X CHIP.

008E 80                            MOVX A,@R0              ; READ ADC RESULT.
                                                           ; R0 IS ARBITRARY.
008F B82A                          MOV R0,#42D
0091 A0                            MOV @R0,A               ; STORE ADC RESULT.

0092 8908                          ORL P1,#00001000B       ; DISABLE ADC CHIP.
0094 99FB                          ANL P1,#11111011B       ; ENABLE 8251 CHIP.

0096 FF                            MOV A,R7

0097 93                            RETR

                  ;       COMMENT:  DISABLE OF THE ADC STARTS A NEW CONVERSION
                  ;                 DUE TO THE FACT THAT THE HARDWARE TIES THE
                  ;                 ADC WR-BAR LINE TO GROUND...SEE ADC080X
                  ;                 DATA SHEET.


                  $EJECT


                  ; =================================================================

                  ;               TIMER INTERRUPT ROUTINE...

                  ;                               USED FOR TIMING THE 10 SEC
                  ;                               DEAD ZONE REQUIRED AFTER EACH
                  ;                               MOTOR TURN-OFF.

                  ; =================================================================

```

```
                 TMRINT:
0098 D3                  SEL RB1
0099 AF                  MOV R7,A

009A B824                MOV R0,#36D
009C F0                  MOV A,@R0
009D 17                  INC A
009E AE                  MOV R6,A
009F D3FB                XRL A,#251D        ; TEN SEC MARK PLUS ONE COUNT.
00A1 96A5                JNZ TMR1
00A3 FF                  MOV A,R7
00A4 93                  RETR

                 TMR1:
00A5 FE                  MOV A,R6
00A6 A0                  MOV @R0,A
00A7 FF                  MOV A,R7
00A8 93                  RETR

           ; END OF TIMER INTERRUPT ROUTINE.

           $EJECT

           ; ==============================================================

           ;             TIMER RESET ROUTINE...
           ;                     STARTS TIMER AGAIN AT ZERO.

           ; ==============================================================

                 TMRRST:
00A9 B824                MOV R0,#36D
00AB 27                  CLR A
00AC A0                  MOV @R0,A
00AD 93                  RETR

           $EJECT

0100                     ORG 100H


           ; ==============================================================

           ;             DATA COMMUNICATIONS ROUTINE...
           ;                     INTERFACE TO THE 8251A USART.

           ;       NOTE: MANY FEATURES OF THIS INTERFACE
           ;             ARE HIGHLY DEPENDENT ON THE MESSAGE
           ;             SEQUENCING AND PROTOCOL DEFINED FOR
           ;             EACH OPERATIONAL MODE.
```

```
                ; ==========================================================

                        COMM:
0100 8908                       ORL P1,#00001000B          ; A/D DISABLE.
0102 99FB                       ANL P1,#11111011B          ; 8251A CHIP ENABLE.
0104 8902                       ORL P1,#00000010B          ; SELECT COMMAND MODE.

0106 80                         MOVX A,@R0                 ; READ 8251 STATUS BYTE.
0107 AF                         MOV R7,A
0108 43FD                       ORL A,#11111101B
010A 37                         CPL A
010B C60E                       JZ COMM1
                                                           ; JMP IF DATA READY.

010D 93                         RETR

                        COMM1:
010E FF                         MOV A,R7                   ; FIRST CHECK PARITY.
010F 5308                       ANL A,#00001000B
0111 C61A                       JZ COMM2
0113 2314                       MOV A,#00010100B           ; RESET PARITY ERROR FLAG.
0115 90                         MOVX @R0,A

                                                           ; NOW READ AND DISCARD THE
                                                           ; DATA WHICH HAS FAILED PARITY.
0116 99FD                       ANL P1,#11111101B          ; SELECT DATA MODE.
0118 80                         MOVX A,@R0                 ; READ DATA.

0119 93                         RETR
                        COMM2:
011A 99FD                       ANL P1,#11111101B          ; NO PARITY ERROR.
                                                           ; SELECT DATA MODE.
011C 80                         MOVX A,@R0                 ; READ DATA.

011D B821                       MOV R0,#33D
011F A0                         MOV @R0,A                  ; UPDATE RAM REPLICA OF
                                                           ; RECEIVED DATA.
0120 D3FF                       XRL A,#0FFH
0122 962A                       JNZ COMM3
                                ; FRAMING BYTE RECEIVED...
0124 B820                       MOV R0,#32D
0126 2330                       MOV A,#(LOW RX1)
0128 A0                         MOV @R0,A                  ; UPDATE RAM STATUS BYTE.
0129 93                         RETR

                        COMM3:
012A B820                       MOV R0,#32D
012C F0                         MOV A,@R0                  ; GET RAM STATUS BYTE.
```

```
0120 B3                        JMPP @A
 
012E 2F              RX0:      DB (LOW RX0+1)           ; WAIT FOR FRAMING BYTE.
012F 93                        RETR
 
0130 31              RX1:      DB (LOW RX1+1)
0131 343C                      CALL XRX1
0133 93                        RETR
 
0134 35              RX2:      DB (LOW RX2+1)
0135 3456                      CALL XRX2
0137 93                        RETR
 
0138 39              RX3:      DB (LOW RX3+1)
0139 34AF                      CALL XRX3
013B 93                        RETR
 
 
                     XRX1:
013C 8AFF                      ORL P2,#0FFH             ; TEST TO SEE IF MOST
                                                        ; MOST RECENTLY RECEIVED
                                                        ; BYTE IS LS PART OF
                                                        ; MCI ADDRESS.
013E 0C                        MOVD A,P4
013F AF                        MOV R7,A
0140 0D                        MOVD A,P5
0141 47                        SWAP A
0142 4F                        ORL A,R7
0143 AF                        MOV R7,A                 ; TOTP IN R7.
 
0144 B821                      MOV R0,#33D
0146 F0                        MOV A,@R0                ; GET RECEIVED BYTE.
0147 DF                        XRL A,R7
0148 C650                      JZ XRX11
                                                        ; WRONG ADDRESS.
014A B820                      MOV R0,#32D
014C 232E                      MOV A,#(LOW RX0)
014E A0                        MOV @R0,A                ; UPDATE STATUS BYTE.
014F 93                        RETR
 
                     XRX11:
0150 B820                      MOV R0,#32D              ; LS ADDR MATCHES.
0152 2334                      MOV A,#(LOW RX2)
0154 A0                        MOV @R0,A
0155 93                        RETR
 
                     XRX2:
0156 8AFF                      ORL P2,#0FFH             ; TEST TO SEE IF
```

```
                                              ; MOST RECENTLY RECEIVED
                                              ; BYTE IS MS PART OF ADDRESS.
0158 OE                   MOVD A,P6
0159 AF                   MOV R7,A
015A OF                   MOVD A,P7
015B 47                   SWAP A
015C 4F                   ORL A,R7
015D AF                   MOV R7,A            ; T2T1 IN R7.

015E B821                 MOV R0,#33D
0160 F0                   MOV A,@R0           ; GET RECEIVED BYTE.
0161 DF                   XRL A,R7
0162 C669                 JZ XRX21

0164 B820                 MOV R0,#32D         ; WRONG ADDR.
0166 232E                 MOV A,#(LOW RX0)
0168 A0                   MOV @R0,A           ; UPDATE STATUS.

                  XRX21:                      ; WHOLE ADDRESS MATCHES.
                          ; WE MUST NOW LOOK AT THE ADDRESS PREFIX, TP, TO
                          ; FIND OUT WHAT TYPE OF MCI WE ARE.

0169 BAFF                 ORL P2,#0FFH
016B 0C                   MOVD A,P4
016C AF                   MOV R7,A
016D D301                 XRL A,#1
016F C681                 JZ VENT

0171 FF                   MOV A,R7
0172 D302                 XRL A,#2
0174 C687                 JZ OUTASP           ; OUTDOOR ASPIRATOR.

0176 FF                   MOV A,R7
0177 D303                 XRL A,#3
0179 C68F                 JZ INASP            ; INDOOR ASPIRATOR.

017B B820                 MOV R0,#32D
017D 232E                 MOV A,#(LOW RX0)
017F A0                   MOV @R0,A           ; PREFIX WAS INVALID.

0180 93                   RETR

                  VENT:
0181 B820                 MOV R0,#32D
0183 2338                 MOV A,#(LOW RX3)    ; LOOK FOR VENT PERCENT NEXT.
0185 A0                   MOV @R0,A
0186 93                   RETR

                  OUTASP:
```

```
0187 B820             MOV R0,#32D
0189 232E             MOV A,#(LOW RX0)
018B A0               MOV @R0,A

018C 349E             CALL TEMP           ; SEND CURRENT A/D VALUE
                                          ; TO CENTRAL PROCESSOR.
018E 93               RETR


              INASP:
018F 3487             CALL OUTASP         ; USE ABOVE ROUTINE.
0191 B826             MOV R0,#38D
0193 09               IN A,P1
0194 5310             ANL A,#00010000B    ; ISOLATE DAY/NIGHT BIT.
0196 C69A             JZ INASP1
0198 2301             MOV A,#1
              INASP1:
019A A0               MOV @R0,A           ; SEND DAY (01H) OR
                                          ; NIGHT (00H) TO CENTRAL
                                          ; PROCESSOR.
019B 7408             CALL TX
019D 93               RETR

              TEMP:
019E B826             MOV R0,#38D         ; SEND MOST RECENT ADC BYTE
                                          ; (TEMPERATURE) TO CENTRAL PROC.
01A0 B92A             MOV R1,#42D
01A2 F1               MOV A,@R1



01A3 AF               MOV R7,A
01A4 53F0             ANL A,#11110000B    ; DON'T TX IF MSN IS FH, SO
01A6 D3F0             XRL A,#0F0H         ; AS TO AVOID INTERFERENCE
01A8 C6AE             JZ TEMP1            ; WITH RESERVED BYTES.
01AA FF               MOV A,R7

01AB A0               MOV @R0,A

01AC 7408             CALL TX

              TEMP1:
01AE 93               RETR

              XRX3:
01AF 34B9             CALL VDATA          ; UPDATE 'TUTHST'

01B1 7400             CALL ACK            ; TRANSMIT ACK BYTE.
```

```
01B3 B820            MOV R0,#32D
01B5 232E            MOV A,#(LOW RX0)
01B7 A0              MOV @R0,A           ; UPDATE STATUS.
01B8 93              RETR

           $EJECT

                VDATA:                   ; UPDATE TUTHST

                ; FIND THE NUMBER OF RACK TEETH CORRESPONDING TO THE
                ; RECEIVED DATA.

01B9 B821            MOV R0,#33D
01BB F0              MOV A,@R0
01BC AF              MOV R7,A            ; GET BCD DATA.
01BD 530F            ANL A,#00001111B    ; ISOLATE LSN.
01BF AB              MOV R3,A

01C0 FF              MOV A,R7
01C1 53F0            ANL A,#11110000B
01C3 47              SWAP A
01C4 AC              MOV R4,A

01C5 B825            MOV R0,#37D
01C7 F0              MOV A,@R0           ; GET TUTHMX
01C8 AD              MOV R5,A

01C9 27              CLR A
01CA AF              MOV R7,A
01CB AE              MOV R6,A
01CC AA              MOV R2,A
01CD A9              MOV R1,A

01CE FB              MOV A,R3
01CF C6D3            JZ VDATA1
                VDATA0:
01D1 34E3            CALL SETINC
01D3 EBD1            DJNZ R3,VDATA0
                VDATA1:
01D5 FC              MOV A,R4
01D6 C6E0            JZ VDATA2
                VDATA3:
01D8 B90A            MOV R1,#10D
                VDATA4:
01DA 34E3            CALL SETINC
01DC E9DA            DJNZ R1,VDATA4
01DE ECD8            DJNZ R4,VDATA3
                VDATA2:
01E0 B822            MOV R0,#34D         ; STORE NEW TUTHST.
```

```
01E2 FF                 MOV A,R7
01E3 A0                 MOV @R0,A
01E4 93                 RETR

                SETINC:
01E5 FD                 MOV A,R5
01E6 AA                 MOV R2,A                ; GET TUTHMX.
                SETIN1:
01E7 1E                 INC R6
01E8 FE                 MOV A,R6
01E9 D364               XRL A,#100D
01EB 96F0               JNZ SETIN2
01ED 1F                 INC R7
01EE BE00               MOV R6,#0
                SETIN2:
01F0 EAE7               DJNZ R2,SETIN1

01F2 93                 RETR



      $EJECT

0200                    ORG 200H


      ; ==============================================================

      ;                 VENT POSITION ADJUST ROUTINE...

      ;         THIS SUBROUTINE COMPARES CURRENT VENT POSITION WITH
      ;         THAT COMMANDED, AND TAKES APPROPRIATE MOTOR CONTROL
      ;         ACTION.  COMMANDS TO START THE MOTOR ARE FORCED TO
      ;         COMMENCE NO SOONER THAN TEN SECONDS AFTER THE
      ;         MOTOR WAS LAST TURNED OFF.

      ; ==============================================================

                POSADJ:
0200 B822               MOV R0,#34D
0202 B923               MOV R1,#35D
0204 F0                 MOV A,@R0               ; GET TUTHST.
0205 AF                 MOV R7,A

0206 F1                 MOV A,@R1               ; GET TUTHCT.
0207 AE                 MOV R6,A
0208 DF                 XRL A,R7
0209 961A               JNZ POS3                ; JMP IF TUTHCT.NE.TUTHST.
020B 7611               JF1 POS1                ; JMP IF
```

```
020D B611              JFO POS1                  ; MOTOR IS ON.
020F 4417              JMP POS2
                POS1:
0211 993F              ANL P1,#00111111B         ; TURN MOTOR OFF.
0213 14A9              CALL THRRST               ; RESET 10 SEC TIMER.
0215 A5                CLR F1
0216 85                CLR F0
                POS2:
0217 8920              ORL P1,#00100000B         ; RESET ALARM.
0219 83                RET

                POS3:


          ;            VENT IS NOT AT DESIRED POSITION.  FIRST
          ;     DETERMINE APPROPRIATE MOTOR DIRECTION (OPEN/CLOSE).  IF
          ;     TUTHCT.LT.TUTHST, THEN WE NEED TO OPEN VENT MORE.  IF
          ;     TUTHCT.GT.TUTHST, THEN WE NEED TO CLOSE VENT MORE.
          ;     WE FIND OUT WHICH IS GREATER BY INCREMENTING A
          ;     REGISTER WHICH INITIALLY CONTAINS TUTHCT.  IF WE
          ;     REACH TUTHST BEFORE WE REACH FFH, THEN WE KNOW THAT
          ;     TUTHCT.LT.TUTHST, AND THEREFORE THE VENT MUST BE
          ;     COMMANDED TO OPEN FURTHER.  ON THE OTHER HAND, IF WE
          ;     REACH FFH FIRST, THEN WE KNOW THAT TUTHCT.GT.TUTHST,
          ;     AND SO WE MUST CLOSE THE VENT.

          ;     ACTUAL COMMAND TO OPEN OR CLOSE IS PRECEDED BY A
          ;     CHECK FOR LIMIT VIOLATIONS, AND A CHECK TO BE SURE THAT 10
          ;     SEC. HAVE ELAPSED SINCE LAST MOTOR TURN-OFF (EITHER
          ;     DIRECTION).

          ;     FO IS SET WHEN MOTOR IS OPENING VENT; F1 WHEN CLOSING.

021A 1E                INC R6
021B FF                MOV A,R7
021C DE                XRL A,R6
021D C626              JZ OPEN
021F 23FF              MOV A,#0FFH
0221 DE                XRL A,R6
0222 C653              JZ CLOSE
0224 441A              JMP POS3

                OPEN:
0226 0A                IN A,P2
0227 43AF              ORL A,#10101111B          ; IF NOT AT FULL-OPEN
                                                 ; OR RACK-END LIMIT, ACC=FFH.
0229 37                CPL A
022A 9644              JNZ POS4                  ; JMP IF LIMIT SET.
022C 0A                IN A,P2
```

```
022D 437F          ORL A,#01111111B        ; IF NOT AT TORQUE LIMIT, ACC=FFH.
022F 37            CPL A
0230 964A          JNZ POS5                ; JMP IF LIMIT SET.

           ; NO LIMITS SET.

0232 8920          ORL P1,#00100000B       ; RESET ALARM.
0234 764C          JF1 POS6                ; JMP IF MOTOR NOW CLOSING.
0236 B824          MOV R0,#36D
0238 F0            MOV A,@R0
0239 D3FA          XRL A,#250D
023B 9643          JNZ POS7                ; JMP IF NOT YET 10 SEC.

023D 997F          ANL P1,#01111111B       ; DISABLE CLOSING.
023F 8940          ORL P1,#01000000B       ; ENABLE OPENING.
0241 85            CLR F0
0242 95            CPL F0                  ; SET 'OPENING' FLAG.

           POS7:
0243 83            RET
           POS4:
0244 B823          MOV R0,#35D             ; PUT TUTHMX IN TUTHCT,
                                           ; SINCE WE KNOW THAT WE ARE AT
                                           ; FULL-OPEN.
0246 B925          MOV R1,#37D
0248 F1            MOV A,@R1
0249 A0            MOV @R0,A
           POS5:
024A 99DF          ANL P1,#11011111B       ; SET ALARM.
           POS6:
024C 993F          ANL P1,#00111111B       ; TURN MOTOR OFF.
024E A5            CLR F1
024F 85            CLR F0
0250 14A9          CALL TMRRST

0252 83            RET

           CLOSE:
0253 0A            IN A,P2
0254 43DF          ORL A,#11011111B        ; IF NOT AT FULL-CLOSED
                                           ; LIMIT, ACC=FFH.
0256 37            CPL A
0257 9671          JNZ POS8

0259 0A            IN A,P2
025A 437F          ORL A,#01111111B        ; IF NOT AT TORQUE LIMIT,
                                           ; ACC=FFH.
025C 37            CPL A
025D 9675          JNZ POS9                ; JMP IF LIMIT SET.
```

```
                      ; NO LIMITS SET.

025F 8920                     ORL P1,#00100000B       ; RESET ALARM.

0261 B677                     JF0 POS10               ; JMP IF NOW OPENING.
0263 B824                     MOV R0,#36D
0265 F0                       MOV A,@R0
0266 D3FA                     XRL A,#250D
0268 9670                     JNZ POS11               ; JMP IF NOT YET 10 SEC.

026A 99BF                     ANL P1,#10111111B       ; DISABLE OPENING.
026C 8980                     ORL P1,#10000000B       ; ENABLE CLOSING.

026E A5                       CLR F1
026F B5                       CPL F1                  ; SET CLOSING FLAG.

                      POS11:
0270 83                       RET

                      POS8:
0271 B823                     MOV R0,#35D
0273 27                       CLR A                   ; SET TUTHCT=0, SINCE
0274 A0                       MOV @R0,A               ; VENT CLOSED.

                      POS9:
0275 99DF                     ANL P1,#11011111B       ; SET ALARM.

                      POS10:
0277 993F                     ANL P1,#00111111B       ; TURN MOTOR OFF.

0279 A5                       CLR F1
027A 85                       CLR F0
027B 14A9                     CALL TMRRST

027D 83                       RET


                ;     END OF POSITION-ADJUST ROUTINE...

                $EJECT

0300                          ORG 300H

                      ACK:                            ; SEND ACK BYTE TO
                                                      ; CENTRAL CONTROLLER.
0300 23F0                     MOV A,#0F0H
0302 B826                     MOV R0,#38D
0304 A0                       MOV @R0,A
```

```
0305 7408                   CALL TX

0307 93                     RETR

               $EJECT


                    TX:                                 ; SEND BYTE IN LOC 38
                                                        ; DECIMAL TO 8251 FOR TX.
0308 8902                   ORL P1,#00000010B           ; SELECT COMMAND MODE.
030A 2325                   MOV A,#00100101B            ; TX ENABLE AND RTS-BAR.
030C 90                     MOVX @R0,A
030D 00                     NOP
030E 00             TX0:    NOP
030F 80                     MOVX A,@R0                  ; READ 8251 STATUS.
0310 43FA                   ORL A,#11111010B            ; TEST FOR TXRDY
0312 37                     CPL A                       ; AND TXEMPTY.
0313 960E                   JNZ TX0

0315 99FD                   ANL P1,#11111101B           ; SELECT DATA MODE.

0317 B826                   MOV R0,#38D
0319 F0                     MOV A,@R0
031A 90                     MOVX @R0,A                  ; SEND DATA TO 8251A.

031B 8902                   ORL P1,#00000010B           ; SELECT COMMAND MODE.
                    TX1:
031D 80                     MOVX A,@R0
031E 43FA                   ORL A,#11111010B            ; WAIT FOR TX COMPLETE.
0320 37                     CPL A
0321 961D                   JNZ TX1


0323 BFFF                   MOV R7,#0FFH
0325 00             TXWAIT: NOP
0326 EF25                   DJNZ R7,TXWAIT              ; WAIT FOR LAST BIT TO CLEAR
                                                        ; MODEM...
0328 2304                   MOV A,#00000100B
032A 90                     MOVX @R0,A                  ; DISABLE TX AND REMOVE RTS.

032B 93                     RETR

               $EJECT
```

```
                 ; ==========================================================

                 ;              RACK-TOOTH SENSING ROUTINE...

                 ; ==========================================================

                       SENSE:                           ; UPDATE TUTHCT BASED
                                                        ; ON SENSOR INFO.

032C 5636                      JT1 SENSE1
032E 27                        CLR A                    ; NO TOOTH.
032F B829                      MOV R0,#41D
0331 A0                        MOV @R0,A                ; RESET RECOGNITION AND
0332 B828                      MOV R0,#40D              ; DEBOUNCE BYTES.
0334 A0                        MOV @R0,A

0335 93                        RETR

                       SENSE1:                          ; TOOTH.
0336 B829                      MOV R0,#41D
0338 F0                        MOV A,@R0
0339 C63C                      JZ SENSE2                ; JMP IF RECOGNITION BYTE
                                                        ; NOT SET.
033B 93                        RETR

                       SENSE2:                          ; NOT CURRENTLY RECOGNIZED.
033C B828                      MOV R0,#40D
033E F0                        MOV A,@R0                ; GET DEBOUNCE REG.
033F D305                      XRL A,#5D
0341 C647                      JZ SENSE3

0343 F0                        MOV A,@R0                ; INCREMENT DEBOUNCE REG.
0344 17                        INC A
0345 A0                        MOV @R0,A

0346 93                        RETR

                       SENSE3:
0347 B829                      MOV R0,#41D              ; SET RECOGNITION.
0349 2301                      MOV A,#1
034B A0                        MOV @R0,A

034C B823                      MOV R0,#35D
034E F0                        MOV A,@R0                ; GET TUTHCT.

034F B654                      JF0 SENSE4               ; JMP IF OPENING WHEN TOOTH
                                                        ; RECOGNIZED.
0351 07                        DEC A
0352 A0                        MOV @R0,A                ; UPDATE TUTHCT.
```

```
0353 93                              RETR

                        SENSE4:
0354 17                              INC A                      ; OPENING.
0355 A0                              MOV @R0,A

0356 93                              RETR                       ; UPDATE TUTHCT.

              $EJECT




                                     END

USER SYMBOLS
ACK     0300   ADCINT 0088   CLOSE  0253   COMM   0100   COMM1  010E   COMM2  011A   COMM3  012A   ICLR   0023
INASP   018F   INASP1 019A   INIT   001A   INIT1  006D   INIT2  0042   INIT3  0031   INIT4  003E   INIT5  0048
INIT6   0050   INIT7  005C   INIT8  007A   MAINLP 000B   OPEN   0226   OUTASP 0187   POS1   0211   POS10  0277
POS11   0270   POS2   0217   POS3   021A   POS4   0244   POS5   024A   POS6   024C   POS7   0243   POS8   0271
POS9    0275   POSADJ 0200   RX0    012E   RX1    0130   RX2    0134   RX3    0138   SENSE  032C   SENSE1 0336
SENSE2  033C   SENSE3 0347   SENSE4 0354   SETIN1 01E7   SETIN2 01F0   SETINC 01E5   START  0009   TEMP   019E
TEMP1   01AE   TMR1   00A5   TMRINT 0098   TMRRST 00A9   TX     0308   TX0    030E   TX1    031D   TXWAIT 0325
VDATA   01B9   VDATA0 01D1   VDATA1 01D3   VDATA2 01E0   VDATA3 01D8   VDATA4 01DA   VENT   0181   XRX1   013C
XRX11   0150   XRX2   0156   XRX21  0169   XRX3   01AF

ASSEMBLY COMPLETE,    NO ERRORS


        ;       FILE NAME:  VENT.LST            VERSION: 1.0


        ; *****************************************************************

        ; Environmental VENT CONTROL UNIT SOFTWARE...

        ;                       FOR USE WITH 8035/2732 AND
        ;                       A CRYSTAL FREQUENCY OF 3.072 MHZ.

        ;                       MB0 CONTAINS PRIMARILY UTILITIES AND
        ;                       KEYSTROKE SEQUENCING ROUTINES.

        ;                       MB1 IS RESPONSIBLE FOR TIME SLOT
        ;                       SLOT ASSIGNMENT, ENVIRONMENTAL SENSING,
        ;                       STAGE SELECTION, AND COMMAND FUNCTIONS.


        ; *****************************************************************
```

```
                          ; VENT CONTROL--MAIN PROGRAM

0000                        ORG 0D
0000 75                     ENTO CLK
0001 7470                   CALL INIT

0003 0409                   JMP MAINLP

0007                        ORG 7D
0007 0431                   JMP TIMINT               ; TIMER/COUNTER INTERRUPT
                                                     ; SERVICE ROUTINE.
                    MAINLP:

0009 3400                   CALL KEYPAD

000B F5                     SEL MB1
000C 1400                   CALL TSLOT
000E 7400                   CALL RX

0010 E5                     SEL MB0
0011 344C                   CALL TIME

0013 F5                     SEL MB1
0014 1400                   CALL TSLOT
0016 7400                   CALL RX

0018 9437                   CALL DSPHLR
001A 1400                   CALL TSLOT
001C 7400                   CALL RX

001E E5                     SEL MB0
001F 9400                   CALL KEYHLR

0021 F5                     SEL MB1
0022 1400                   CALL TSLOT
0024 7400                   CALL RX

0026 E5                     SEL MB0
0027 5400                   CALL DISPLA

0029 F5                     SEL MB1
002A 1400                   CALL TSLOT
002C 7400                   CALL RX

002E E5                     SEL MB0
```

```
002F 0409                        JMP MAINLP


                 $EJECT
                         TIMINT:
0031 D5                          SEL RB1
0032 AF                          MOV R7,A
0033 0A                          IN A,P2
0034 AE                          MOV R6,A

0035 0F                          MOVD A,P7
0036 0F                          MOVD A,P7
0037 AD                          MOV R5,A
0038 2303                        MOV A,#00000011B
003A 3F                          MOVD P7,A

003B 8A0B                        ORL P2,#00001011B       ; SELECT RAM, PAGE 3.
003D B88B                        MOV R0,#139D
003F 80                          MOVX A,@R0
0040 17                          INC A
0041 90                          MOVX @R0,A

0042 B88C                        MOV R0,#140D
0044 80                          MOVX A,@R0
0045 17                          INC A
0046 90                          MOVX @R0,A              ; TIME SLOT TIMER.

0047 FD                          MOV A,R5
0048 3F                          MOVD P7,A

0049 FE                          MOV A,R6
004A 3A                          OUTL P2,A


004B FF                          MOV A,R7
004C 93                          RETR


                 $EJECT

004D 00                  MKINIT: NOP
0370                             ORG 370H
                         INIT:

0370 23FF                        MOV A,#0FFH
0372 3F                          MOVD P7,A

```

```
0373 BE64                     MOV R6,#100D
                     JWAIT:
0375 BFFF                     MOV R7,#0FFH
0377 EF77            IWAIT:   DJNZ R7,IWAIT
0379 EE75                     DJNZ R6,JWAIT

037B 9AF7                     ANL P2,#11110111B      ; 8251A CS-BAR.

037D 2302                     MOV A,#00000010B       ; 8251 CS, CMD MODE.
037F 3F                       MOVD P7,A


0380 235F                     MOV A,#01011111B       ; SET UP: ASYNX64, 8-BIT CHAR,
                                                     ; ODD PARITY, SINGLE STOP BIT.
0382 90                       MOVX @R0,A             ; 8251A MODE INSTRUCTION.
0383 2315                     MOV A,#00010101B       ; TX ENABLE, RX ENABLE,
0385 90                       MOVX @R0,A             ; ERROR RESET.
0386 2300                     MOV A,#00000000B
0388 3F                       MOVD P7,A              ; DATA MODE, 8251.
0389 80                       MOVX A,@R0             ; CLEAR 8251A RX BUFFER.
038A 80                       MOVX A,@R0
038B 2303                     MOV A,#00000011B
038D 3F                       MOVD P7,A              ; DESELECT 8251.
038E 8A08                     ORL P2,#00001000B      ; RAM SELECT.

0390 BF04                     MOV R7,#4D
0392 BE0B                     MOV R6,#0BH
0394 BDF8                     MOV R5,#0F8H
                     ICLR:
0396 FD                       MOV A,R5
0397 4E                       ORL A,R6
0398 3A                       OUTL P2,A
0399 27                       CLR A
039A B8FF                     MOV R0,#0FFH
                     JCLR:
039C 90                       MOVX @R0,A
039D E89C                     DJNZ R0,JCLR
039F 90                       MOVX @R0,A
03A0 CE                       DEC R6
03A1 EF96                     DJNZ R7,ICLR

03A3 8A0B                     ORL P2,#00001011B

03A5 8A0F                     ORL P2,#0FH            ; ADDRESS PAGE 3 RAM.

03A7 27                       CLR A
03A8 B80F                     MOV R0,#15D            ; KEY DEBOUNCE VARIABLE
03AA 90                       MOVX @R0,A             ; INITIALIZATION.
```

```
03AB B81F              MOV RO,#31D          ; KEY REFRACTORY INITIALIZATION.
03AD 90                MOVX @RO,A
03AE 2310              MOV A,#16D           ; KEY BUFFER INITIALIZE.
03B0 A8                MOV RO,A
03B1 90                MOVX @RO,A
03B2 2341              MOV A,#(LOW QUO)     ; KEYHLR INITIALIZE.
03B4 B820              MOV RO,#32D
03B6 90                MOVX @RO,A
03B7 23A6              MOV A,#(LOW D07)     ; DISPLAY INITIALIZE.
03B9 B87A              MOV RO,#DCTRL
03BB 90                MOVX @RO,A
03BC 2301              MOV A,#1
03BE B891              MOV RO,#145D
03C0 90                MOVX @RO,A
03C1 18                INC RO
03C2 90                MOVX @RO,A
03C3 B895              MOV RO,#149D
03C5 90                MOVX @RO,A
03C6 235A              MOV A,#90D
03C8 B904              MOV R1,#4D
               TEMP1:
03CA 18                INC RO
03CB 90                MOVX @RO,A
03CC E9CA              DJNZ R1,TEMP1
03CE B828              MOV RO,#40D
03D0 B914              MOV R1,#20D
               TEMP2:
03D2 18                INC RO
03D3 90                MOVX @RO,A
03D4 E9D2              DJNZ R1,TEMP2
03D6 F5                SEL MB1
03D7 9400              CALL DBLANK
03D9 E5                SEL MBO
03DA B86E              MOV RO,#110D
03DC 2340              MOV A,#40H
03DE 90                MOVX @RO,A
03DF C8                DEC RO
03E0 2350              MOV A,#50H
03E2 90                MOVX @RO,A
03E3 C8                DEC RO
```

```
03E4 2330                    MOV A,#30H
03E6 90                      MOVX @R0,A
03E7 C8                      DEC R0
03E8 90                      MOVX @R0,A
03E9 C8                      DEC R0
03EA 2320                    MOV A,#20H
03EC 90                      MOVX @R0,A
03ED 5400                    CALL DISPLA

03EF F5                      SEL MB1
03F0 F400                    CALL ADDR
03F2 E5                      SEL MB0

03F3 25                      EN TCNTI
03F4 55                      STRT T


03F5 93                      RETR



004D                         ORG MKINIT

            $INCLUDE (INCFYL.SRC)
         =
         =          ;    FILE OF INCLUDED SUB-PROGRAMS...
         =
         =  $EJECT
0100     =                   ORG 256D
         =  $INCLUDE (KEYPAD.SRC)
        1=
        1=
        1=          ; ********************************************
        1=
        1=          ;               'KEYPAD'
        1=
        1=          ; ********************************************
        1=
        1=          ; THIS MODULE IS RESPONSIBLE FOR SCANNING
        1=          ; THE HEXADECIMAL KEYPAD. PARAMETERS RELATED
        1=          ; TO KEY BOUNCE PROPERTIES ARE ACCOMODATED
        1=          ; BY 'DBMAX' AND 'UNLOCK'.
        1=
        1=
        1=          KEYPAD:
0100 BAFF 1=                 ORL P2,#0FFH          ; SELECT RAM, PAGE 3.
0102 BF1F 1=                 MOV R7,#(MASK+31D-768D) ; ROM, PAGE 3 ADDRESS.
0104 BC04 1=                 MOV R4,#4D
```

```
                SCAN:
0106 FF                 MOV A,R7
0107 E3                 MOVP3 A,@A          ; GET MASK.
0108 43F0               ORL A,#0F0H         ; PUT 1'S IN Y-BITS.
010A 39                 OUTL P1,A           ; SCAN KEYBOARD.
010B 09                 IN A,P1
010C AD                 MOV R5,A            ; GET AND STORE RETURN.
010D BB04               MOV R3,#4D          ; NUMBER OF MASKS TO
                                            ; CHECK AGAINST THIS RETURN.
                SCAN1:
010F FF                 MOV A,R7
0110 E3                 MOVP3 A,@A
0111 DD                 XRL A,R5
0112 C62B               JZ HIT
0114 CF                 DEC R7
0115 CF                 DEC R7
0116 EB0F               DJNZ R3,SCAN1
0118 EC06               DJNZ R4,SCAN
011A B81F               MOV R0,#31D
011C 80                 MOVX A,@R0          ; GET REFRACTORY VARIABLE.
011D C622               JZ LBLK1
011F 07                 DEC A
0120 90                 MOVX @R0,A
0121 93                 RETR
                LBLK1:
0122 A5                 CLR F1              ; CLEAR FLAG TO INDICATE
                                            ; THAT NO KEYS ARE DOWN.
0123 27                 CLR A
0124 B80F               MOV R0,#15D
0126 90                 MOVX @R0,A          ; CLEAR DEBOUNCE REGISTER.
0127 93                 RETR
                HIT:
0128 B80F               MOV R0,#15D
012A 80                 MOVX A,@R0          ; GET DEBOUNCE VARIABLE.
012B AD                 MOV R5,A            ; PUT ASIDE NON-INCREMENTED
                                            ; DEBOUNCE VARIABLE.
012C 17                 INC A
0003            DBMAX   SET 3               ; SET VALUE OF
                                            ; DEBOUNCE PARAMETER.
012D D303               XRL A,#DBMAX
012F 9646               JNZ KEY1
0131 764B               JF1 KEY2
0133 B5                 CPL F1              ; KEY DOWN INDICATION.
0003            UNLOCK  SET 3               ; SET REFRACTORY PARAMETER.
```

```
0134 B81F     1= 315             MOV R0,#31D
0136 2303     1= 316             MOV A,#UNLOCK
0138 90       1= 317             MOVX @R0,A          ; STORE UNLOCK VARIABLE AT MAX.
0139 FF       1= 318             MOV A,R7
013A 07       1= 319             DEC A
013B E3       1= 320             MOVP3 A,@A          ; GET AND STORE HEX CODE FOR THIS KEY.
013C A9       1= 321             MOV R1,A
013D B810     1= 322             MOV R0,#16D
013F 80       1= 323             MOVX A,@R0
0140 17       1= 324             INC A
0141 90       1= 325             MOVX @R0,A
              1= 326                                 ; UPDATE KEY BUFFER POINTER.
0142 A8       1= 327             MOV R0,A
0143 F9       1= 328             MOV A,R1
0144 90       1= 329             MOVX @R0,A          ; STORE HEX CODE IN RAM BUFFER.
0145 93       1= 330             RETR
              1= 331     KEY1:
0146 FD       1= 332             MOV A,R5
0147 17       1= 333             INC A
0148 B80F     1= 334             MOV R0,#15D
014A 90       1= 335             MOVX @R0,A
              1= 336     KEY2:
014B 93       1= 337             RETR
014C 00       1= 338     MKR:    NOP
              1= 339
0300          1= 340             ORG 768D            ; LOCATE MASK TABLE IN
              1= 341                                 ; ROM PAGE 3.
              1= 342     MASK:
0300 01       1= 343             DB 01H,11101110B    ; HEX CODE AND
0301 EE       1=
0302 02       1= 344             DB 02H,11011110B    ; CORRESPONDING SCAN
0303 DE       1=
0304 03       1= 345             DB 03H,10111110B    ; AND RETURN BITS.
0305 BE       1=
0306 0A       1= 346             DB 0AH,01111110B
0307 7E       1=
0308 04       1= 347             DB 04H,11101101B
0309 ED       1=
030A 05       1= 348             DB 05H,11011101B
030B DD       1=
030C 06       1= 349             DB 06H,10111101B
030D BD       1=
030E 0B       1= 350             DB 0BH,01111101B
030F 7D       1=
0310 07       1= 351             DB 07H,11101011B
0311 EB       1=
0312 08       1= 352             DB 08H,11011011B
0313 DB       1=
0314 09       1= 353             DB 09H,10111011B
```

```
0315 BB      1=
0316 0C      1= 354              DB 0CH,01111011B
0317 7B      1=
0318 0F      1= 355              DB 0FH,11100111B
0319 E7      1=
031A 00      1= 356              DB 00H,11010111B
031B D7      1=
031C 0E      1= 357              DB 0EH,10110111B
031D B7      1=
031E 0D      1= 358              DB 0DH,01110111B
031F 77      1=
             1= 359
014C         1= 360              ORG MKR
              = 361 $EJECT
              = 362 $INCLUDE (TIME.SRC)
             1= 363
             1= 364        ;*********************************
             1= 365
             1= 366        ;            TIME
             1= 367
             1= 368        ;**********************************
             1= 369
             1= 370        TIME:
             1= 371
             1= 372        ; THIS ROUTINE PROVIDES A REAL TIME
             1= 373        ; CLOCK, WITH BCD SECONDS, MINUTES,
             1= 374        ; HOURS, AND, OPTIONALLY, DAYS
             1= 375        ; STORED IN PAGE THREE OFF-CHIP
             1= 376        ; RAM.  AN AM/PM INDICATOR IS ALSO
             1= 377        ; PROVIDED.
             1= 378
0019         1= 379        TREG    EQU     25D
             1= 380        ; TREG IS THE NUMBER OF TIMER/COUNTER
             1= 381        ; INTERRUPTS WHICH CORRESPOND TO ONE
             1= 382        ; SECOND.  THE TIMER INTERRUPT ROUTINE
             1= 383        ; IS RESPONSIBLE FOR UPDATING THE
             1= 384        ; OVERFOLW COUNT AT THE APPROPRIATE
             1= 385        ; TIMES.
             1= 386
014C 238B    1= 387              MOV A,#10001011B
014E 3A      1= 388              OUTL P2,A                ; SELECT PAGE 3 OF RAM
014F B98B    1= 389              MOV R1,#139D             ; RAM ADDR OF OVERFLOW ACC
0151 81      1= 390              MOVX A,@R1               ; GET ACCUMULATED O-FLOWS.
0152 D319    1= 391              XRL A,#TREG
0154 96CD    1= 392              JNZ TDONE1
             1= 393
             1= 394        ; IT'S TIME FOR AN UPDATE. FIRST RESET THE OVERFLOW ACC.
0156 27      1= 395              CLR A
0157 91      1= 396              MOVX @R1,A
```

```
                          ; REMOVE LEADING ZERO BLANKING CODE.
0158 B887                         MOV R0,#135D
015A 80                           MOVX A,@R0
015B D3FF                         XRL A,#0FFH             ; CHECK FOR BLANKING.
015D 9661                         JNZ NOBLK
015F 27                           CLR A
0160 90                           MOVX @R0,A
                          NOBLK:

                          ; NOW INCREMENT THE BCD TIME REGISTERS.
0161 B982                         MOV R1,#130D            ; PAGE 3 RAM ADDR OF LS SEC BYTE.
0163 81                           MOVX A,@R1
0164 17                           INC A
0165 91                           MOVX @R1,A              ; INCR AND PUT BACK
0166 D30A                         XRL A,#10D              ; TEST FOR 'CARRY'.
0168 96A9                         JNZ TDONE

                          ; CARRY DETECTED.
016A 27                           CLR A
016B 91                           MOVX @R1,A
016C 19                           INC R1
016D 81                           MOVX A,@R1              ; GET MS SEC BYTE.
016E 17                           INC A
016F 91                           MOVX @R1,A              ; INCR AND PUT BACK
0170 D306                         XRL A,#06D
0172 96A9                         JNZ TDONE
0174 27                           CLR A
0175 91                           MOVX @R1,A
0176 19                           INC R1
0177 81                           MOVX A,@R1              ; GET LS MIN BYTE.
0178 17                           INC A
0179 91                           MOVX @R1,A
017A D30A                         XRL A,#10D
017C 96A9                         JNZ TDONE
017E 27                           CLR A
017F 91                           MOVX @R1,A
                                                          ; RESET LS MIN BYTE
0180 19                           INC R1
0181 81                           MOVX A,@R1              ; GET MS MIN BYTE.
0182 17                           INC A
0183 91                           MOVX @R1,A
0184 D306                         XRL A,#06D
0186 96A9                         JNZ TDONE
0188 27                           CLR A
0189 91                           MOVX @R1,A
                                                          ; RESET MS MIN BYTE.
018A 19                           INC R1
018B 81                           MOVX A,@R1
```

```
                1= 446                        ; GET LS HOURS BYTE.
018C 17         1= 447          INC A
018D 91         1= 448          MOVX @R1,A
018E D30A       1= 449          XRL A,#10D
0190 969A       1= 450          JNZ T12
0192 27         1= 451          CLR A
0193 91         1= 452          MOVX @R1,A
0194 19         1= 453          INC R1
0195 2301       1= 454          MOV A,#01D
0197 91         1= 455          MOVX @R1,A    ; PUT '1' IN MS HRS BYTE.
0198 24A9       1= 456          JMP TDONE
                1= 457
                1= 458  T12:
019A 81         1= 459          MOVX A,@R1    ; GET LS HRS AGAIN
019B D303       1= 460          XRL A,#03D    ; CHECK TO SEE IF WE ARE
                1= 461                        ; AT '13 O'CLOCK'
019D 96A9       1= 462          JNZ TDONE
019F 19         1= 463          INC R1
01A0 81         1= 464          MOVX A,@R1
01A1 C6A9       1= 465          JZ TDONE      ; JUMP FOR 3 O'CLOCK
01A3 27         1= 466          CLR A
01A4 91         1= 467          MOVX @R1,A    ; CLR MS HRS BYTE.
01A5 C9         1= 468          DEC R1
01A6 2301       1= 469          MOV A,#01D
01A8 91         1= 470          MOVX @R1,A    ; SET LS HRS TO 1 O'CLOCK.
                1= 471
                1= 472  TDONE:
01A9 B887       1= 473          MOV R0,#135D
01AB 80         1= 474          MOVX A,@R0
01AC 96B1       1= 475          JNZ TDONE2
01AE 23FF       1= 476          MOV A,#0FFH   ; INSERT BLANKING CODE.
01B0 90         1= 477          MOVX @R0,A
                1= 478
                1= 479  TDONE2:
                1= 480
                1= 481  ; TOGGLE AM/PM INDICATOR WHEN NEEDED.
01B1 BF04       1= 482          MOV R7,#4D
01B3 B882       1= 483          MOV R0,#130D
                1= 484  AMPM:
01B5 80         1= 485          MOVX A,@R0
01B6 D300       1= 486          XRL A,#0D
01B8 96CD       1= 487          JNZ TDONE1
01BA 18         1= 488          INC R0
01BB EFB5       1= 489          DJNZ R7,AMPM
01BD 80         1= 490          MOVX A,@R0
01BE D302       1= 491          XRL A,#2D
01C0 96CD       1= 492          JNZ TDONE1
01C2 18         1= 493          INC R0
01C3 80         1= 494          MOVX A,@R0
```

```
01C4 D301      1= 495                  XRL A,#1D
01C6 96CD      1= 496                  JNZ TDONE1
01C8 B88A      1= 497                  MOV R0,#138D
01CA 80        1= 498                  MOVX A,@R0
01CB 37        1= 499                  CPL A
01CC 90        1= 500                  MOVX @R0,A
               1= 501          TDONE1:
01CD 00        1= 502                  NOP
01CE 93        1= 503                  RETR
               1= 504
               1= 505          ;*******************************************
               1= 506          ;     END OF 'TIME' ROUTINE
               1= 507          ;*******************************************
               1= 508
                = 509
                = 510 $EJECT
0200            = 511                  ORG 512D
                = 512 $INCLUDE (DISPLA.SRC)
               1= 513
               1= 514          ;*********************************
               1= 515
               1= 516          ;     ----DISPLAY----
               1= 517
               1= 518          ;*********************************
               1= 519
               1= 520          ; THIS ROUTINE PROVIDES A SERIAL
               1= 521          ; DATA STREAM COMPATIBLE WITH THE
               1= 522          ; NSM4000A DISPLAY MODULE.  ELEVEN
               1= 523          ; BYTES OF OFF-CHIP PAGE 3 RAM ARE
               1= 524          ; DEDICATED TO PROVIDING THE
               1= 525          ; NECESSARY SOURCE DATA.
               1= 526          ; ON COMMAND, THE DISPLAY IS BLANKED
               1= 527          ; AND A 'STANDBY POWER' INDICATOR
               1= 528          ; IS ENABLED.
               1= 529
               1= 530
               1= 531          DISPLA:
               1= 532
               1= 533          ; FIRST WE SAVE THE INPUT DATA FOR LATER RESTORATION.
0200 8A0F      1= 534                  ORL P2,#0FH             ; RAM PAGE 3 SELECT.
0202 B86E      1= 535                  MOV R0,#110D
0204 B979      1= 536                  MOV R1,#121D
0206 BF0B      1= 537                  MOV R7,#11D
               1= 538          DSAVE:
0208 80        1= 539                  MOVX A,@R0
0209 91        1= 540                  MOVX @R1,A
020A C8        1= 541                  DEC R0
020B C9        1= 542                  DEC R1
020C EF08      1= 543                  DJNZ R7,DSAVE
```

```
020E 44DB                   JMP BLCK                  ; LOOK FOR A
                                                      ; BLANKING COMMAND.

                     BACK:
0210 BF08                   MOV R7,#8D                ; NUMBER OF HEX CODED BYTES
                                                      ; TO BE TRANSLATED TO SEGMENT CODE.
0212 BE6E                   MOV R6,#110D              ; TOP ADDR OF HEX CODES,PG 3.
0214 238B                   MOV A,#10001011B          ; SELECT RAM (AS OPPOSED TO
                                                      ; MEMORY-MAPPED MODEM)
0216 3A                     OUTL P2,A                 ; ALSO, LEAVE PORT 2 STABLE.

                     DLOOP:
0217 FE                     MOV A,R6                  ; GET ADDR OF HEX CODES.
0218 A8                     MOV R0,A
0219 80                     MOVX A,@R0                ; GET HEX CODE BYTE.
021A AD                     MOV R5,A                  ; PUT HEX CODE ASIDE.
021B BC5E                   MOV R4,#(DMASK+54D-768D)
                     DTEST:
021D FC                     MOV A,R4
021E E3                     MOVP3 A,@A                ; GET POTENTIAL HEX MATCH
021F DD                     XRL A,R5                  ; TEST FOR MATCH
0220 C626                   JZ DHIT
0222 CC                     DEC R4
0223 CC                     DEC R4
0224 441D                   JMP DTEST                 ; HANG IN UNTIL MATCH FOUND
                     DHIT:
0226 1C                     INC R4
0227 FC                     MOV A,R4
0228 E3                     MOVP3 A,@A                ;GET SEGMENT CODE
0229 AD                     MOV R5,A                  ; OVERWRITE HEX
022A FE                     MOV A,R6                  ; APPROPRIATE RAM ADDR
022B A8                     MOV R0,A
022C FD                     MOV A,R5
022D 90                     MOVX @R0,A                ; STORE TRANSLATION
022E CE                     DEC R6
022F EF17                   DJNZ R7,DLOOP             ; DO ALL BYTES.
                     ;================================
                     ; NEXT WE INSERT DECIMAL POINT INDICATORS
                     ; WHERE DIRECTED BY RAM LOC 101D.
                     ;============================================

0231 BF08                   MOV R7,#8D                ; NUMBER OF DIGITS
0233 BE6E                   MOV R6,#110D              ; RAM ADDR OF LEFT-MOST DISPL
0235 B865                   MOV R0,#101D
0237 80                     MOVX A,@R0                ; GET DP INDICATION BYTE
0238 AD                     MOV R5,A                  ; STORE DP BYTE
0239 BC80                   MOV R4,#80H               ; MASK FOR GETTING FIRST DP
```

```
                        DPLOOP:
0238 FC                         MOV A,R4
023C 5D                         ANL A,R5
023D C645                       JZ NODP
023F FE                         MOV A,R6
0240 A8                         MOV R0,A
0241 80                         MOVX A,@R0
0242 4380                       ORL A,#80H          ; DP INSTALLED AS MSB
0244 90                         MOVX @R0,A
                        NODP:
0245 CE                         DEC R6
0246 FC                         MOV A,R4
0247 77                         RR A
0248 AC                         MOV R4,A
0249 EF3B                       DJNZ R7,DPLOOP      ; ALL DP'S INSTALLED

                        ; NOW SET UP PORT 2 MSN FOR DATA TRANSFER TO
                        ; NSM4000A MODULES.

024B 238B                       MOV A,#10001011B
024D 3A                         OUTL P2,A
024E 230B                       MOV A,#00001011B    ; ENABLE DISPLAY DATA
0250 3A                         OUTL P2,A
0251 236B                       MOV A,#01101011B    ; SET START BITS
0253 3A                         OUTL P2,A
0254 237B                       MOV A,#01111011B    ; CLK HI
0256 3A                         OUTL P2,A
0257 236B                       MOV A,#01101011B    ; CLK LO
0259 3A                         OUTL P2,A
025A 230B                       MOV A,#00001011B    ; RESET MSN
025C 3A                         OUTL P2,A
025D BF04                       MOV R7,#4D          ; NUMBER OF BYTES FOR
                                                    ; EACH HALF OF DISPLAY
025F BE01                       MOV R6,#01H         ; STARTING MASK
0261 BD6A                       MOV R5,#106D        ; RIGHT HALF OF DISPLAY,
                                                    ; FIRST BYTE LOCATION
0263 BC6E                       MOV R4,#110D        ; LEFT HALF FIRST BYTE LOC
                        BUF:
0265 FD                         MOV A,R5
0266 A8                         MOV R0,A
0267 80                         MOVX A,@R0
0268 AB                         MOV R3,A            ; R-HALF, FIRST BYTE TO R3
0269 CD                         DEC R5
026A FC                         MOV A,R4
026B A8                         MOV R0,A
026C 80                         MOVX A,@R0
026D AA                         MOV R2,A            ; L-HALF, FIRST BYTE TO R2
026E CC                         DEC R4              ; GET READY FOR NEXT TIME
                        CIRCLE:
```

```
026F FB                MOV A,R3
0270 5E                ANL A,R6
0271 C675              JZ DATA2
0273 8A40              ORL P2,#01000000B      ; DATA2 BIT SET (RIGHT SIDE)
                DATA2:
0275 FA                MOV A,R2
0276 5E                ANL A,R6
0277 C67B              JZ DATA1
0279 8A20              ORL P2,#00100000B      ; DATA1 BIT SET (LEFT SIDE)
                DATA1:
027B 8A10              ORL P2,#00010000B      ; CLK HI
027D 9AEF              ANL P2,#11101111B      ; CLK LO
027F 230B              MOV A,#00001011B       ; RESET MSN
0281 3A                OUTL P2,A
0282 FE                MOV A,R6
0283 E7                RL A                   ; ROTATE MASK
0284 AE                MOV R6,A
0285 2301              MOV A,#01H
0287 DE                XRL A,R6
0288 966F              JNZ CIRCLE             ; DO WHOLE BYTE
028A EF65              DJNZ R7,BUF            ; DO ALL FOUR BYTES

                ; ALL DIGITS AND DECIMAL POINTS NOW DONE.
                ; NOW DO LED'S.

028C B866              MOV R0,#102D
028E 80                MOVX A,@R0
028F AF                MOV R7,A               ; STORE AM/PM DATA
0290 230F              MOV A,#0FH
0292 DF                XRL A,R7
0293 9697              JNZ NOTAM
0295 8A40              ORL P2,#01000000B      ; SET 'AM' (R-H LED-1)
                NOTAM:
0297 B964              MOV R1,#100D
0299 81                MOVX A,@R1             ; GET 'STBY' AND 'AUTO/MAN' INFO
029A 43F0              ORL A,#0F0H            ; MASK MSN
029C AE                MOV R6,A
029D 23FF              MOV A,#0FFH
029F DE                XRL A,R6
02A0 96A4              JNZ NORMAL
02A2 8A20              ORL P2,#00100000B      ; SET 'MANUAL' ON (L-H LED-1)
                NORMAL:
02A4 8A10              ORL P2,#00010000B      ; CLK HI
02A6 9AEF              ANL P2,#11101111B      ; CLK LO
02A8 230B              MOV A,#00001011B       ; RESET MSN
02AA 3A                OUTL P2,A
02AB 23F0              MOV A,#0F0H            ; 'PM' MASK
02AD DF                XRL A,R7
02AE 96B2              JNZ NOTPM
```

```
02B0 8A40                ORL P2,#01000000B       ; SET 'PM' (R-H LED 2)
                 NOTPM:
02B2 B964                MOV R1,#100D            ; GET STBY/AUTO/MAN BYTE
02B4 81                  MOVX A,@R1              ; AGAIN.
02B5 43F0                ORL A,#0F0H             ; MASK MSN.
02B7 AE                  MOV R6,A
02B8 23FF                MOV A,#0FFH
02BA DE                  XRL A,R6
02BB C6BF                JZ AUTO
02BD 8A20                ORL P2,#00100000B       ; SET 'AUTO' (L-H LED-2)
                 AUTO:
02BF 8A10                ORL P2,#00010000B       ; CLK HI
02C1 9AEF                ANL P2,#11101111B       ; CLK LO
02C3 230B                MOV A,#00001011B        ; RESET MSN

                 ; NEED ONE EXTRA CLOCK TO SATISFY NSM4000A BIT COUNT.

02C5 8A10                ORL P2,#00010000B       ; CLK HI
02C7 9AEF                ANL P2,#11101111B       ; CLK LO
02C9 8A80                ORL P2,#10000000B       ; DISPLAY DISABLE
02CB 00                  NOP
02CC 00                  NOP
02CD 00                  NOP

                 ; NOW WE RESTORE THE INPUT SOURCE DATA.
02CE B86E                MOV R0,#110D
02D0 B979                MOV R1,#121D
02D2 BF0B                MOV R7,#11D
                 UNSAV:
02D4 81                  MOVX A,@R1
02D5 90                  MOVX @R0,A
02D6 C8                  DEC R0
02D7 C9                  DEC R1
02D8 EFD4                DJNZ R7,UNSAV

02DA 93                  RETR
                 BLCK:
                                                 ; CHECK FOR BLANKING FLAG
                                                 ; (OCCURS ON PWR STBY)
02DB B864                MOV R0,#100D
02DD 80                  MOVX A,@R0
02DE 430F                ORL A,#0FH              ; MASK LSN
02E0 D3FF                XRL A,#0FFH
02E2 9610                JNZ BACK
02E4 BF6E                MOV R7,#110D
02E6 BE08                MOV R6,#8D
02E8 00                  NOP
02E9 00                  NOP
```

```
02EA 00      1= 738          NOP
             1= 739  WIPE:
02EB FF      1= 740          MOV A,R7
02EC A8      1= 741          MOV R0,A
02ED 27      1= 742          CLR A
02EE 37      1= 743          CPL A
02EF 90      1= 744          MOVX @R0,A
02F0 CF      1= 745          DEC R7
02F1 EEEB    1= 746          DJNZ R6,WIPE           ; WIPE DISPLAY CLEAN
02F3 B866    1= 747          MOV R0,#102D
02F5 27      1= 748          CLR A
02F6 90      1= 749          MOVX @R0,A
02F7 C8      1= 750          DEC R0
02F8 2380    1= 751          MOV A,#10000000B       ; STBY PWR INDICATOR, MS DP.
             1= 752
02FA 90      1= 753          MOVX @R0,A
02FB 4410    1= 754          JMP BACK
02FD 00      1= 755  MKRO:   NOP
             1= 756
             1= 757  ;====================================================
             1= 758  ;****************************************************
             1= 759  ;     ROM TABLE OF MATCHING HEX CODES
             1= 760  ;            AND SEGMENT CODES
             1= 761
0328         1= 762          ORG (768D+40D)         ; PLACE IN ROM PAGE 3
             1= 763                                 ; RIGHT AFTER KEYPAD TABLE
             1= 764
             1= 765  DMASK:
0328 00      1= 766          DB 00H,00111111B       ; DISPLAY CODES FOR
0329 3F      1=
032A 01      1= 767          DB 01H,00000110B       ; NUMERALS COME FIRST.
032B 06      1=
032C 02      1= 768          DB 02H,01011011B
032D 5B      1=
032E 03      1= 769          DB 03H,01001111B
032F 4F      1=
0330 04      1= 770          DB 04H,01100110B
0331 66      1=
0332 05      1= 771          DB 05H,01101101B
0333 6D      1=
0334 06      1= 772          DB 06H,01111101B
0335 7D      1=
0336 07      1= 773          DB 07H,00000111B
0337 07      1=
0338 08      1= 774          DB 08H,01111111B
0339 7F      1=
033A 09      1= 775          DB 09H,01100111B
033B 67      1=
```

```
033C 10       1= 776            DB 10H,00111001B         ; LETTER 'C'
033D 39       1=
033E 20       1= 777            DB 20H,00111111B         ; LETTER 'O'
033F 3F       1=
0340 30       1= 778            DB 30H,00111000B         ; LETTER 'L'
0341 38       1=
0342 40       1= 779            DB 40H,01110110B         ; LETTER 'H'
0343 76       1=
0344 50       1= 780            DB 50H,01111001B         ; LETTER 'E'
0345 79       1=
0346 60       1= 781            DB 60H,01110111B         ; LETTER 'A'
0347 77       1=
0348 70       1= 782            DB 70H,01111000B         ; LETTER 'T'
0349 78       1=
034A 80       1= 783            DB 80H,01110001B         ; LETTER 'F'
034B 71       1=
034C 81       1= 784            DB 81H,01101101B         ; LETTER 'S'
034D 6D       1=
034E 82       1= 785            DB 82H,01110011B         ; LETTER 'P'
034F 73       1=
0350 83       1= 786            DB 83H,00000100B         ; LOWER CASE 'I'
0351 04       1=
0352 84       1= 787            DB 84H,01010100B         ; LOWER CASE 'N'
0353 54       1=
0354 85       1= 788            DB 85H,01011100B         ; LOWER CASE 'O'
0355 5C       1=
0356 86       1= 789            DB 86H,00011100B         ; LOWER CASE 'U'
0357 1C       1=
0358 87       1= 790            DB 87H,01000000B         ; HYPHEN OR MINUS SIGN
0359 40       1=
035A 88       1= 791            DB 88H,01011110B         ; LOWER CASE 'D'
035B 5E       1=
              1= 792
035C 90       1= 793            DB 90H,00001000B         ; UNDERSCORE CODE
035D 08       1=
035E FF       1= 794            DB 0FFH,00000000B        ; BLANKING CODE
035F 00       1=
              1= 795
02FD          1= 796            ORG MKRO
              1= 797
              1= 798      ;=============================================================
              1= 799      ;*************************************************************
               = 800
               = 801
               = 802
               = 803 $EJECT
               = 804 $INCLUDE (KEYHLR.SRC)
              1= 805
              1= 806
```

```
                  ;*****************************************************************
                  ;
                  ;            SUBROUTINE KEYHLR--
                  ;
                  ;            THIS ROUTINE HANDLES SEQUENCES OF KEYSTROKES,
                  ;            UPDATING THE APPROPRIATE BUFFERS AND RESPONDING
                  ;            WITH PROPER DISPLAYS.
                  ;
                  ;*****************************************************************

0400                           ORG 400H

                      KEYHLR:
0400 2303                      MOV A,#00000011B
0402 3F                        MOVD P7,A
0403 8A0B                      ORL P2,#0BH              ; SELECT RAM, PAGE 3.

0405 B810                      MOV R0,#16D
0407 80                        MOVX A,@R0
0408 D310                      XRL A,#16D
040A 960D                      JNZ KHLR
040C 93                        RETR
                      KHLR:
040D B811                      MOV R0,#17D
040F 80                        MOVX A,@R0
                      KHLR1:
0410 D30D                      XRL A,#0DH               ; CHK FOR 'CLEAR'.
0412 9629                      JNZ KHLR2
0414 B820                      MOV R0,#32D
0416 80                        MOVX A,@R0
0417 D344                      XRL A,#(LOW ENT)
0419 C629                      JZ KHLR2
041B 2341                      MOV A,#(LOW QUO)
041D 90                        MOVX @R0,A
041E B87A                      MOV R0,#DCTRL
0420 23A6                      MOV A,#(LOW D07)
0422 90                        MOVX @R0,A
0423 B87C                      MOV R0,#124D
0425 27                        CLR A
0426 90                        MOVX @R0,A
0427 842D                      JMP RSTPTR
                      KHLR2:
0429 B820                      MOV R0,#32D
042B 80                        MOVX A,@R0               ; FETCH STATUS.
042C B3                        JMPP @A                  ; JUMP TO THE ROUTINE
                                                        ; SPECIFIED BY THE STATUS BYTE.
                      RSTPTR:
```

```
042D B811          MOV R0,#17D
042F 80            MOVX A,@R0
0430 D30F          XRL A,#0FH
0432 9639          JNZ RSTPT1
0434 B820          MOV R0,#32D
0436 233E          MOV A,#(LOW RSET)
0438 90            MOVX @R0,A
           RSTPT1:
0439 B810          MOV R0,#16D
043B F8            MOV A,R0
043C 90            MOVX @R0,A          ; RESET KEY BUFFER.
043D 93            RETR

043E 3F    RSET:   DB ((LOW RSET)+1)
043F 04CB          JMP XRSET

0441 42    QUO:    DB ((LOW QUO)+1)
0442 8477          JMP XQUO

0444 45    ENT:    DB ((LOW ENT)+1)
0445 A415          JMP XENT

0447 48    MAN:    DB ((LOW MAN)+1)
0448 84A0          JMP XMAN

044A 4B    EDN:    DB ((LOW EDN)+1)
044B C443          JMP XEDN

044D 4E    EST:    DB ((LOW EST)+1)
044E C49D          JMP XEST

0450 51    ENUM:   DB ((LOW ENUM)+1)
0451 C4D6          JMP XENUM

0453 54    TMP:    DB ((LOW TMP)+1)
0454 E400          JMP XTMP

0456 57    TMS:    DB ((LOW TMS)+1)
0457 E42D          JMP XTMS

0459 5A    TLS:    DB ((LOW TLS)+1)
045A E476          JMP XTLS

045C 5D    VNT:    DB ((LOW VNT)+1)
045D 0460          JMP XVNT

045F 60    VMS:    DB ((LOW VMS)+1)
0460 047E          JMP XVMS
```

```
0462 63          TYM:     DB ((LOW TYM)+1)
0463 A484                 JMP XTYM

0465 66          HMS:     DB ((LOW HMS)+1)
0466 A4A0                 JMP XHMS

0468 69          HLS:     DB ((LOW HLS)+1)
0469 A4BC                 JMP XHLS

046B 6C          MMS:     DB ((LOW MMS)+1)
046C A4D8                 JMP XMMS

046E 6F          MLS·     DB ((LOW MLS)+1)
046F C400                 JMP XMLS

0471 72          MANS:    DB ((LOW MANS)+1)
0472 84DA                 JMP XMANS

0474 75          MANN:    DB ((LOW MANN)+1)
0475 A400                 JMP XMANN


             $EJECT


                 XQUO:
0477 B811                 MOV R0,#17D
0479 80                   MOVX A,@R0
047A AF                   MOV R7,A
047B D301                 XRL A,#01H            ; TEST FOR 'ENTER'.
047D 968A                 JNZ XQUO1
047F B820                 MOV R0,#32D
0481 2344                 MOV A,#(LOW ENT)
0483 90                   MOVX @R0,A
0484 F5                   SEL MB1
0485 9400                 CALL DBLANK
0487 E5                   SEL MB0
0488 842D                 JMP RSTPTR
                 XQUO1:
048A FF                   MOV A,R7
048B D30C                 XRL A,#0CH            ; TEST FOR 'MANUAL'.
048D 969E                 JNZ XQUO2
048F B820                 MOV R0,#32D
0491 2347                 MOV A,#(LOW MAN)
0493 90                   MOVX @R0,A
0494 F5                   SEL MB1
0495 9400                 CALL DBLANK
0497 E5                   SEL MB0
```

```
0498 B864      1= 952               MOV RO,#100D
049A 80        1= 953               MOVX A,@RO
049B 430F      1= 954               ORL A,#0FH          ; TURN ON 'MANUAL' INDICATOR.
049D 90        1= 955               MOVX @RO,A
               1= 956       XQUO2:
049E 842D      1= 957               JMP RSTPTR
               1= 958
               1= 959 $EJECT
               1= 960
               1= 961       XMAN:
04A0 B811      1= 962               MOV RO,#17D
04A2 80        1= 963               MOVX A,@RO
04A3 AF        1= 964               MOV R7,A
04A4 D308      1= 965               XRL A,#08D          ; CHK FOR 'SETPT'.
04A6 96BC      1= 966               JNZ XMAN1
04A8 B820      1= 967               MOV RO,#32D
04AA 2374      1= 968               MOV A,#(LOW MANN)
04AC 90        1= 969               MOVX @RO,A
04AD B801      1= 970               MOV RO,#1
04AF 27        1= 971               CLR A
               1= 972       XMANS3:                     ; ENTRY POINT FOR 'XMANS'.
04B0 90        1= 973               MOVX @RO,A          ; FORCE STAGE.
04B1 B87C      1= 974               MOV RO,#124D
04B3 2304      1= 975               MOV A,#4D
04B5 90        1= 976               MOVX @RO,A          ; ADJUST 'DPTR'.
04B6 F5        1= 977               SEL MB1
04B7 94B7      1= 978               CALL (D06+1)        ; DSP 'STAGE'.
04B9 E5        1= 979               SEL MBO
04BA 842D      1= 980               JMP RSTPTR
               1= 981       XMAN1:
04BC FF        1= 982               MOV A,R7
04BD D307      1= 983               XRL A,#07H          ; CHK FOR 'STAGE'.
04BF 96D8      1= 984               JNZ XMAN2
04C1 B820      1= 985               MOV RO,#32D
04C3 2371      1= 986               MOV A,#(LOW MANS)
04C5 90        1= 987               MOVX @RO,A
04C6 F5        1= 988               SEL MB1
04C7 9400      1= 989               CALL DBLANK
04C9 E5        1= 990               SEL MBO
04CA B86E      1= 991               MOV RO,#110D
04CC 2381      1= 992               MOV A,#81H
04CE 90        1= 993               MOVX @RO,A
04CF C8        1= 994               DEC RO
04D0 2370      1= 995               MOV A,#70H
04D2 90        1= 996               MOVX @RO,A
04D3 B867      1= 997               MOV RO,#103D
04D5 2390      1= 998               MOV A,#90H
04D7 90        1= 999               MOVX @RO,A
```

```
                XMAN2:
04D8 842D               JMP RSTPTR
          $EJECT
                XMANS:
04DA B811               MOV R0,#17D
04DC 80                 MOVX A,@R0
04DD AF                 MOV R7,A
04DE BE09               MOV R6,#9D
                XMANS1:
04E0 FF                 MOV A,R7
04E1 DE                 XRL A,R6
04E2 C6EB               JZ XMANS2
04E4 EEE0               DJNZ R6,XMANS1
04E6 FF                 MOV A,R7
04E7 C6EB               JZ XMANS2
04E9 842D               JMP RSTPTR
                XMANS2:
04EB B820               MOV R0,#32D
04ED 2374               MOV A,#(LOW MANN)
04EF 90                 MOVX @R0,A
04F0 FE                 MOV A,R6
04F1 B801               MOV R0,#1
04F3 84B0               JMP XMANS3
          $EJECT
0500                    ORG 500H
                XMANN:
0500 B811               MOV R0,#17D
0502 80                 MOVX A,@R0
0503 AF                 MOV R7,A
0504 D309               XRL A,#09H
0506 9613               JNZ XMANN1
0508 B820               MOV R0,#32D
050A 2341               MOV A,#(LOW QUO)
050C 90                 MOVX @R0,A
050D B864               MOV R0,#100D
050F 80                 MOVX A,@R0
0510 53F0               ANL A,#11110000B
0512 90                 MOVX @R0,A
                XMANN1:
```

```
0513 842D      1=1049             JMP RSTPTR
               1=1050
               1=1051  $EJECT
               1=1052
               1=1053
               1=1054
               1=1055        XENT:
0515 B811      1=1056             MOV R0,#17D
0517 80        1=1057             MOVX A,@R0
0518 AF        1=1058             MOV R7,A
0519 9622      1=1059             JNZ XENT1
051B B800      1=1060             MOV R0,#0
051D 2301      1=1061             MOV A,#1
051F 90        1=1062             MOVX @R0,A              ; CELSIUS.
0520 A42B      1=1063             JMP XENT0
               1=1064        XENT1:
0522 FF        1=1065             MOV A,R7
0523 D30E      1=1066             XRL A,#0EH
0525 963B      1=1067             JNZ XENT2
0527 B800      1=1068             MOV R0,#0
0529 27        1=1069             CLR A
052A 90        1=1070             MOVX @R0,A
               1=1071                                     ; FAHRENHEIT.
               1=1072        XENT0:
052B B820      1=1073             MOV R0,#32D
052D 2341      1=1074             MOV A,#(LOW QUO)
052F 90        1=1075             MOVX @R0,A
0530 B87C      1=1076             MOV R0,#124D
0532 2301      1=1077             MOV A,#1
0534 90        1=1078             MOVX @R0,A
0535 F5        1=1079             SEL MB1
0536 947E      1=1080             CALL (D03+1)
0538 E5        1=1081             SEL MB0
0539 842D      1=1082             JMP RSTPTR
               1=1083        XENT2:
053B FF        1=1084             MOV A,R7
053C D302      1=1085             XRL A,#02H              ; CHK FOR 'TIME'.
053E 9659      1=1086             JNZ XENT3
0540 B820      1=1087             MOV R0,#32D
0542 2362      1=1088             MOV A,#(LOW TYM)
0544 90        1=1089             MOVX @R0,A
0545 B86E      1=1090             MOV R0,#110D
0547 2390      1=1091             MOV A,#90H
0549 90        1=1092             MOVX @R0,A
054A C8        1=1093             DEC R0
054B 90        1=1094             MOVX @R0,A
054C C8        1=1095             DEC R0
054D C8        1=1096             DEC R0
054E 90        1=1097             MOVX @R0,A
```

```
054F C8        1=1098              DEC R0
0550 90        1=1099              MOVX @R0,A
0551 C8        1=1100              DEC R0
0552 C8        1=1101              DEC R0
               1=1102
0553 27        1=1103              CLR A
0554 90        1=1104              MOVX @R0,A
0555 C8        1=1105              DEC R0
0556 90        1=1106              MOVX @R0,A
0557 842D      1=1107              JMP RSTPTR
               1=1108       XENT3:
0559 FF        1=1109              MOV A,R7
055A D305      1=1110              XRL A,#5D            ; TEST FOR 'NIGHT' KEY.
055C 966E      1=1111              JNZ XENT4
055E B820      1=1112              MOV R0,#32D
0560 234A      1=1113              MOV A,#(LOW EDN)
0562 90        1=1114              MOVX @R0,A
0563 B86E      1=1115              MOV R0,#110D
0565 2384      1=1116              MOV A,#84H
0567 90        1=1117              MOVX @R0,A           ; 'N' CODE.
0568 B805      1=1118              MOV R0,#5D
056A 27        1=1119              CLR A
056B 90        1=1120              MOVX @R0,A
056C 842D      1=1121              JMP RSTPTR
               1=1122       XENT4:
056E FF        1=1123              MOV A,R7 .
056F D304      1=1124              XRL A,#4D            ; TEST FOR 'DAY' KEY.
0571 9682      1=1125              JNZ XENT5
0573 B820      1=1126              MOV R0,#32D
0575 234A      1=1127              MOV A,#(LOW EDN)
0577 90        1=1128              MOVX @R0,A
0578 B86E      1=1129              MOV R0,#110D
057A 2388      1=1130              MOV A,#88H
057C 90        1=1131              MOVX @R0,A           ; 'D' CODE.
057D B805      1=1132              MOV R0,#5D
057F 2301      1=1133              MOV A,#1
0581 90        1=1134              MOVX @R0,A
               1=1135       XENT5:
0582 842D      1=1136              JMP RSTPTR
               1=1137
               1=1138 $EJECT
               1=1139
               1=1140
               1=1141
               1=1142       XTYM:
0584 B811      1=1143              MOV R0,#17D
0586 80        1=1144              MOVX A,@R0
0587 AF        1=1145              MOV R7,A
0588 BE09      1=1146              MOV R6,#9D
```

```
              1=1147          XTYM1:
058A FF       1=1148                   MOV A,R7
058B DE       1=1149                   XRL A,R6
058C C695     1=1150                   JZ XTYM2
058E EE8A     1=1151                   DJNZ R6,XTYM1
0590 FF       1=1152                   MOV A,R7
0591 C695     1=1153                   JZ XTYM2
0593 842D     1=1154                   JMP RSTPTR
              1=1155          XTYM2:
0595 FE       1=1156                   MOV A,R6
0596 B86E     1=1157                   MOV R0,#110D
0598 90       1=1158                   MOVX @R0,A
0599 B820     1=1159                   MOV R0,#32D
059B 2365     1=1160                   MOV A,#(LOW HMS)
059D 90       1=1161                   MOVX @R0,A
059E 842D     1=1162                   JMP RSTPTR
              1=1163
              1=1164
              1=1165 $EJECT
              1=1166
              1=1167
              1=1168          XHMS:
05A0 B811     1=1169                   MOV R0,#17D
05A2 80       1=1170                   MOVX A,@R0
05A3 AF       1=1171                   MOV R7,A
05A4 BE09     1=1172                   MOV R6,#9D
              1=1173          XHMS1:
05A6 FF       1=1174                   MOV A,R7
05A7 DE       1=1175                   XRL A,R6
05A8 C6B1     1=1176                   JZ XHMS2
05AA EEA6     1=1177                   DJNZ R6,XHMS1
05AC FF       1=1178                   MOV A,R7
05AD C6B1     1=1179                   JZ XHMS2
05AF 842D     1=1180                   JMP RSTPTR
              1=1181          XHMS2:
05B1 FE       1=1182                   MOV A,R6
05B2 B86D     1=1183                   MOV R0,#109D
05B4 90       1=1184                   MOVX @R0,A
05B5 B820     1=1185                   MOV R0,#32D
05B7 2368     1=1186                   MOV A,#(LOW HLS)
05B9 90       1=1187                   MOVX @R0,A
05BA 842D     1=1188                   JMP RSTPTR
              1=1189
              1=1190
              1=1191 $EJECT
              1=1192
              1=1193
              1=1194          XHLS:
05BC B811     1=1195                   MOV R0,#17D
```

```
05BE 80                 MOVX A,@R0
05BF AF                 MOV R7,A
05C0 BE09               MOV R6,#9D
                XHLS1:
05C2 FF                 MOV A,R7
05C3 DE                 XRL A,R6
05C4 C6CD               JZ XHLS2
05C6 EEC2               DJNZ R6,XHLS1
05C8 FF                 MOV A,R7
05C9 C6CD               JZ XHLS2
05CB 842D               JMP RSTPTR
                XHLS2:
05CD FE                 MOV A,R6
05CE B86B               MOV R0,#107D
05D0 90                 MOVX @R0,A
05D1 B820               MOV R0,#32D
05D3 236B               MOV A,#(LOW MMS)
05D5 90                 MOVX @R0,A
05D6 842D               JMP RSTPTR
          $EJECT
                XMMS:
05D8 B811               MOV R0,#17D
05DA 80                 MOVX A,@R0
05DB AF                 MOV R7,A
05DC BE09               MOV R6,#9D
                XMMS1:
05DE FF                 MOV A,R7
05DF DE                 XRL A,R6
05E0 C6E9               JZ XMMS2
05E2 EEDE               DJNZ R6,XMMS1
05E4 FF                 MOV A,R7
05E5 C6E9               JZ XMMS2
05E7 842D               JMP RSTPTR
                XMMS2:
05E9 FE                 MOV A,R6
05EA B86A               MOV R0,#106D
05EC 90                 MOVX @R0,A
05ED B820               MOV R0,#32D
05EF 236E               MOV A,#(LOW MLS)
05F1 90                 MOVX @R0,A
05F2 842D               JMP RSTPTR
          $EJECT
```

```
0600                    ORG 600H
                XMLS:
0600 B811               MOV R0,#17D
0602 80                 MOVX A,@R0
0603 AF                 MOV R7,A
0604 D303               XRL A,#03H          ; CHK FOR 'AM'.
0606 9613               JNZ XMLS1
0608 B866               MOV R0,#102D
060A 230F               MOV A,#0FH
060C 90                 MOVX @R0,A
060D B88A               MOV R0,#138D
060F 27                 CLR A
0610 90                 MOVX @R0,A
0611 C422               JMP XMLS2
                XMLS1:
0613 FF                 MOV A,R7
0614 D30A               XRL A,#0AH          ; CHK FOR 'PM'.
0616 9641               JNZ XMLS4
0618 B866               MOV R0,#102D
061A 23F0               MOV A,#0F0H
061C 90                 MOVX @R0,A
061D B88A               MOV R0,#138D
061F 23FF               MOV A,#0FFH
0621 90                 MOVX @R0,A
                XMLS2:
0622 B820               MOV R0,#32D
0624 2341               MOV A,#(LOW QUO)
0626 90                 MOVX @R0,A
0627 B87C               MOV R0,#124D
0629 27                 CLR A
062A 90                 MOVX @R0,A
062B 18                 INC R0
062C 90                 MOVX @R0,A
062D B88B               MOV R0,#139D
062F 90                 MOVX @R0,A
0630 B86E               MOV R0,#110D
0632 B987               MOV R1,#135D
0634 BF03               MOV R7,#3D
                XMLS3:
0636 80                 MOVX A,@R0
0637 91                 MOVX @R1,A
0638 C8                 DEC R0
0639 C9                 DEC R1
063A 80                 MOVX A,@R0
063B 91                 MOVX @R1,A
063C C8                 DEC R0
```

```
063D C8        1=1293                 DEC R0
063E C9        1=1294                 DEC R1
063F EF36      1=1295                 DJNZ R7,XMLS3
               1=1296         XMLS4:
0641 842D      1=1297                 JMP RSTPTR
               1=1298
               1=1299 $EJECT
               1=1300
               1=1301
               1=1302         XEDN:
0643 B811      1=1303                 MOV R0,#17D
0645 80        1=1304                 MOVX A,@R0
0646 AF        1=1305                 MOV R7,A
0647 D308      1=1306                 XRL A,#08D            ; CHK FOR 'SETPT'.
0649 9673      1=1307                 JNZ XEDN3
064B B86E      1=1308                 MOV R0,#110D
064D 80        1=1309                 MOVX A,@R0
064E D384      1=1310                 XRL A,#84H            ; CHK NIGHT/DAY.
0650 9656      1=1311                 JNZ XEDN1             ; JMP IF SETTING DAY.
0652 2399      1=1312                 MOV A,#153D
0654 C458      1=1313                 JMP XEDN2
               1=1314         XEDN1:
0656 2398      1=1315                 MOV A,#152D
               1=1316         XEDN2:
0658 B802      1=1317                 MOV R0,#2D
065A 90        1=1318                 MOVX @R0,A
065B B820      1=1319                 MOV R0,#32D
065D 2350      1=1320                 MOV A,#(LOW ENUM)
065F 90        1=1321                 MOVX @R0,A
0660 B86E      1=1322                 MOV R0,#110D
0662 2381      1=1323                 MOV A,#81H
0664 90        1=1324                 MOVX @R0,A
0665 C8        1=1325                 DEC R0
0666 2370      1=1326                 MOV A,#70H
0668 90        1=1327                 MOVX @R0,A
0669 B867      1=1328                 MOV R0,#103D
066B 27        1=1329                 CLR A
066C 90        1=1330                 MOVX @R0,A
066D B806      1=1331                 MOV R0,#6D
066F 27        1=1332                 CLR A
0670 90        1=1333                 MOVX @R0,A
0671 842D      1=1334                 JMP RSTPTR
               1=1335
               1=1336         XEDN3:
0673 FF        1=1337                 MOV A,R7
0674 D307      1=1338                 XRL A,#07H            ; CHK FOR 'STAGE'.
0676 969B      1=1339                 JNZ XEDN6
0678 B86E      1=1340                 MOV R0,#110D
067A 80        1=1341                 MOVX A,@R0
```

```
067B D384     1=1342              XRL A,#84H          ; CHK NIGHT/DAY.
067D 9683     1=1343              JNZ XEDN4
067F 2332     1=1344              MOV A,#50D          ; BASE ADDR FOR STAGE TEMPS.
0681 C485     1=1345              JMP XEDN5
              1=1346       XEDN4:
0683 2328     1=1347              MOV A,#40D          ; BASE ADDR FOR STAGE TEMPS.
              1=1348       XEDN5:
0685 B802     1=1349              MOV R0,#2D
0687 90       1=1350              MOVX @R0,A
0688 B820     1=1351              MOV R0,#32D
068A 234D     1=1352              MOV A,#(LOW EST)
068C 90       1=1353              MOVX @R0,A
068D B86E     1=1354              MOV R0.#110D
068F 2381     1=1355              MOV A,#81H
0691 90       1=1356              MOVX @R0,A
0692 C8       1=1357              DEC R0
0693 2370     1=1358              MOV A,#70H
0695 90       1=1359              MOVX @R0,A
0696 B867     1=1360              MOV R0,#103D
0698 2390     1=1361              MOV A,#90H          ; UNDERSCORE CODE.
069A 90       1=1362              MOVX @R0,A
              1=1363       XEDN6:
069B 842D     1=1364              JMP RSTPTR
              1=1365
              1=1366 $EJECT
              1=1367
              1=1368
              1=1369
              1=1370       XEST:
069D B811     1=1371              MOV R0,#17D
069F 80       1=1372              MOVX A,@R0
06A0 AF       1=1373              MOV R7,A
06A1 BE09     1=1374              MOV R6,#9D
              1=1375       XEST1:
06A3 FF       1=1376              MOV A,R7
06A4 DE       1=1377              XRL A,R6
06A5 C6AE     1=1378              JZ XEST2
06A7 EEA3     1=1379              DJNZ R6,XEST1
06A9 FF       1=1380              MOV A,R7
06AA C6AE     1=1381              JZ XEST2
06AC 842D     1=1382              JMP RSTPTR
              1=1383       XEST2:
06AE B806     1=1384              MOV R0,#6D
06B0 FE       1=1385              MOV A,R6
06B1 90       1=1386              MOVX @R0,A
06B2 B802     1=1387              MOV R0,#2D
06B4 80       1=1388              MOVX A,@R0
06B5 AF       1=1389              MOV R7,A
```

```
06B6 FE        1=1390              MOV A,R6
06B7 96C9      1=1391              JNZ XEST5
06B9 FF        1=1392              MOV A,R7
06BA D328      1=1393              XRL A,#40D
06BC C6C2      1=1394              JZ XEST3
06BE 2399      1=1395              MOV A,#153D
06C0 C4C4      1=1396              JMP XEST4
               1=1397       XEST3:
06C2 2398      1=1398              MOV A,#152D
               1=1399       XEST4:
06C4 B802      1=1400              MOV R0,#2D
06C6 90        1=1401              MOVX @R0,A
06C7 C4CB      1=1402              JMP XEST6
               1=1403       XEST5:
06C9 6F        1=1404              ADD A,R7
06CA 90        1=1405              MOVX @R0,A
               1=1406       XEST6:
06CB FE        1=1407              MOV A,R6
06CC B867      1=1408              MOV R0,#103D
06CE 90        1=1409              MOVX @R0,A
06CF B820      1=1410              MOV R0,#32D
06D1 2350      1=1411              MOV A,#(LOW ENUM)
06D3 90        1=1412              MOVX @R0,A
06D4 842D      1=1413              JMP RSTPTR
               1=1414
               1=1415
               1=1416 $EJECT
               1=1417
               1=1418       XENUM:
06D6 B811      1=1419              MOV R0,#17D
06D8 80        1=1420              MOVX A,@R0
06D9 D306      1=1421              XRL A,#06H
06DB C6DF      1=1422              JZ XENUM1
06DD 842D      1=1423              JMP RSTPTR
               1=1424       XENUM1:
06DF F5        1=1425              SEL MB1
06E0 9400      1=1426              CALL DBLANK
06E2 E5        1=1427              SEL MB0
06E3 B802      1=1428              MOV R0,#2D
06E5 80        1=1429              MOVX A,@R0
06E6 A8        1=1430              MOV R0,A
06E7 F5        1=1431              SEL MB1
06E8 B404      1=1432              CALL D041           ; DSP OLD STAGE TEMP.
06EA E5        1=1433              SEL MB0
06EB 27        1=1434              CLR A
06EC 37        1=1435              CPL A
06ED B86E      1=1436              MOV R0,#110D
06EF 90        1=1437              MOVX @R0,A
06F0 C8        1=1438              DEC R0
```

```
06F1 90        1=1439                MOVX @R0,A
               1=1440
06F2 B820      1=1441                MOV R0,#32D
06F4 2353      1=1442                MOV A,#(LOW TMP)
06F6 90        1=1443                MOVX @R0,A
06F7 842D      1=1444                JMP RSTPTR
               1=1445
               1=1446
               1=1447 $EJECT
               1=1448
               1=1449
0700           1=1450                ORG 700H
               1=1451
               1=1452         XTMP:
0700 B811      1=1453                MOV R0,#17D
0702 80        1=1454                MOVX A,@R0
0703 AF        1=1455                MOV R7,A
               1=1456
0704 BE09      1=1457                MOV R6,#9D
               1=1458         XTMP1:
0706 FF        1=1459                MOV A,R7
0707 DE        1=1460                XRL A,R6
0708 C611      1=1461                JZ XTMP2
070A EE06      1=1462                DJNZ R6,XTMP1
070C FF        1=1463                MOV A,R7
070D C611      1=1464                JZ XTMP2
070F 842D      1=1465                JMP RSTPTR
               1=1466         XTMP2:
0711 B869      1=1467                MOV R0,#105D
0713 FF        1=1468                MOV A,R7
0714 90        1=1469                MOVX @R0,A
0715 18        1=1470                INC R0
0716 23FF      1=1471                MOV A,#0FFH
0718 90        1=1472                MOVX @R0,A
0719 B820      1=1473                MOV R0,#32D
071B 2356      1=1474                MOV A,#(LOW TMS)
071D 90        1=1475                MOVX @R0,A
071E FF        1=1476                MOV A,R7
071F C626      1=1477                JZ XTMP4
0721 27        1=1478                CLR A
               1=1479         XTMP3:
0722 030A      1=1480                ADD A,#10D
0724 EF22      1=1481                DJNZ R7,XTMP3
               1=1482         XTMP4:
0726 B803      1=1483                MOV R0,#3D
0728 90        1=1484                MOVX @R0,A
0729 14BD      1=1485                CALL FLASH
072B 842D      1=1486                JMP RSTPTR
               1=1487
```

```
                  '
                  $EJECT


                        XTMS:
072D B811                       MOV R0,#17D
072F 80                         MOVX A,@R0
0730 AF                         MOV R7,A
0731 BE09                       MOV R6,#9D
                        XTMS1:
0733 FF                         MOV A,R7
0734 DE                         XRL A,R6
0735 C63E                       JZ XTMS2
0737 EE33                       DJNZ R6,XTMS1
0739 FF                         MOV A,R7
073A C63E                       JZ XTMS2
073C 842D                       JMP RSTPTR
                        XTMS2:
073E B868                       MOV R0,#104D
0740 FF                         MOV A,R7
0741 90                         MOVX @R0,A
0742 B803                       MOV R0,#3D
0744 80                         MOVX A,@R0
0745 6F                         ADD A,R7

0746 90                         MOVX @R0,A
0747 14BD                       CALL FLASH
0749 B820                       MOV R0,#32D
074B 2359                       MOV A,#(LOW TLS)
074D 90                         MOVX @R0,A
074E B803                       MOV R0,#3D
0750 80                         MOVX A,@R0
0751 AF                         MOV R7,A              ; ENTERED TEMP IN R7.

0752 B800                       MOV R0,#0
0754 80                         MOVX A,@R0
0755 C65D                       JZ XTMS3
0757 FF                         MOV A,R7
0758 F5                         SEL MB1
0759 D400                       CALL FC               ; CONVERT C TO F.
075B E5                         SEL MB0
075C AF                         MOV R7,A
                        XTMS3:
075D FF                         MOV A,R7
075E 035A                       ADD A,#90D
0760 AF                         MOV R7,A              ; ASP CODE IN R7.
0761 B802                       MOV R0,#2D
0763 80                         MOVX A,@R0
0764 A8                         MOV R0,A
```

```
0765 FF        1=1537              MOV A,R7
0766 90        1=1538              MOVX @R0,A          ; STORE STAGE TEMP.
               1=1539
0767 B8A2      1=1540              MOV R0,#162D
0769 80        1=1541              MOVX A,@R0
076A 03A2      1=1542              ADD A,#162D
076C B804      1=1543              MOV R0,#4D
076E 90        1=1544              MOVX @R0,A
076F B807      1=1545              MOV R0,#7D
0771 23A2      1=1546              MOV A,#162D
0773 90        1=1547              MOVX @R0,A
               1=1548
0774 842D      1=1549              JMP RSTPTR
               1=1550
               1=1551
               1=1552 $EJECT
               1=1553
               1=1554
               1=1555
               1=1556       XTLS:
0776 B811      1=1557              MOV R0,#17D
0778 80        1=1558              MOVX A,@R0
0779 D30B      1=1559              XRL A,#0BH
077B C67F      1=1560              JZ XTLS1
077D 842D      1=1561              JMP RSTPTR
               1=1562       XTLS1:
077F F5        1=1563              SEL MB1
0780 9400      1=1564              CALL DBLANK
0782 E5        1=1565              SEL MB0
0783 B86E      1=1566              MOV R0,#110D
0785 2301      1=1567              MOV A,#1            ; VENT PREFIX.
0787 90        1=1568              MOVX @R0,A
0788 C8        1=1569              DEC R0
0789 2387      1=1570              MOV A,#87H
078B 90        1=1571              MOVX @R0,A
078C C8        1=1572              DEC R0
078D 27        1=1573              CLR A
078E 90        1=1574              MOVX @R0,A
               1=1575
078F B807      1=1576              MOV R0,#7D
0791 80        1=1577              MOVX A,@R0
               1=1578
0792 AF        1=1579              MOV R7,A
0793 B804      1=1580              MOV R0,#4D
0795 80        1=1581              MOVX A,@R0
0796 DF        1=1582              XRL A,R7
0797 96A7      1=1583              JNZ XTLS0
0799 B87C      1=1584              MOV R0,#124D
079B 90        1=1585              MOVX @R0,A
```

```
079C B820              MOV RO,#32D
079E 2341              MOV A,#(LOW QUO)
07A0 90                MOVX @RO,A
07A1 F5                SEL MB1
07A2 9454              CALL (D02+1)
07A4 E5                SEL MBO
07A5 842D              JMP RSTPTR
              XTLS0:
07A7 FF                MOV A,R7

07A8 17                INC A
07A9 B807              MOV RO,#7D
07AB 90                MOVX @RO,A
07AC A8                MOV RO,A
07AD 80                MOVX A,@RO
07AE AF                MOV R7,A                ; R7 IS BCD T1TO.
07AF 53F0              ANL A,#11110000B
07B1 47                SWAP A
07B2 B86B              MOV RO,#107D
07B4 90                MOVX @RO,A
07B5 AE                MOV R6,A
07B6 C6BD              JZ XTLS3
07B8 27                CLR A
              XTLS2:
07B9 030A              ADD A,#10D
07BB EEB9              DJNZ R6,XTLS2
              XTLS3:
07BD AE                MOV R6,A
07BE FF                MOV A,R7
07BF 530F              ANL A,#00001111B
07C1 B86A              MOV RO,#106D
07C3 90                MOVX @RO,A
07C4 6E                ADD A,R6
07C5 AF                MOV R7,A                ; R7 IS BINARY T1TO.

07C6 B806              MOV RO,#6D
07C8 80                MOVX A,@RO
07C9 C6D1              JZ XTLS5
07CB AD                MOV R5,A
07CC 27                CLR A
              XTLS4:
07CD 0319              ADD A,#25D
07CF EDCD              DJNZ R5,XTLS4
              XTLS5:
07D1 6F                ADD A,R7
07D2 AF                MOV R7,A
07D3 B805              MOV RO,#5D
07D5 80                MOVX A,@RO
07D6 96DC              JNZ XTLS6
```

```
07D8 9AF8                     ANL P2,#11111000B        ; PAGE 0, NIGHT.
07DA E4E0                     JMP XTLS7
                    XTLS6:
07DC 9AF8                     ANL P2,#11111000B
07DE 8A09                     ORL P2,#00001001B        ; PAGE 1,DAY.
                    XTLS7:
07E0 FF                       MOV A,R7
07E1 A8                       MOV R0,A
07E2 80                       MOVX A,@R0

07E3 AE                       MOV R6,A                 ; BCD % IN R6.
07E4 8A0B                     ORL P2,#00001011B
07E6 B808                     MOV R0,#8D
07E8 FF                       MOV A,R7
07E9 90                       MOVX @R0,A               ; STORE RAM ADDR.
07EA FE                       MOV A,R6
07EB 53F0                     ANL A,#11110000B
07ED 47                       SWAP A
07EE B868                     MOV R0,#104D
07F0 90                       MOVX @R0,A
07F1 FE                       MOV A,R6
07F2 530F                     ANL A,#00001111B
07F4 C8                       DEC R0
07F5 90                       MOVX @R0,A

07F6 B820                     MOV R0,#32D
07F8 235C                     MOV A,#(LOW VNT)
07FA 90                       MOVX @R0,A

07FB 842D                     JMP RSTPTR



          $EJECT



0060                          ORG 060H


                    XVNT:
0060 B811                     MOV R0,#17D
0062 80                       MOVX A,@R0
0063 AF                       MOV R7,A
0064 BE09                     MOV R6,#9D
                    XVNT1:
0066 FF                       MOV A,R7
0067 DE                       XRL A,R6
0068 C671                     JZ XVNT2
```

```
006A EE66     1=1684                   DJNZ R6,XVNT1
006C FF       1=1685                   MOV A,R7
006D C671     1=1686                   JZ XVNT2
006F 842D     1=1687                   JMP RSTPTR
              1=1688          XVNT2:
0071 B868     1=1689                   MOV R0,#104D
0073 FE       1=1690                   MOV A,R6
0074 90       1=1691                   MOVX @R0,A
0075 14BD     1=1692                   CALL FLASH
              1=1693
0077 B820     1=1694                   MOV R0,#32D
0079 235F     1=1695                   MOV A,#(LOW VMS)
007B 90       1=1696                   MOVX @R0,A
              1=1697
007C 842D     1=1698                   JMP RSTPTR
              1=1699
              1=1700
              1=1701
              1=1702 $EJECT
              1=1703
              1=1704
              1=1705
              1=1706          XVMS:
007E B811     1=1707                   MOV R0,#17D
0080 80       1=1708                   MOVX A,@R0
0081 AF       1=1709                   MOV R7,A
0082 BE09     1=1710                   MOV R6,#9D
              1=1711          XVMS1:
0084 FF       1=1712                   MOV A,R7
0085 DE       1=1713                   XRL A,R6
0086 C68F     1=1714                   JZ XVMS2
0088 EE84     1=1715                   DJNZ R6,XVMS1
008A FF       1=1716                   MOV A,R7
008B C68F     1=1717                   JZ XVMS2
008D 842D     1=1718                   JMP RSTPTR
              1=1719          XVMS2:
008F B867     1=1720                   MOV R0,#103D
0091 FE       1=1721                   MOV A,R6
0092 90       1=1722                   MOVX @R0,A
0093 14BD     1=1723                   CALL FLASH
0095 B868     1=1724                   MOV R0,#104D
0097 80       1=1725                   MOVX A,@R0
0098 47       1=1726                   SWAP A
0099 AE       1=1727                   MOV R6,A
009A B867     1=1728                   MOV R0,#103D
009C 80       1=1729                   MOVX A,@R0
009D 6E       1=1730                   ADD A,R6              ; BCD X IN R6.
009E AE       1=1731                   MOV R6,A
009F B808     1=1732                   MOV R0,#8D
```

```
00A1 80                      MOVX A,@RO
00A2 AD                      MOV R5,A              ; RAM ADDR IN R5.

00A3 B805                    MOV RO,#5D
00A5 80                      MOVX A,@RO
00A6 96AC                    JNZ XVMS3
00A8 9AF8                    ANL P2,#11111000B     ; PAGE 0, NIGHT.
00AA 04B0                    JMP XVMS4
                     XVMS3:
00AC 9AF8                    ANL P2,#11111000B
00AE 8A09                    ORL P2,#00001001B
                     XVMS4:
00B0 FD                      MOV A,R5
00B1 A8                      MOV RO,A
00B2 FE                      MOV A,R6
00B3 90                      MOVX @RO,A            ; STORE NEW %.

00B4 8A0B                    ORL P2,#00001011B

00B6 B820                    MOV RO,#32D
00B8 2359                    MOV A,#(LOW TLS)
00BA 90                      MOVX @RO,A

00BB 842D                    JMP RSTPTR

                     FLASH:
00BD B865                    MOV RO,#101D
00BF 237F                    MOV A,#7FH
00C1 90                      MOVX @RO,A
00C2 5400                    CALL DISPLA
00C4 27                      CLR A
00C5 B865                    MOV RO,#101D
00C7 90                      MOVX @RO,A
00C8 5400                    CALL DISPLA
00CA 93                      RETR



                     XRSET:
00CB B811                    MOV RO,#17D
00CD 80                      MOVX A,@RO
00CE D30F                    XRL A,#0FH
00D0 96D4                    JNZ XRSET1
00D2 0400                    JMP 000
                     XRSET1:
00D4 B820                    MOV RO,#32D
00D6 2341                    MOV A,#(LOW QUD)
00D8 90                      MOVX @RO,A
00D9 842D                    JMP RSTPTR
```

```



$EJECT



$EJECT

$INCLUDE (VENT.MB1)



; ********************************************************************

;               VENT CONTROL UNIT      MEMORY BANK 1
;               ==== ======= ====      ====== ==== =


;        PAGE 0 ................. TSLOT
;                                 MCI
;                                 SENSOR


;        PAGE 1 ................. COMAND
;                                 USRMCI
;                                 TX


;        PAGE 2 ................. MATCH


;        PAGE 3 ................. RX


;        PAGE 4 ................. SUBFYL
;                                 DSPHLR


;        PAGE 5 ................. DSPHLR


; ********************************************************************


$EJECT



```

```
0800                      ORG 800H

                 $EJECT

                 ; ================================================================

                 ;        TSLOT:  INTERROGATION/COMMAND SEQUENCING AND
                 ;                TIME SLOT DETERMINATION...

                 ; ================================================================

                       TSLOT:
0800 8A0B                     ORL P2,#00001011B
0802 B88C                     MOV R0,#140D
                                                      ; TIME SLOT OVERFLOW INDICATOR.

0804 80                       MOVX A,@R0
0805 D303                     XRL A,#3
0807 9611                     JNZ TSLOT1
0809 90                       MOVX @R0,A              ; CLEAR OVERFLOW COUNTER.

080A 1412                     CALL MCI                ; DETERMINE NEXT MCI TO BE ADDR.

080C 1445                     CALL SENSOR             ; CHECK TO SEE IF THIS IS AN
                                                      ; ACTIVE SENSOR ADDRESS, AND,
                                                      ; IF SO, INTERROGATE IT.

080E 3400                     CALL COMAND             ; CHECK TO SEE IF THIS IS AN
                                                      ; ACTIVE VENT MACHINE, AND, IF
                                                      ; SO, COMMAND IT.

0810 93                       RETR

                       TSLOT1:
0811 93                       RETR

                 $EJECT
```

```
                  ; ================================================================

                  ;          MCI:  ADDRESSES EACH MCI IN SEQUENCE...

                  ; ================================================================

                        MCI:
0812 8A0B                       ORL P2,#00001011B       ; ADDRESS RAM PAGE 3.
0814 B89C                       MOV R0,#156D
0816 80                         MOVX A,@R0              ; GET CURRENT TOTP.
0817 AF                         MOV R7,A
0818 53F0                       ANL A,#11110000B
081A 47                         SWAP A                  ; ISOLATE T0.
081B D309                       XRL A,#9D
081D C624                       JZ MCI1
081F FF                         MOV A,R7
0820 0310                       ADD A,#10H              ; INCREMENT T0.
0822 90                         MOVX @R0,A
0823 93                         RETR


                        MCI1:
                                                        ; T0 WAS FOUND TO BE 9.
0824 FF                         MOV A,R7                ; GET PREVIOUS TOTP.
0825 530F                       ANL A,#0FH              ; CLEAR T0.
0827 90                         MOVX @R0,A              ; PUT BACK TOTP.
0828 18                         INC R0
0829 80                         MOVX A,@R0              ; GET T2T1.
082A AF                         MOV R7,A
082B 530F                       ANL A,#00001111B
                                                        ; ISOLATE T1.
082D D302                       XRL A,#02D
082F C635                       JZ MCI2
0831 FF                         MOV A,R7
0832 17                         INC A
0833 90                         MOVX @R0,A              ; INCREMENT T1 AND REPLACE.
0834 93                         RETR

                        MCI2:
0835 27                         CLR A
0836 90                         MOVX @R0,A              ; SET T2T1=00H SINCE PREVIOUS
                                                        ; COUNT WAS T2T1T0=029
0837 C8                         DEC R0
0838 80                         MOVX A,@R0
0839 AF                         MOV R7,A
083A D309                       XRL A,#09D
083C C642                       JZ MCI3
083E FF                         MOV A,R7
```

```
083F 17              INC A
                                            ; INCREMENT PREFIX.
0840 90              MOVX @R0,A
0841 93              RETR

             MCI3:
0842 27              CLR A
0843 90              MOVX @R0,A
                                            ; T2T1T0=000
0844 93              RETR

     $EJECT


     ; ================================================================

     ;          SENSOR:  INTERROGATION OF ACTIVE SENSORS...

     ; ================================================================

             SENSOR:
0845 BA0B            ORL P2,#00001011B
0847 3479            CALL USRMCI
0849 964C            JNZ SENS1              ; JMP IF ACTIVE MCI.
084B 93              RETR

             SENS1:
084C B89C            MOV R0,#156D
084E 80              MOVX A,@R0
084F 530F            ANL A,#00001111B       ; ISOLATE PREFIX.
0851 AF              MOV R7,A
0852 D302            XRL A,#2
0854 9663            JNZ SENS3

                                            ; OUTDOOR ASPIRATOR.
0856 14B8            CALL TSENS
0858 23FE            MOV A,#0FEH
085A DA              XRL A,R2
085B 965E            JNZ SENS2
                                            ; NO NEW TEMP RETURNED.
                                            ; STICK WITH PREVIOUS.
085D 93              RETR

             SENS2:
085E B897            MOV R0,#151D           ; OUTDOOR TEMP ADDR.
0860 FA              MOV A,R2
0861 90              MOVX @R0,A
0862 93              RETR

```

```
                SENS3:
0863 FF                 MOV A,R7
0864 D303               XRL A,#3
0866 96B7               JNZ SENS4

                                            ; INDOOR ASPIRATOR.
0868 14B8               CALL TSENS
086A 23FE               MOV A,#0FEH
086C DA                 XRL A,R2
086D 9670               JNZ SENS5
                                            ; NO NEW TEMP RETURN,
                                            ; STICK WITH PREVIOUS.
086F 93                 RETR

                SENS5:
0870 B896               MOV R0,#150D
0872 FA                 MOV A,R2
0873 90                 MOVX @R0,A          ; STORE NEW TEMP.

0874 5430               CALL MATCH          ; STAGE DECISION.

                                            ; NEXT GET DAY/NIGHT.
0876 B894               MOV R0,#148D
0878 23FE               MOV A,#0FEH
087A 90                 MOVX @R0,A

                SENS6:
087B B894               MOV R0,#148D
087D 80                 MOVX A,@R0
087E D3FE               XRL A,#0FEH
0880 9694               JNZ SENS7

0882 E5                 SEL MB0
0883 3400               CALL KEYPAD
0885 344C               CALL TIME
0887 F5                 SEL MB1

0888 B88C               MOV R0,#140D
088A 80                 MOVX A,@R0
088B D303               XRL A,#3
088D 9690               JNZ SENS8
088F 93                 RETR
                SENS8:
0890 7400               CALL RX
0892 047B               JMP SENS6

                SENS7:
0894 B894               MOV R0,#148D
```

```
0896 80                MOVX A,@R0
0897 AF                MOV R7,A            ; STORE THIS DAY/NIGHT INDICATION.
0898 B891              MOV R0,#145D
089A 80                MOVX A,@R0
089B AE                MOV R6,A            ; STORE PREVIOUS.
089C 18                INC R0
089D 80                MOVX A,@R0
089E AD                MOV R5,A            ; STORE NEXT PREVIOUS.
089F FE                MOV A,R6
08A0 90                MOVX @R0,A
08A1 C8                DEC R0
08A2 FF                MOV A,R7
08A3 90                MOVX @R0,A          ; UPDATE HISTORY.

08A4 27                CLR A
08A5 6F                ADD A,R7
08A6 6E                ADD A,R6
08A7 6D                ADD A,R5
08A8 96AE              JNZ SENS9

08AA B895              MOV R0,#149D
08AC 90                MOVX @R0,A          ; NIGHT.
08AD 93                RETR

              SENS9:
08AE D303              XRL A,#3
08B0 96B7              JNZ SENS4
08B2 2301              MOV A,#1            ; DAY.
08B4 B895              MOV R0,#149D
08B6 90                MOVX @R0,A

              SENS4:
08B7 93                RETR



              TSENS:                       ; ADDRESSES AN MCI ASPIRATOR
                                           ; AND PLACES THE RETURNED
                                           ; TEMP INTO R2.

08B8 BFFF              MOV R7,#0FFH
08BA 34C5              CALL TX             ; SEND FRAMING BYTE.

08BC 8A0B              ORL P2,#00001011B
08BE B89C              MOV R0,#156D
08C0 80                MOVX A,@R0
08C1 AF                MOV R7,A
08C2 34C5              CALL TX             ; SEND TOTP.
```

```
08C4 E5                     SEL MB0
08C5 3400                   CALL KEYPAD
08C7 344C                   CALL TIME
08C9 F5                     SEL MB1

08CA B89D                   MOV R0,#157D
08CC 80                     MOVX A,@R0
08CD AF                     MOV R7,A
08CE 34C5                   CALL TX                 ; SEND T2T1.

08D0 B894                   MOV R0,#148D
08D2 23FE                   MOV A,#0FEH
08D4 90                     MOVX @R0,A

                    TSENS1:
08D5 B894                   MOV R0,#148D
08D7 80                     MOVX A,@R0
08D8 D3FE                   XRL A,#0FEH
08DA 96F0                   JNZ TSENS2

08DC E5                     SEL MB0
08DD 3400                   CALL KEYPAD
08DF 344C                   CALL TIME
08E1 F5                     SEL MB1

08E2 B88C                   MOV R0,#140D
08E4 80                     MOVX A,@R0
08E5 D303                   XRL A,#3
08E7 C6ED                   JZ TSENS3
08E9 7400                   CALL RX
08EB 04D5                   JMP TSENS1

                    TSENS3:
                                                    ; NO TEMP RETURN--
08ED BAFE                                           ; PUT INDICATOR INTO R2.
08EF 93                     MOV R2,#0FEH
                            RETR

                    TSENS2:
08F0 B894                   MOV R0,#148D
08F2 80                     MOVX A,@R0
08F3 AA                     MOV R2,A

08F4 93                     RETR

             $EJECT
```

```
0900                    ORG 900H
             $EJECT
             ; ==================================================================
             ;              COMAND:  COMMAND OF ACTIVE VENT MCI'S...
             ; ==================================================================
                      COMAND:
0900 8A0B                       ORL P2,#00001011B
0902 3479                       CALL USRMCI
0904 9607                       JNZ COM1                ; JMP IF ACTIVE MCI.
0906 93                         RETR

                      COM1:
0907 B89C                       MOV R0,#156D
0909 80                         MOVX A,@R0
090A 530F                       ANL A,#00001111B
090C D301                       XRL A,#1
090E C611                       JZ COM2
0910 93                         RETR                    ; NOT A VENT MCI.

                      COM2:
                                                        ; IS A VENT MCI.
0911 B89C                       MOV R0,#156D
0913 80                         MOVX A,@R0
0914 53F0                       ANL A,#11110000B
0916 47                         SWAP A
0917 AF                         MOV R7,A
0918 18                         INC R0
0919 80                         MOVX A,@R0
091A 530F                       ANL A,#00001111B
```

```
091C 47             SWAP A
091D 4F             ORL A,R7
091E AF             MOV R7,A
                                        ; NOW CONVERT BCD TO BINARY.
091F 53F0           ANL A,#11110000B
0921 47             SWAP A
0922 AE             MOV R6,A
0923 C62A           JZ COM8
0925 27             CLR A
              COM7:
0926 030A           ADD A,#10D
0928 EE26           DJNZ R6,COM7
              COM8:
092A AE             MOV R6,A
092B FF             MOV A,R7
092C 530F           ANL A,#00001111B
092E 6E             ADD A,R6
092F AF             MOV R7,A
                                        ; BINARY J1TO IN R7.
0930 B89A           MOV R0,#154D
0932 80             MOVX A,@R0          ; GET CURRENT STAGE NUMBER.
0933 AE             MOV R6,A

0934 B864           MOV R0,#100D
0936 80             MOVX A,@R0
0937 530F           ANL A,#00001111B
0939 C63F           JZ COM0
093B B801           MOV R0,#1
093D 80             MOVX A,@R0          ; GET MANUAL STAGE.
093E AE             MOV R6,A
              COM0:
093F FE             MOV A,R6
0940 00             NOP
0941 00             NOP                 ; PAGE PARTITION ADJUST.

0942 C649           JZ COM3
0944 27             CLR A

              COM4:
0945 0319           ADD A,#25D
0947 EE45           DJNZ R6,COM4

              COM3:
0949 6F             ADD A,R7            ; ACC CONTAINS RAM (PAGE 1=DAY,
                                        ; PAGE 0=NIGHT) POINTER FOR
                                        ; VENT PER CENT.
094A A8             MOV R0,A
094B 9AF8           ANL P2,#11111000B
094D 8A0B           ORL P2,#00001011B
```

```
094F B995                  MOV R1,#149D
0951 81                    MOVX A,@R1
0952 C65A                  JZ COM5              ; JMP IF NIGHT.
0954 9AF8                  ANL P2,#11111000B    ; DAY.
0956 8A09                  ORL P2,#00001001B    ; PAGE 1 RAM.
0958 245E                  JMP COM6
                 COM5:                          ; NIGHT.
095A 9AF8                  ANL P2,#11111000B
095C 8A08                  ORL P2,#00001000B    ; PAGE 0 RAM.
                 COM6:
095E 80                    MOVX A,@R0           ; GET VENT %
095F AE                    MOV R6,A

0960 9AF8                  ANL P2,#11111000B
0962 8A0B                  ORL P2,#00001011B    ; PAGE 3.

0964 BFFF                  MOV R7,#0FFH         ; SEND HEADER.
0966 34C5                  CALL TX

0968 B89C                  MOV R0,#156D
096A 80                    MOVX A,@R0
096B AF                    MOV R7,A
096C 34C5                  CALL TX              ; SEND TOTP.



096E B89D                  MOV R0,#157D
0970 80                    MOVX A,@R0
0971 AF                    MOV R7,A
0972 34C5                  CALL TX              ; SEND T2T1.

0974 FE                    MOV A,R6
0975 AF                    MOV R7,A
0976 34C5                  CALL TX              ; SEND VENT %

0978 93                    RETR


           $EJECT


           ; ================================================================

           ;          USRMCI:  CHECKS TO SEE IF THE CURRENT TIME SLOT'S
           ;                   MCI HAS BEEN ASSIGNED BY THE OPERATOR.

           ; ================================================================
```

```
                USRMCI:
                                                ; THIS ROUTINE RETURNS A '1'
                                                ; IN THE ACC IF THIS IS AN
                                                ; ACTIVE MCI, AND A '0' IF NOT.
0979 8A0B               ORL P2,#00001011B
097B B89C               MOV R0,#156D
097D 80                 MOVX A,@R0
097E AF                 MOV R7,A                ; CURRENT TOTP.
097F 18                 INC R0
0980 80                 MOVX A,@R0
0981 AE                 MOV R6,A                ; CURRENT T2T1.

0982 B89E               MOV R0,#158D
0984 80                 MOVX A,@R0
0985 DF                 XRL A,R7                ; CHECK OUTASP ADDR.
0986 9690               JNZ USR1
0988 18                 INC R0
0989 80                 MOVX A,@R0
098A DE                 XRL A,R6
098B 9690               JNZ USR1
098D 2301               MOV A,#1
098F 93                 RETR

                USR1:
0990 B8A0               MOV R0,#160D
0992 80                 MOVX A,@R0              ; CHECK INASP ADDR.
0993 DF                 XRL A,R7
0994 969E               JNZ USR2
0996 18                 INC R0
0997 80                 MOVX A,@R0
0998 DE                 XRL A,R6
0999 969E               JNZ USR2
099B 2301               MOV A,#1
099D 93                 RETR

                USR2:                           ; NOT AN ASPIRATOR.

099E FF                 MOV A,R7
099F 530F               ANL A,#00001111B
09A1 D301               XRL A,#1
09A3 C6A7               JZ USR3
09A5 27                 CLR A                   ; NOT A VENT MCI.
09A6 93                 RETR

                USR3:
                                                ; IS A VENT MCI.
09A7 FF                 MOV A,R7
09A8 53F0               ANL A,#11110000B
```

```
09AA 47         1=2317              SWAP A
09AB AF         1=2318              MOV R7,A               ; TO TO R7.
09AC FE         1=2319              MOV A,R6
09AD 530F       1=2320              ANL A,#00001111B
09AF 47         1=2321              SWAP A
09B0 4F         1=2322              ORL A,R7
09B1 AF         1=2323              MOV R7,A               ; T1TO TO R7.
09B2 B8A2       1=2324              MOV R0,#162D
09B4 80         1=2325              MOVX A,@R0
09B5 AE         1=2326              MOV R6,A
                1=2327                                     ; NO. OF USER VENT MCI'S TO R6.
09B6 03A2       1=2328              ADD A,#162D            ; ADDR. OF TOP USER VENT MCI.
09B8 A8         1=2329              MOV R0,A
                1=2330
                1=2331         USR4:
09B9 80         1=2332              MOVX A,@R0
09BA DF         1=2333              XRL A,R7
09BB C6C2       1=2334              JZ USR5                ; JMP IF/WHEN VENT MCI
                1=2335                                     ; ADDRESS ENCOUNTERED.
09BD C8         1=2336              DEC R0
09BE EEB9       1=2337              DJNZ R6,USR4
                1=2338
09C0 27         1=2339              CLR A                  ; MCI NOT ASSIGNED.
09C1 93         1=2340              RETR
                1=2341
                1=2342         USR5:
09C2 2301       1=2343              MOV A,#1
                1=2344
09C4 93         1=2345              RETR
                1=2346
                1=2347
                1=2348 $EJECT
                1=2349
                1=2350 ; ==================================================================
                1=2351
                1=2352 ;     USART TRANSMIT DATA PROCESSOR...
                1=2353
                1=2354 ;               THIS IS A GENERAL-PURPOSE ROUTINE FOR
                1=2355 ;               INTERFACE TO THE TRANSMIT FUNCTION OF
                1=2356 ;               THE 8251A USART.  WHEN DATA NEEDS TO
                1=2357 ;               BE TRANSMITTED, THE DATA BYTE IS PLACED
                1=2358 ;               IN R7, AND THIS ROUTINE IS CALLED.
                1=2359
                1=2360 ; ==================================================================
                1=2361
                1=2362         TX:
                1=2363
09C5 8A0B       1=2364              ORL P2,#00001011B
09C7 F8         1=2365              MOV A,R0
09C8 B846       1=2366              MOV R0,#70D
```

```
09CA 90                       MOVX @R0,A
09CB 18                       INC R0
09CC F9                       MOV A,R1
09CD 90                       MOVX @R0,A
09CE 18                       INC R0
09CF FA                       MOV A,R2
09D0 90                       MOVX @R0,A
09D1 B84D                     MOV R0,#77D
09D3 B907                     MOV R1,#7D
09D5 BA05                     MOV R2,#5D
                      TX2:
09D7 F1                       MOV A,@R1
09D8 90                       MOVX @R0,A
09D9 C8                       DEC R0
09DA C9                       DEC R1
09DB EAD7                     DJNZ R2,TX2

09DD E5                       SEL MB0
09DE 3400                     CALL KEYPAD
09E0 344C                     CALL TIME
09E2 F5                       SEL MB1

09E3 B84D                     MOV R0,#77D
09E5 80                       MOVX A,@R0
09E6 AF                       MOV R7,A

09E7 9AF7                     ANL P2,#11110111B      ; 8251A CS-BAR.
09E9 2302                     MOV A,#00000010B
09EB 3F                       MOVD P7,A              ; 8251 SELECT, CMD MODE.

09EC 2325                     MOV A,#00100101B
09EE 90                       MOVX @R0,A             ; RTS-BAR.

09EF 2300                     MOV A,#00000000B
09F1 3F                       MOVD P7,A              ; DATA MODE.
09F2 FF                       MOV A,R7
09F3 90                       MOVX @R0,A             ; SEND DATA.

09F4 BD06                     MOV R5,#6D
09F6 BECD             TX0:    MOV R6,#205D
09F8 EEF8             TX1:    DJNZ R6,TX1
09FA EDF6                     DJNZ R5,TX0            ; 12 MS WAIT LOOP.


09FC 2302                     MOV A,#00000010B
09FE 3F                       MOVD P7,A              ; CMD MODE.
09FF 2315                     MOV A,#00010101B
0A01 90                       MOVX @R0,A
0A02 00                       NOP
```

```
0A03 2303                   MOV A,#00000011B
0A05 3F                     MOVD P7,A
0A06 8A0B                   ORL P2,#00001011B
0A08 E5                     SEL MB0
0A09 3400                   CALL KEYPAD
0A0B 344C                   CALL TIME
0A0D F5                     SEL MB1
0A0E B84D                   MOV R0,#77D
0A10 B907                   MOV R1,#7D
                  TX3:
0A12 80                     MOVX A,@R0
0A13 A1                     MOV @R1,A
0A14 C8                     DEC R0
0A15 C9                     DEC R1
0A16 2347                   MOV A,#71D
0A18 D8                     XRL A,R0
0A19 9612                   JNZ TX3
0A1B 80                     MOVX A,@R0
0A1C A9                     MOV R1,A
0A1D C8                     DEC R0
0A1E 80                     MOVX A,@R0
0A1F A8                     MOV R0,A
0A20 93                     RETR
         $EJECT
0A30                        ORG 0A30H
         $EJECT
```

```
                  ; ================================================================

                  ;        MATCH:  FIND THE STAGE WHICH MATCHES THE CURRENT TEMP...

                  ; ================================================================


                         MATCH:


0A30 BA0B                        ORL P2,#00001011B        ; ADDR. RAM, PAGE 3.
0A32 B896                        MOV R0,#150D
0A34 80                          MOVX A,@R0               ; GET INDOOR TEMP.
0A35 AF                          MOV R7,A
0A36 B895                        MOV R0,#149D
0A38 80                          MOVX A,@R0               ; GET DAY/NIGHT.
0A39 C63F                        JZ MATCH1                ; JMP IF NIGHT.
0A3B B898                        MOV R0,#152D
0A3D 4441                        JMP MATCH2
                         MATCH1:
0A3F B899                        MOV R0,#153D
                         MATCH2:
0A41 80                          MOVX A,@R0               ; GET SETPOINT.
0A42 AE                          MOV R6,A
0A43 FF                          MOV A,R7
0A44 AD                          MOV R5,A
0A45 DE                          XRL A,R6
0A46 964A                        JNZ MATCH3
0A48 4473                        JMP MATC11

                         MATCH3:
0A4A FE                          MOV A,R6
0A4B DD                          XRL A,R5
0A4C C654                        JZ MATCH5                ; JMP IF TEMP.GT.SETPOINT
0A4E FD                          MOV A,R5
0A4F C690                        JZ MATCH6                ; JMP IF TEMP.LT.SETPOINT
0A51 CD                          DEC R5
0A52 444A                        JMP MATCH3

                  ; NOTE: MATCH4 IS NOT USED AS A LABEL.

                         MATCH5:                          ; TEMP.GT.SETPOINT
0A54 FF                          MOV A,R7
0A55 AD                          MOV R5,A
0A56 B895                        MOV R0,#149D
0A58 80                          MOVX A,@R0
0A59 C65F                        JZ MATCH7                ; JMP IF NIGHT.
0A5B BC31                        MOV R4,#49D              ; STAGE TEMP ADDR, DAY.
0A5D 4461                        JMP MATCH8
```

```
                   MATCH7:
0A5F BC3B                  MOV R4,#59D         ; STAGE TEMP ADDR, NIGHT.
                   MATCH8:
0A61 B909                  MOV R1,#9D
0A63 FC                    MOV A,R4
0A64 A8                    MOV R0,A
                   MATCH9:
0A65 80                    MOVX A,@R0          ; GET STAGE TEMP.
0A66 DD                    XRL A,R5            ; COMPARE WITH DECREMENTED TEMP.
0A67 C675                  JZ MATC10           ; JMP FOR MATCH.
0A69 C8                    DEC R0              ; NEXT STAGE.
0A6A E965                  DJNZ R1,MATCH9

0A6C CD                    DEC R5
0A6D FD                    MOV A,R5
0A6E DE                    XRL A,R6            ; COMPARE WITH SETPOINT.
0A6F C673                  JZ MATC11

0A71 4461                  JMP MATCH8

                   MATC11:
0A73 B900                  MOV R1,#0           ; SETPOINT, STAGE '0'

                   MATC10:
0A75 B88F                  MOV R0,#143D
0A77 80                    MOVX A,@R0
0A78 AF                    MOV R7,A            ; (R1 CONTAINS CURRENT
0A79 18                    INC R0              ; STAGE DECISION.)
0A7A 80                    MOVX A,@R0
0A7B DF                    XRL A,R7
0A7C 9687                  JNZ MATC12
0A7E FF                    MOV A,R7
0A7F D9                    XRL A,R1
0A80 9687                  JNZ MATC12
0A82 B89A                  MOV R0,#154D

0A84 F9                    MOV A,R1            ; SAME 3 TIMES IN A ROW,
0A85 90                    MOVX @R0,A          ; MOVE TO NEW STAGE.

0A86 93                    RETR

                   MATC12:
0A87 B88F                  MOV R0,#143D
0A89 80                    MOVX A,@R0
0A8A 18                    INC R0              ; UPDATE STAGE
0A8B 90                    MOVX @R0,A          ; INDICATION HISTORY.
0A8C C8                    DEC R0
0A8D F9                    MOV A,R1
0A8E 90                    MOVX @R0,A
```

```
0A8F 93                    RETR

                   MATCH6:
                                               ; TEMP.LT.SETPOINT
0A90 FF                    MOV A,R7
0A91 AD                    MOV R5,A            ; CURRENT TEMP INTO R5
0A92 B895                  MOV R0,#149D
0A94 80                    MOVX A,@R0
0A95 C69B                  JZ MATC13           ; JMP IF NIGHT.
0A97 BC31                  MOV R4,#49D         ; STAGE TEMP ADDR,'DAY.
0A99 449D                  JMP MATC14

                   MATC13:
0A9B BC3B                  MOV R4,#59D         ; STAGE TEMP ADDR, NIGHT.
                   MATC14:
0A9D B909                  MOV R1,#9D
0A9F FC                    MOV A,R4
0AA0 A8                    MOV R0,A
                   MATC15:
0AA1 80                    MOVX A,@R0          ; GET STAGE TEMP.
0AA2 DD                    XRL A,R5            ; COMPARE WITH INCREMENTED TEMP.
0AA3 C675                  JZ MATC10           ; JMP FOR MATCH. R1=STAGE.
0AA5 C8                    DEC R0
0AA6 E9A1                  DJNZ R1,MATC15

0AA8 1D                    INC R5
0AA9 FD                    MOV A,R5
0AAA DE                    XRL A,R6
0AAB C673                  JZ MATC11           ; SETPOINT STAGE.

0AAD 449D                  JMP MATC14

          $EJECT



0B00                       ORG 0B00H





          $EJECT
```

```
                    ; ==================================================================

                    ;          USART RECEIVE DATA PROCESSOR...
                    ;                        THIS IS A GENERAL-PURPOSE RECEIVE
                    ;                        DATA HANDLER FOR INTERFACE WITH THE
                    ;                        8251A USART.  WHEN DATA IS READY
                    ;                        FOR THE CPU, THIS ROUTINE PLACES
                    ;                        THE RECEIVED BYTE INTO DECIMAL
                    ;                        LOCATION 148 OF PAGE THREE OF
                    ;                        OFF-CHIP RAM.  IT ALSO MONITORS
                    ;                        TRANSMISSIONS OF ANY OTHER
                    ;                        NET MASTERS WHO MAY BE PRESENT,
                    ;                        AND CONTINUALLY UPDATES TIME SLOT
                    ;                        SYNCHRONIZATION.

                    ; ==================================================================


                           RX:
0B00 9AF7                          ANL P2,#11110111B         ; 8251A CS-BAR.

0B02 2302                          MOV A,#00000010B
0B04 3F                            MOVD P7,A                 ; 8251 CS, CMD MODE.

0B05 80                            MOVX A,@R0                ; GET STATUS.

0B06 AF                            MOV R7,A
0B07 43FD                          ORL A,#11111101B
0B09 37                            CPL A
0B0A C612                          JZ RX1                    ; JMP IF DATA READY.

0B0C 2303                          MOV A,#00000011B
0B0E 3F                            MOVD P7,A
0B0F 8A0B                          ORL P2,#00001011B
0B11 93                            RETR

                           RX1:
                                                             ; DATA READY.
0B12 FF                            MOV A,R7                  ; FIRST CHECK PARITY.
0B13 5308                          ANL A,#00001000B
0B15 C624                          JZ RX2                    ; JMP IF NO PARITY ERROR.
0B17 2314                          MOV A,#00010100B          ; RESET PARITY ERROR FLAG.
0B19 90                            MOVX @R0,A
0B1A 2300                          MOV A,#00000000B          ; DATA MODE.
0B1C 3F                            MOVD P7,A
0B1D 80                            MOVX A,@R0
0B1E 2303                          MOV A,#00000011B          ; DESELECT 8251.
0B20 3F                            MOVD P7,A
0B21 8A0B                          ORL P2,#00001011B
0B23 93                            RETR
```

```
                    RX2:                                ; PARITY CHECK OKAY.
0B24 2300                   MOV A,#00000000B
0B26 3F                     MOVD P7,A                   ; DATA MODE.
0B27 80                     MOVX A,@R0                  ; READ IN THE DATA.
0B28 AF                     MOV R7,A
0B29 2303                   MOV A,#00000011B            ; DESELECT.
0B2B 3F                     MOVD P7,A
0B2C 8A0B                   ORL P2,#00001011B           ; SELECT RAM, PAGE 3.
0B2E FF                     MOV A,R7

0B2F B894                   MOV R0,#148D
0B31 90                     MOVX @R0,A                  ; UPDATE RECEIVED DATA STORAGE.

                ;           NOW CHECK TO SEE IF THIS IS A FRAMING BYTE (FFH)
                ;           FROM ANOTHER NET MASTER, AND ADJUST OUR TIME SLOT
                ;           CLOCK AND ADDRESSED-MCI VARIABLE TO BE IN LOCK
                ;           WITH HIS.

0B32 D3FF                   XRL A,#0FFH
0B34 C637                   JZ RX3
0B36 93                     RETR

                    RX3:                                ; ANOTHER NET MASTER HAS
                                                        ; INTERROGATED AN MCI,
                                                        ; WAIT FOR AND GET THE
                                                        ; MCI ADDRESS DATA, UNLESS
                                                        ; WE COME UP AGAINST THE
                                                        ; END OF OUR OWN TIME SLOT,
                                                        ; IN WHICH CASE HE WILL
                                                        ; SLAVE HIS TIMING TO US.
0B37 8A0B                   ORL P2,#00001011B

0B39 2303                   MOV A,#00000011B
0B3B 3F                     MOVD P7,A

0B3C 8A0B                   ORL P2,#00001011B

0B3E E5                     SEL MB0
0B3F 344C                   CALL TIME
0B41 3400                   CALL KEYPAD
0B43 F5                     SEL MB1

0B44 B88C                   MOV R0,#140D
0B46 80                     MOVX A,@R0
0B47 D303                   XRL A,#3D
0B49 964C                   JNZ RX4
0B4B 93                     RETR
                    RX4:
0B4C 9AF7                   ANL P2,#11110111B           ; 8251A CS-BAR.
0B4E 2302                   MOV A,#00000010B
```

```
0B50 3F                MOVD P7,A
0B51 80                MOVX A,@R0
0B52 3256              JB1 RX5                ; JMP IF DATA READY.
0B54 6437              JMP RX3                ; WAIT LOOP.
                RX5:
0B56 729A              JB3 RX6                ; JMP ON PARITY ERROR.
0B58 9AF7              ANL P2,#11110111B
0B5A 2300              MOV A,#00000000B
0B5C 3F                MOVD P7,A

0B5D 80                MOVX A,@R0             ; GET RX DATA.
0B5E AF                MOV R7,A               ; PUT ASIDE NEW T0TP.
                RX7:

0B5F 2303              MOV A,#00000011B
0B61 3F                MOVD P7,A
0B62 8A0B              ORL P2,#00001011B

0B64 E5                SEL MB0
0B65 344C              CALL TIME
0B67 3400              CALL KEYPAD
0B69 F5                SEL MB1

0B6A B88C              MOV R0,#140D
0B6C 80                MOVX A,@R0
0B6D D303              XRL A,#3D
0B6F 9672              JNZ RX8
0B71 93                RETR
                RX8:
0B72 9AF7              ANL P2,#11110111B      ; 8251A CS-BAR.

0B74 2302              MOV A,#00000010B
0B76 3F                MOVD P7,A

0B77 80                MOVX A,@R0
0B78 327C              JB1 RX9                ; JMP IF DATA READY.
0B7A 645F              JMP RX7                ; WAIT LOOP.
                RX9:
0B7C 729A              JB3 RX6                ; JMP ON PARITY ERROR.
0B7E 65                STOP TCNT              ; STOP TIMER.

0B7F 2300              MOV A,#00000000B
0B81 3F                MOVD P7,A
0B82 80                MOVX A,@R0             ; GET RX DATA.
0B83 AE                MOV R6,A               ; PUT ASIDE NEW T2T1.
0B84 B89C              MOV R0,#156D           ; T0TP ADDRESS.
0B86 B99D              MOV R1,#157D           ; T2T1 ADDRESS.

0B88 2303              MOV A,#00000011B
```

```
0B8A 3F        1=2763.              MOVD P7,A
0B8B 8A0B      1=2764               ORL P2,#00001011B
0B8D FF        1=2765               MOV A,R7
0B8E 90        1=2766               MOVX @R0,A              ; UPDATE TOTP.
0B8F FE        1=2767               MOV A,R6
0B90 91        1=2768               MOVX @R1,A              ; UPDATE T2T1.
0B91 27        1=2769               CLR A
0B92 62        1=2770               MOV T,A
0B93 55        1=2771               STRT T
0B94 2301      1=2772               MOV A,#1D               ; SET UP TIMER AND
0B96 B88C      1=2773               MOV R0,#140D            ; OVERFLOW COUNTER FOR
0B98 90        1=2774               MOVX @R0,A              ; ABOUT ONE-THIRD OF
               1=2775                                       ; THE WAY INTO THE NEWLY
               1=2776                                       ; DEFINED TIME SLOT.
               1=2777
0B99 93        1=2778               RETR
               1=2779
               1=2780       RX6:
0B9A 2300      1=2781               MOV A,#00000000B
0B9C 3F        1=2782               MOVD P7,A
               1=2783
0B9D 80        1=2784               MOVX A,@R0              ; DISCARD THE DATA.
               1=2785
               1=2786
0B9E 2303      1=2787               MOV A,#00000011B
0BA0 3F        1=2788               MOVD P7,A
0BA1 8A0B      1=2789               ORL P2,#00001011B
               1=2790
0BA3 93        1=2791               RETR
               1=2792
               1=2793
               1=2794 $EJECT
               1=2795
                =2796 $EJECT
                =2797
0C00            =2798       ORG 0C00H
                =2799 $INCLUDE (SUBFYL.SRC)
               1=2800
               1=2801
               1=2802 ;*****************************************************************
               1=2803
               1=2804 ;                SUBFYL--FILE OF SHORT SUBROUTINES
               1=2805
               1=2806 ;*****************************************************************
               1=2807
               1=2808         DBLANK:
               1=2809 ;       THIS ROUTINE BLANKS THE DISPLAY, WITHOUT DISTURBING
               1=2810 ;       THE AUTO/MAN LED'S.
               1=2811
0C00 B86E      1=2812               MOV R0,#110D
```

```
0C02 B908                MOV R1,#8D
0C04 27                  CLR A
0C05 37                  CPL A
                 DBLAN1:
0C06 90                  MOVX @R0,A
0C07 C8                  DEC R0
0C08 E906                DJNZ R1,DBLAN1
0C0A B866                MOV R0,#102D
0C0C 27                  CLR A
0C0D 90                  MOVX @R0,A
0C0E C8                  DEC R0
0C0F 90                  MOVX @R0,A

0C10 93                  RETR

      ;==============================================================

                 DFILL:
      ;          THIS ROUTINE FILLS THE DISPLAY WITH ZEROS AND
      ;          DECIMAL POINTS, BUT NO AUX LED'S, SAVE AUTO/MAN.

0C11 B86E                MOV R0,#110D
0C13 B908                MOV R1,#8D
0C15 27                  CLR A
                 DFILL1:
0C16 90                  MOVX @R0,A
0C17 C8                  DEC R0
0C18 E916                DJNZ R1,DFILL1
0C1A B866                MOV R0,#102D
0C1C 27                  CLR A
0C1D 90                  MOVX @R0,A
0C1E 37                  CPL A
0C1F C8                  DEC R0
0C20 90                  MOVX @R0,A
0C21 C8                  DEC R0
0C22 27                  CLR A
0C23 90                  MOVX @R0,A

0C24 93                  RETR

      ;===================================================================


                 DP:
      ;          THIS ROUTINE FILLS THE DISPLAY WITH DECIMAL POINTS
      ;          WITHOUT DISTURBING THE 'AUTO/MAN' OR 'STBY PWR' LED'S.

0C25 B86E                MOV R0,#110D
0C27 B908                MOV R1,#8D
0C29 23FF                MOV A,#0FFH            ; BLANKING CODE.
```

```
                    DP1:
0C2B 90                         MOVX @R0,A
0C2C C8                         DEC R0
0C2D E92B                       DJNZ R1,DP1
0C2F B866                       MOV R0,#102D
0C31 27                         CLR A
0C32 90                         MOVX @R0,A
0C33 C8                         DEC R0
0C34 37                         CPL A
0C35 90                         MOVX @R0,A

0C36 93                         RETR

                ;=====================================================================
                $EJECT


                $INCLUDE (DSPHLR.SRC)


                 ;**********************************************************************

                 ;              SUBROUTINE 'DSPHLR'...

                 ; THIS ROUTINE DIRECTS WHAT INFO IS SHOWN IN THE DISPLAY.
                 ; LOCATION #DCTRL=#122 (DECIMAL) IN OFF-CHIP PAGE THREE
                 ; RAM IS USED TO SELECT THE DESIRED DISPLAY ROUTINE, DENOTED
                 ; BY THESE LABELS:

                 ;      LABEL                           INFO DISPLAYED
                 ;      -----                           --------------

                 ;      D00                             ALL DIGITS=0.  ALL
                ;                                       DP'S ON. NO EXT LED'S ON,
                ;                                       EXCEPT AUTO/MAN.

                 ;      D01                             BLANK DISPLAY EXCEPT FOR
                 ;                                      'AUTO/MAN' OR 'STBY' LED'S
                 ;                                      WHEN APPROPRIATE.

                 ;      D02                             TIME OF DAY.

                ;       D03                             INDOOR TEMPERATURE.

                ;       D04                             OUTDOOR TEMPERATURE.

                ;       D05                             TEMP SET POINT.


                ;       D06                             CURRENT STAGE.
```

```
                  ;      D07                           SEQUENCED DATA.

                  ; NOTE*****NO DISPLAY MODS ARE MADE BY THIS ROUTINE
                  ; UNTIL LOCATION #32D OF PAGE 3 RAM IS VERIFIED TO CONTAIN
                  ; 'QUO'.

                         DSPHLR:

007A                     DCTRL   EQU 122D

0C37 8A0F                        ORL P2,#0FH           ; SELECT PAGE 3 RAM

0C39 B820                        MOV R0,#32D
0C3B 80                          MOVX A,@R0
0C3C AF                          MOV R7,A
0C3D D341                        XRL A,#(LOW QUO)      ; INHIBIT DISPLAY MODS
0C3F C647                        JZ DSPMOD             ; WHEN KEYSTROKES IN PROGRESS.
0C41 FF                          MOV A,R7
0C42 D374                        XRL A,#(LOW MANN)
0C44 C647                        JZ DSPMOD

0C46 93                          RETR

                         DSPMOD:
0C47 B87A                        MOV R0,#DCTRL
0C49 80                          MOVX A,@R0
0C4A B3                          JMPP @A

0C4B 4C                  D00:    DB ((LOW D00)+1)
0C4C 9411                        CALL DFILL
0C4E 93                          RETR

0C4F 50                  D01:    DB ((LOW D01)+1)
0C50 9400                        CALL DBLANK
0C52 93                          RETR

0C53 54                  D02:    DB ((LOW D02)+1)
0C54 B86E                        MOV R0,#110D          ; DISPLAY TIME.
0C56 B987                        MOV R1,#135D
0C58 BF02                        MOV R7,#2D
                         D021:
0C5A 81                          MOVX A,@R1
0C5B 90                          MOVX @R0,A
```

```
0C5C C8                 DEC R0
0C5D C9                 DEC R1
0C5E 81                 MOVX A,@R1
0C5F 90                 MOVX @R0,A
0C60 C8                 DEC R0
0C61 27                 CLR A
0C62 37                 CPL A
0C63 90                 MOVX @R0,A
0C64 C8                 DEC R0
0C65 C9                 DEC R1
0C66 EF5A               DJNZ R7,D021
0C68 81                 MOVX A,@R1
0C69 90                 MOVX @R0,A
0C6A C8                 DEC R0
0C6B C9                 DEC R1
0C6C 81                 MOVX A,@R1
0C6D 90                 MOVX @R0,A

0C6E B866               MOV R0,#102D       ; AM/PM INDICATION
0C70 B98A               MOV R1,#138D
0C72 81                 MOVX A,@R1
0C73 C679               JZ D022            ; JMP FOR 'AM'
0C75 23F0               MOV A,#0F0H
0C77 90                 MOVX @R0,A
0C78 93                 RETR
                D022:
0C79 230F               MOV A,#00FH
0C7B 90                 MOVX @R0,A

0C7C 93                 RETR

0C7D 7E         D03:    DB ((LOW D03)+1)   ; DISPLAY INDOOR TEMPERATURE.
0C7E A400               JMP XD03
0C80 81         D04:    DB ((LOW D04)+1)   ; DISPLAY OUTDOOR TEMP.
0C81 A48B               JMP XD04
0C83 84         D05:    DB ((LOW D05)+1)   ; DISPLAY SET POINT.
0C84 A49F               JMP XD05
0C86 87         D06:    DB ((LOW D06)+1)   ; DISPLAY CURRENT STAGE.


0C87 9400               CALL DBLANK
0C89 B86E               MOV R0,#110D
0C8B 2381               MOV A,#81H
0C8D 90                 MOVX @R0,A
0C8E C8                 DEC R0
0C8F 2370               MOV A,#70H
0C91 90                 MOVX @R0,A
0C92 B89A               MOV R0,#154D
0C94 80                 MOVX A,@R0
```

```
0C95 AF                  MOV R7,A
0C96 B864                MOV R0,#100D
0C98 80                  MOVX A,@R0
0C99 530F                ANL A,#00001111B
0C9B C6A1                JZ D061
0C9D B801                MOV R0,#1
0C9F 80                  MOVX A,@R0          ; GET MANUAL STAGE.
0CA0 AF                  MOV R7,A
                 D061:
0CA1 FF                  MOV A,R7

0CA2 B867                MOV R0,#103D
0CA4 90                  MOVX @R0,A
0CA5 93                  RETR

0CA6 A7          D07:    DB ((LOW D07)+1)
                                             ; DISPLAY SEQUENCED DATA,
                                             ; TIME, SET. PT., IN TEMP,
                                             ; OUT TEMP, CURRENT STAGE.
0CA7 B882                MOV R0,#130D
0CA9 80                  MOVX A,@R0
0CAA C6B6                JZ D075
0CAC D305                XRL A,#5D
0CAE C6B6                JZ D075

0CB0 B87C                MOV R0,#124D
0CB2 80                  MOVX A,@R0
0CB3 C654                JZ (D02+1)

0CB5 93                  RETR
                 D075:
0CB6 B882                MOV R0,#130D
0CB8 80                  MOVX A,@R0
0CB9 AF                  MOV R7,A
0CBA B87D                MOV R0,#125D
0CBC 80                  MOVX A,@R0
0CBD AE                  MOV R6,A
0CBE FF                  MOV A,R7
0CBF 90                  MOVX @R0,A
                                             ; UPDATE 'DLAST'
0CC0 FE                  MOV A,R6
0CC1 DF                  XRL A,R7
0CC2 96CA                JNZ D076

0CC4 B87C                MOV R0,#124D
0CC6 80                  MOVX A,@R0
0CC7 C654                JZ (D02+1)

0CC9 93                  RETR
                 D076:
```

```
0CCA FF      1=3062              MOV A,R7
0CCB 90      1=3063              MOVX @R0,A
             1=3064
0CCC B87C    1=3065              MOV R0,#124D
0CCE 80      1=3066              MOVX A,@R0            ; GET DPTR.
0CCF 17      1=3067              INC A
0CD0 AF      1=3068              MOV R7,A
0CD1 D305    1=3069              XRL A,#5D
0CD3 96D6    1=3070              JNZ D070
0CD5 AF      1=3071              MOV R7,A
             1=3072       D070:
0CD6 FF      1=3073              MOV A,R7
0CD7 90      1=3074              MOVX @R0,A
             1=3075
0CD8 96DC    1=3076              JNZ D071
0CDA 8454    1=3077              JMP (D02+1)           ; DSP TIME.
             1=3078       D071:
0CDC FF      1=3079              MOV A,R7
0CDD D301    1=3080              XRL A,#1
0CDF 96E3    1=3081              JNZ D072
0CE1 8484    1=3082              JMP (D05+1)           ; DSP SET POINT.
             1=3083       D072:
0CE3 FF      1=3084              MOV A,R7
0CE4 D302    1=3085              XRL A,#2D
0CE6 96EA    1=3086              JNZ D073
0CE8 847E    1=3087              JMP (D03+1)           ; DSP INDOOR TEMP.
             1=3088       D073:
0CEA FF      1=3089              MOV A,R7
0CEB D303    1=3090              XRL A,#3D
0CED 96F1    1=3091              JNZ D074
0CEF 8481    1=3092              JMP (D04+1)           ; DSP OUTDOOR TEMP.
             1=3093       D074:
0CF1 8487    1=3094              JMP (D06+1)           ; DSP CURRENT STAGE.
             1=3095
             1=3096
             1=3097
             1=3098
             1=3099
0D00         1=3100              ORG 0D00H
             1=3101
             1=3102
             1=3103 $EJECT
             1=3104
             1=3105       XD03:
0D00 9400    1=3106              CALL DBLANK
0D02 B896    1=3107              MOV R0,#150D          ; INDOOR ADDR.
             1=3108
             1=3109       D041:                        ; ENTRY POINT FOR D04 ROUTINE.
             1=3110
             1=3111
```

```
0D04 80                        MOVX A,@R0          ; GET INDOOR TEMP

0D05 B47F                      CALL FASP           ; CONVERT ASPIRATOR CODE
                                                   ; TO FAHRENHEIT.
0D07 AF                        MOV R7,A
0D08 B800                      MOV R0,#0
0D0A 80                        MOVX A,@R0
0D0B C611                      JZ D031
0D0D FF                        MOV A,R7
0D0E D425                      CALL CF
0D10 AF                        MOV R7,A

                 D031:
0D11 B900                      MOV R1,#0
0D13 2383                      MOV A,#83H
0D15 B86E                      MOV R0,#110D
0D17 90                        MOVX @R0,A
0D18 2384                      MOV A,#84H
0D1A C8                        DEC R0
0D1B 90                        MOVX @R0,A
0D1C 27                        CLR A
0D1D 37                        CPL A
0D1E C8                        DEC R0
0D1F 90                        MOVX @R0,A
0D20 C8                        DEC R0
0D21 90                        MOVX @R0,A
0D22 C8                        DEC R0
0D23 90                        MOVX @R0,A
0D24 FF                        MOV A,R7
0D25 37                        CPL A
0D26 F231                      JB7 D032
0D28 2387                      MOV A,#87H
0D2A 90                        MOVX @R0,A          ; MINUS SIGN.

0D2B FF                        MOV A,R7
0D2C 37                        CPL A
0D2D 17                        INC A
0D2E AF                        MOV R7,A

0D2F A446                      JMP D035
                 D032:
                                                   ; POS. TEMP.
0D31 FF                        MOV A,R7
0D32 AE                        MOV R6,A            ; CHK WHETHER OVER 99 DEG.

                 D033:
0D33 C646                      JZ D035
0D35 D364                      XRL A,#100D
0D37 C63D                      JZ D034
```

```
0D39 CE        1=3162            DEC R6
0D3A FE        1=3163            MOV A,R6
0D3B A433      1=3164            JMP D033
               1=3165   D034:
               1=3166                                ; T.GT.99
0D3D 2301      1=3167            MOV A,#1
0D3F 90        1=3168            MOVX @R0,A
0D40 FF        1=3169            MOV A,R7
0D41 37        1=3170            CPL A
0D42 0364      1=3171            ADD A,#100D         ; SUBTR. 100 FROM TEMP.
0D44 37        1=3172            CPL A
0D45 AF        1=3173            MOV R7,A
               1=3174
               1=3175   D035:                        ; T.LE.99 OR NEG.
0D46 BD0A      1=3176            MOV R5,#10D
               1=3177
0D48 BE5A      1=3178            MOV R6,#90D
               1=3179
               1=3180   D036:
0D4A FF        1=3181            MOV A,R7
0D4B DE        1=3182            XRL A,R6
0D4C C65A      1=3183            JZ D037
0D4E FE        1=3184            MOV A,R6
0D4F 37        1=3185            CPL A
0D50 030A      1=3186            ADD A,#10D
0D52 37        1=3187            CPL A
0D53 AE        1=3188            MOV R6,A
0D54 ED4A      1=3189            DJNZ R5,D036
0D56 CF        1=3190            DEC R7
0D57 19        1=3191            INC R1
0D58 A446      1=3192            JMP D035
               1=3193
               1=3194   D037:
0D5A B869      1=3195            MOV R0,#105D
               1=3196
0D5C 27        1=3197            CLR A
0D5D AC        1=3198            MOV R4,A
0D5E FE        1=3199            MOV A,R6
0D5F C66C      1=3200            JZ D0310
               1=3201
               1=3202   D0311:
0D61 BD0A      1=3203            MOV R5,#10D
               1=3204   D039:
0D63 CE        1=3205            DEC R6
0D64 ED63      1=3206            DJNZ R5,D039
0D66 1C        1=3207            INC R4
0D67 FE        1=3208            MOV A,R6
0D68 C66C      1=3209            JZ D0310
0D6A A461      1=3210            JMP D0311
               1=3211   D0310:
0D6C FC        1=3212            MOV A,R4
               1=3213
```

```
0D6D 90        1=3214              MOVX @R0,A
0D6E C8        1=3215              DEC R0
0D6F F9        1=3216              MOV A,R1
0D70 90        1=3217              MOVX @R0,A
0D71 C8        1=3218              DEC R0
0D72 B900      1=3219              MOV R1,#0
0D74 81        1=3220              MOVX A,@R1
0D75 C67B      1=3221              JZ D038
0D77 2310      1=3222              MOV A,#10H
0D79 90        1=3223              MOVX @R0,A
0D7A 93        1=3224              RETR
               1=3225    D038:
0D7B 2380      1=3226              MOV A,#80H
0D7D 90        1=3227              MOVX @R0,A
               1=3228
0D7E 93        1=3229              RETR
               1=3230
               1=3231    FASP:                         ; ASP CODE IN ACC ON ENTRY.
               1=3232                                  ; DEG F, 2'S COMP, ON EXIT.
0D7F BE5A      1=3233              MOV R6,#90D
               1=3234
               1=3235    FASP1:
0D81 C687      1=3236              JZ FASP2
0D83 07        1=3237              DEC A
0D84 EE81      1=3238              DJNZ R6,FASP1
0D86 93        1=3239              RETR
               1=3240
               1=3241    FASP2:
0D87 FE        1=3242              MOV A,R6
0D88 37        1=3243              CPL A
0D89 17        1=3244              INC A
0D8A 93        1=3245              RETR
               1=3246
               1=3247
               1=3248
               1=3249    XD04:
0D8B 9400      1=3250              CALL DBLANK
0D8D B897      1=3251              MOV R0,#151D
0D8F B404      1=3252              CALL D041
0D91 B86E      1=3253              MOV R0,#110D
0D93 2385      1=3254              MOV A,#85H
0D95 90        1=3255              MOVX @R0,A
0D96 C8        1=3256              DEC R0
0D97 2386      1=3257              MOV A,#86H
0D99 90        1=3258              MOVX @R0,A
0D9A C8        1=3259              DEC R0
0D9B 2370      1=3260              MOV A,#70H
0D9D 90        1=3261              MOVX @R0,A
               1=3262
0D9E 93        1=3263              RETR
```

```
                  XD05:
0D9F 9400                  CALL DBLANK

0DA1 B895                  MOV R0,#149D
0DA3 80                    MOVX A,@R0
0DA4 96AA                  JNZ D051

0DA6 B899                  MOV R0,#153D        ; NIGHT SP ADDR.
0DA8 A4AC                  JMP D052
                  D051:
0DAA B898                  MOV R0,#152D        ; DAY SP ADDR.

                  D052:
0DAC 80                    MOVX A,@R0          ; GET SP, ASP CODE.
0DAD B47F                  CALL FASP           ; TRANSLATE TO DEG F.
0DAF AF                    MOV R7,A
0DB0 B800                  MOV R0,#0
0DB2 80                    MOVX A,@R0
0DB3 C6B9                  JZ D053
0DB5 FF                    MOV A,R7
0DB6 D425                  CALL CF             ; F TO C.
0DB8 AF                    MOV R7,A
                  D053:
0DB9 FF                    MOV A,R7
0DBA B411                  CALL D031           ; BORROW ROUTINE TO CONVERT
                                               ; TO DISPLAY BCD FORMAT.
0DBC B86E                  MOV R0,#110D
0DBE 2381                  MOV A,#81H
0DC0 90                    MOVX @R0,A
0DC1 C8                    DEC R0
0DC2 2370                  MOV A,#70H
0DC4 90                    MOVX @R0,A
0DC5 C8                    DEC R0
0DC6 2382                  MOV A,#82H
0DC8 90                    MOVX @R0,A
0DC9 C8                    DEC R0
0DCA 2370                  MOV A,#70H
0DCC 90                    MOVX @R0,A
0DCD 93                    RETR





            $EJECT


0E00                       ORG 0E00H
```

```
                 FC:

0E00 AC                  MOV R4,A
0E01 F21C                JB7 FC2
                 FC1:
0E03 FC                  MOV A,R4
0E04 77                  RR A
0E05 537F                ANL A,#01111111B
0E07 77                  RR A
0E08 537F                ANL A,#01111111B
0E0A AB                  MOV R3,A
0E0B FC                  MOV A,R4
0E0C 6C                  ADD A,R4
0E0D 37                  CPL A
0E0E 6B                  ADD A,R3
0E0F 37                  CPL A
0E10 AB                  MOV R3,A
0E11 FA                  MOV A,R2
0E12 C618                JZ FC3
0E14 FB                  MOV A,R3
0E15 37                  CPL A
0E16 17                  INC A
0E17 AB                  MOV R3,A
                 FC3:
0E18 FB                  MOV A,R3
0E19 0320                ADD A,#32D
0E1B 93                  RETR
                 FC2:
0E1C 2301                MOV A,#1
0E1E AA                  MOV R2,A
0E1F FC                  MOV A,R4
0E20 37                  CPL A
0E21 17                  INC A
0E22 AC                  MOV R4,A
0E23 C403                JMP FC1



           $EJECT


                 CF:
0E25 37                  CPL A
0E26 0320                ADD A,#32D
0E28 37                  CPL A
0E29 AC                  MOV R4,A
0E2A F245                JB7 CF2                ; JMP FOR NEG (F-32)
                 CF1:
0E2C FC                  MOV A,R4
```

```
0E2D 77         1=3364                    RR A
0E2E 537F       1=3365                    ANL A,#01111111B
0E30 AB         1=3366                    MOV R3,A
0E31 77         1=3367                    RR A
0E32 537F       1=3368                    ANL A,#01111111B
0E34 77         1=3369                    RR A
0E35 537F       1=3370                    ANL A,#01111111B
0E37 77         1=3371                    RR A
0E38 537F       1=3372                    ANL A,#01111111B
0E3A 6B         1=3373                    ADD A,R3
0E3B AB         1=3374                    MOV R3,A
0E3C FA         1=3375                    MOV A,R2
0E3D C643       1=3376                    JZ CF3
0E3F FB         1=3377                    MOV A,R3
0E40 37         1=3378                    CPL A
0E41 17         1=3379                    INC A
0E42 AB         1=3380                    MOV R3,A
                1=3381           CF3:
0E43 FB         1=3382                    MOV A,R3
0E44 93         1=3383                    RETR
                1=3384           CF2:
0E45 37         1=3385                    CPL A
0E46 17         1=3386                    INC A
0E47 AC         1=3387                    MOV R4,A
0E48 2301       1=3388                    MOV A,#1
0E4A AA         1=3389                    MOV R2,A
0E4B C42C       1=3390                    JMP CF1
                1=3391
                1=3392
                1=3393 $EJECT
                1=3394
                1=3395
                1=3396
                1=3397
                1=3398
                1=3399           WAITER:
0E4D BEFF       1=3400                    MOV R6,#0FFH
                1=3401           WAIT0:
0E4F BFFF       1=3402                    MOV R7,#0FFH
                1=3403           WAIT1:
0E51 EF51       1=3404                    DJNZ R7,WAIT1
0E53 EE4F       1=3405                    DJNZ R6,WAIT0
0E55 93         1=3406                    RETR
                1=3407
                1=3408 $EJECT
                1=3409
                1=3410
                1=3411           NUMCHK:
0E56 AF         1=3412                    MOV R7,A
```

```
0E57 BE09                    MOV R6,#9D
                     NUMCH1:
0E59 FF                      MOV A,R7
0E5A DE                      XRL A,R6
0E5B C665                    JZ NUMCH2
0E5D EE59                    DJNZ R6,NUMCH1
0E5F FF                      MOV A,R7
0E60 C665                    JZ NUMCH2
0E62 E5                      SEL MB0
0E63 0400                    JMP 000
                     NUMCH2:
0E65 FF                      MOV A,R7
0E66 93                      RETR
               $EJECT
0F00                         ORG 0F00H
                     ADDR:
0F00 00                      NOP
0F01 E5                      SEL MB0
0F02 3400                    CALL KEYPAD
0F04 F5                      SEL MB1
0F05 B810                    MOV R0,#16D
0F07 80                      MOVX A,@R0
0F08 D310                    XRL A,#16D
0F0A C600                    JZ ADDR
0F0C 2310                    MOV A,#16D
0F0E 90                      MOVX @R0,A
0F0F 18                      INC R0
0F10 80                      MOVX A,@R0
0F11 D30F                    XRL A,#0FH
0F13 C618                    JZ ADDR1
0F15 E5                      SEL MB0
0F16 0400                    JMP 000
                     ADDR1:
0F18 9400                    CALL DBLANK
0F1A B86E                    MOV R0,#110D
0F1C 2301                    MOV A,#1D
0F1E 90                      MOVX @R0,A
0F1F C8                      DEC R0
0F20 2387                    MOV A,#87H
0F22 90                      MOVX @R0,A
0F23 27                      CLR A
0F24 C8                      DEC R0
```

```
0F25 90               MOVX @R0,A
0F26 2390             MOV A,#90H
0F28 C8               DEC R0
0F29 90               MOVX @R0,A
0F2A C8               DEC R0
0F2B 90               MOVX @R0,A
0F2C E5               SEL MB0
0F2D 5400             CALL DISPLA
              ADDR2:
0F2F E5               SEL MB0
0F30 3400             CALL KEYPAD
0F32 F5               SEL MB1
0F33 B810             MOV R0,#16D
0F35 80               MOVX A,@R0
0F36 D310             XRL A,#16D
0F38 C62F             JZ ADDR2
0F3A 2310             MOV A,#16D
0F3C 90               MOVX @R0,A
0F3D 18               INC R0
0F3E 80               MOVX A,@R0
0F3F AF               MOV R7,A
0F40 D30F             XRL A,#0FH
0F42 C67B             JZ VNTEND
0F44 FF               MOV A,R7
0F45 D456             CALL NUMCHK
0F47 B86B             MOV R0,#107D
0F49 90               MOVX @R0,A
0F4A E5               SEL MB0
0F4B 5400             CALL DISPLA
              ADDR3:
0F4D E5               SEL MB0
0F4E 3400             CALL KEYPAD
0F50 F5               SEL MB1
0F51 B810             MOV R0,#16D
0F53 80               MOVX A,@R0
0F54 D310             XRL A,#16D
0F56 C64D             JZ ADDR3
0F58 2310             MOV A,#16D
0F5A 90               MOVX @R0,A
0F5B 18               INC R0
0F5C 80               MOVX A,@R0
0F5D D456             CALL NUMCHK
0F5F B86A             MOV R0,#106D
0F61 90               MOVX @R0,A
```

```
0F62 E5         1=3506                SEL MB0
0F63 5400       1=3507                CALL DISPLA
0F65 F5         1=3508                SEL MB1
0F66 B8A2       1=3509                MOV R0,#162D
0F68 80         1=3510                MOVX A,@R0
0F69 17         1=3511                INC A
0F6A 90         1=3512                MOVX @R0,A
0F6B 03A2       1=3513                ADD A,#162D
0F6D A8         1=3514                MOV R0,A              ; BCD T1TO ADDR IN R0.
0F6E B96B       1=3515                MOV R1,#107D
0F70 81         1=3516                MOVX A,@R1
0F71 47         1=3517                SWAP A
0F72 AF         1=3518                MOV R7,A
0F73 C9         1=3519                DEC R1
0F74 81         1=3520                MOVX A,@R1
0F75 4F         1=3521                ORL A,R7              ; BCD T1TO IN ACC.
0F76 90         1=3522                MOVX @R0,A
0F77 D44D       1=3523                CALL WAITER
0F79 E418       1=3524                JMP ADDR1
                1=3525        VNTEND:
0F7B 2302       1=3526                MOV A,#2D
0F7D B809       1=3527                MOV R0,#9D
0F7F 90         1=3528                MOVX @R0,A            ; SET OUTASP PREFIX.
0F80 239E       1=3529                MOV A,#158D
0F82 B80A       1=3530                MOV R0,#10D
0F84 90         1=3531                MOVX @R0,A            ; SET OUTASP ADDR. REF.
                1=3532        VNTEN1:
0F85 B809       1=3533                MOV R0,#9D
0F87 80         1=3534                MOVX A,@R0
0F88 B86E       1=3535                MOV R0,#110D
0F8A 90         1=3536                MOVX @R0,A
0F8B C8         1=3537                DEC R0
0F8C 2387       1=3538                MOV A,#87H
0F8E 90         1=3539                MOVX @R0,A
0F8F C8         1=3540                DEC R0
0F90 27         1=3541                CLR A
0F91 90         1=3542                MOVX @R0,A
0F92 C8         1=3543                DEC R0
0F93 2390       1=3544                MOV A,#90H
0F95 90         1=3545                MOVX @R0,A
0F96 C8         1=3546                DEC R0
0F97 90         1=3547                MOVX @R0,A
0F98 E5         1=3548                SEL MB0
0F99 5400       1=3549                CALL DISPLA
```

```
                      VNTEN2:
0F9B E5                       SEL MB0
0F9C 3400                     CALL KEYPAD
0F9E F5                       SEL MB1
0F9F B810                     MOV R0,#16D
0FA1 80                       MOVX A,@R0
0FA2 D310                     XRL A,#16D
0FA4 C69B                     JZ VNTEN2
0FA6 2310                     MOV A,#16D
0FA8 90                       MOVX @R0,A
0FA9 18                       INC R0
0FAA 80                       MOVX A,@R0
0FAB D456                     CALL NUMCHK
0FAD B86B                     MOV R0,#107D
0FAF 90                       MOVX @R0,A
0FB0 AF                       MOV R7,A
0FB1 B80A                     MOV R0,#10D
0FB3 80                       MOVX A,@R0
0FB4 A8                       MOV R0,A
0FB5 18                       INC R0
0FB6 FF                       MOV A,R7
0FB7 90                       MOVX @R0,A
0FB8 E5                       SEL MB0
0FB9 5400                     CALL DISPLA
                      VNTEN3:
0FBB E5                       SEL MB0
0FBC 3400                     CALL KEYPAD
0FBE F5                       SEL MB1
0FBF B810                     MOV R0,#16D
0FC1 80                       MOVX A,@R0
0FC2 D310                     XRL A,#16D
0FC4 C6BB                     JZ VNTEN3
0FC6 2310                     MOV A,#16D
0FC8 90                       MOVX @R0,A
0FC9 18                       INC R0
0FCA 80                       MOVX A,@R0
0FCB D456                     CALL NUMCHK
0FCD B86A                     MOV R0,#106D
0FCF 90                       MOVX @R0,A
0FD0 AF                       MOV R7,A
0FD1 B80A                     MOV R0,#10D
0FD3 80                       MOVX A,@R0
0FD4 A8                       MOV R0,A
```

```
0FD5 FF         1=3593                   MOV A,R7
0FD6 47         1=3594                   SWAP A
0FD7 AE         1=3595                   MOV R6,A
0FD8 B909       1=3596                   MOV R1,#9D
0FDA 81         1=3597                   MOVX A,@R1
0FDB 4E         1=3598                   ORL A,R6
0FDC 90         1=3599                   MOVX @R0,A
0FDD E5         1=3600                   SEL MB0
0FDE 5400       1=3601                   CALL DISPLA
0FE0 F5         1=3602                   SEL MB1
0FE1 D44D       1=3603                   CALL WAITER
0FE3 B809       1=3604                   MOV R0,#9D
0FE5 80         1=3605                   MOVX A,@R0
0FE6 D303       1=3606                   XRL A,#3D
0FE8 C6F5       1=3607                   JZ VNTEN4
0FEA 2303       1=3608                   MOV A,#3D
0FEC B809       1=3609                   MOV R0,#9D
0FEE 90         1=3610                   MOVX @R0,A
0FEF 23A0       1=3611                   MOV A,#160D
0FF1 18         1=3612                   INC R0
0FF2 90         1=3613                   MOVX @R0,A
0FF3 E485       1=3614                   JMP VNTEN1
                1=3615           VNTEN4:
0FF5 9400       1=3616                   CALL DBLANK
0FF7 93         1=3617                   RETR
                1=3618
                1=3619
                1=3620  ; ************************************************************
                1=3621
                1=3622
                1=3623 $EJECT
                1=3624
                1=3625
                 =3626 $EJECT
                  3627
                  3628 $EJECT
                  3629
                  3630                   END
```

```
USER SYMBOLS
ADDR   0F00  ADDR1  0F18  ADDR2  0F2F  ADDR3  0F4D  AMPM   01B5  AUTO   02BF  BACK   0210  BLCK   02DB
BUF    0265  CF     0E25  CF1    0E2C  CF2    0E45  CF3    0E43  CIRCLE 026F  COM0   093F  COM1   0907
COM2   0911  COM3   0949  COM4   0945  COM5   095A  COM6   095E  COM7   0926  COM8   092A  COMAND 0900
D00    0C4B  D01    0C4F  D02    0C53  D021   0C5A  D022   0C79  D03    0C7D  D031   0D11  D0310  0D6C
D0311  0D61  D032   0D31  D033   0D33  D034   0D3D  D035   0D46  D036   0D4A  D037   0D5A  D038   0D7B
D039   0D63  D04    0CB0  D041   0D04  D05    0CB3  D051   0DAA  D052   0DAC  D053   0DB9  D06    0C86
D061   0CA1  D07    0CA6  D070   0CD6  D071   0CDC  D072   0CE3  D073   0CEA  D074   0CF1  D075   0CB6
D076   0CCA  DATA1  027B  DATA2  0275  DBLAN1 0C06  DBLANK 0C00  DBMAX  0003  DCTRL  007A  DFILL  0C11
DFILL1 0C16  DHIT   0226  DISPLA 0200  DLOOP  0217  DMASK  0328  DP     0C25  DP1    0C2B  DPLOOP 023B
DSAVE  0208  DSPHLR 0C37  DSPMOD 0C47  DTEST  021D  EDN    044A  ENT    0444  ENUM   0450  EST    044D
FASP   0D7F  FASP1  0D81  FASP2  0D87  FC     0E00  FC1    0E03  FC2    0E1C  FC3    0E18  FLASH  00BD
HIT    0128  HLS    046B  HMS    0465  ICLR   0396  INIT   0370  IWAIT  0377  JCLR   039C  JWAIT  0375
KEY1   0146  KEY2   014B  KEYHLR 0400  KEYPAD 0100  KHLR   040D  KHLR1  0410  KHLR2  0429  LBLK1  0122
MAINLP 0009  MAN    0447  MANN   0474  MANS   0471  MASK   0300  MATC10 0A75  MATC11 0A73  MATC12 0A87
MATC13 0A9B  MATC14 0A9D  MATC15 0AA1  MATCH  0A30  MATCH1 0A3F  MATCH2 0A41  MATCH3 0A4A  MATCH5 0A54
MATCH6 0A90  MATCH7 0A5F  MATCH8 0A61  MATCH9 0A65  MCI    0812  MCI1   0824  MCI2   0835  MCI3   0842
MKINIT 004D  MKR    014C  MKR0   02FD  MLS    046E  MMS    046B  NOBLK  0161  NODP   0245  NORMAL 02A4
NOTAM  0297  NOTPM  02B2  NUMCH1 0E59  NUMCH2 0E65  NUMCHK 0E56  QUO    0441  RSET   043E  RSTPT1 0439
RSTPTR 042D  RX     0B00  RX1    0B12  RX2    0B24  RX3    0B37  RX4    0B4C  RX5    0B56  RX6    0B9A
RX7    0B5F  RX8    0B72  RX9    0B7C  SCAN   0106  SCAN1  010F  SENS1  084C  SENS2  085E  SENS3  0863
SENS4  08B7  SENS5  0870  SENS6  087B  SENS7  0894  SENS8  0890  SENS9  08AE  SENSOR 0845  T12    019A
TDONE  01A9  TDONE1 01CD  TDONE2 01B1  TEMP1  03CA  TEMP2  03D2  TIME   014C  TIMINT 0031  TLS    0459
TMP    0453  TMS    0456  TREG   0019  TSENS  08B8  TSENS1 08D5  TSENS2 08F0  TSENS3 08ED  TSLOT  0800
TSLOT1 0811  TX     09C5  TX0    09F6  TX1    09F8  TX2    09D7  TX3    0A12  TYM    0462  UNLOCK 0003
UNSAV  02D4  USR1   0990  USR2   099E  USR3   09A7  USR4   09B9  USR5   09C2  USRMCI 0979  VMS    045F
VNT    045C  VNTEN1 0F85  VNTEN2 0F9B  VNTEN3 0FBB  VNTEN4 0FF5  VNTEND 0F7B  WAIT0  0E4F  WAIT1  0E51
WAITER 0E4D  WIFE   02EB  XD03   0D00  XD04   0D8B  XD05   0D9F  XEDN   0643  XEDN1  0656  XEDN2  0658
XEDN3  0673  XEDN4  0683  XEDN5  0685  XEDN6  069B  XENT   0515  XENT0  052B  XENT1  0522  XENT2  053B
XENT3  0559  XENT4  056E  XENT5  0582  XENUM  06D6  XENUM1 06DF  XEST   069D  XEST1  06A3  XEST2  06AE
XEST3  06C2  XEST4  06C4  XEST5  06C9  XEST6  06CB  XHLS   05BC  XHLS1  05C2  XHLS2  05CD  XHMS   05A0
XHMS1  05A6  XHMS2  05B1  XMAN   04A0  XMAN1  04BC  XMAN2  04D8  XMANN  0500  XMANN1 0513  XMANS  04DA
XMANS1 04E0  XMANS2 04EB  XMANS3 04B0  XMLS   0600  XMLS1  0613  XMLS2  0622  XMLS3  0636  XMLS4  0641
XMMS   05D8  XMMS1  05DE  XMMS2  05E9  XQUO   0477  XQUO1  048A  XQUO2  049E  XRSET  00CB  XRSET1 00D4
XTLS   0776  XTLS0  07A7  XTLS1  077F  XTLS2  07B9  XTLS3  07BD  XTLS4  07CD  XTLS5  07D1  XTLS6  07DC
XTLS7  07E0  XTMP   0700  XTMP1  0706  XTMP2  0711  XTMP3  0722  XTMP4  0726  XTMS   072D  XTMS1  0733
XTMS2  073E  XTMS3  075D  XTYM   0584  XTYM1  058A  XTYM2  0595  XVMS   007E  XVMS1  0084  XVMS2  008F
XVMS3  00AC  XVMS4  00B0  XVNT   0060  XVNT1  0066  XVNT2  0071

ASSEMBLY COMPLETE,   NO ERRORS
```

What is claimed is:

1. A controller based system for operating over an AC voltage power transmission line comprising:

a plurality of communication interface units coupling to the AC voltage power transmission line and providing bidirectional data communication over the power line;

a central processing unit coupling to and bidirectionally communicating with one of said communication interface units;

at least one peripheral control element located remotely with respect to the central processing unit, each of said peripheral control elements coupling to and bidirectionally communicating with one of said communication interface units;

wherein bidirectional communication is achieved between the central processing unit and said at least one peripheral control element at assigned time slots via the communication interface units over the power transmission line; and wherein said central processing unit can selectively interrogate said at least one peripheral control element and receive a reply, and can selectively command said at least one peripheral control element to take an appropriate action.

2. The system as in claim 1 wherein said central processing unit further includes:

means for controlling the configuration of the peripheral control elements by defining the relationship of each of the peripheral control element to the central processing unit.

3. The system as in claim 1 wherein said central processing unit is further comprised of:

means for sequencing task functions in accordance with programmed instructions stored in a memory within the central processing unit which is responsive to received communications from the peripheral control elements.

4. The system as in claim 1 wherein said central processing unit is further comprised of:

communication linkage means for providing for communications interface system protocol compliance.

5. The system as in claim 1 wherein one of said communication interface units is further comprised of:

means for selectively transmitting and receiving data in digital format between said one communications interface unit and the central processing unit.

6. The system as in claim 1 wherein each of said communication interface units are comprised of:

means for outputting a digital signal to a coupled first device responsive to a frequency-shift-keyed signal received over the power transmission line from another communication interface unit; and means for outputting a frequency-shift-keyed signal onto said power transmission line responsive to a digital signal received from a coupled second device;

wherein said first device is one of said at least one peripheral control element and said central processing unit and said second device is the other of said at least one peripheral control element and said central processing unit.

7. The system as in claim 1 further comprising:

input means for coupling user input data to the central processing unit;

output means for providing a visual display of data output from the central processing unit; and storage means for nonvolatile storage of data output from the central processing unit.

8. The system as in claim 7 wherein:

said input means is comprised of a multikey keyboard; and said output means is comprised of a video display.

9. The system as in claim 1 wherein said peripheral control element is selected from the class of peripheral control elements consisting of a photocell sensor system, a vent motor control system, a wind sensor system, a rain sensor system, an indoor temperature aspirator, an outdoor temperature sensor, a humidistat system, a vent control system, a single speed exhaust fan system, a multiple speed exhaust fan system, a steam heater controller system, and a multifunction low control voltage system.

10. The system as in claim 1 wherein said peripheral control element is a single speed exhaust fan controller.

11. The system as in claim 10 wherein said single speed exhaust fan controller is comprised of:

a second central processing unit communicating with said communication interface unit;

memory for storing instructions and operational data for use by said second central processing unit; and optically isolated power switching and coupling means for coupling power control signals from said central processing unit to an external fan motor.

12. The system as in claim 1 wherein said peripheral control means is a dual function low voltage controller means.

13. The system as in claim 12 wherein said low voltage controller is comprised of:

a second central processing unit with memory for storing instruction and operational data, said second central processing unit providing first and second control signals and communicating with said communication interface units; and first and second independently functioning optically isolated power relay means for selectively providing power to first and said second independent relay means in response to said first and second control signals, respectively.

14. An environmental control system comprising:

a plurality of communication interface means for providing bidirectional data communication over an alternating current power transmission line, each communication interface means being coupled to the power transmission line;

a central processing unit coupled to a first communication interface means, said central processing unit performing data manipulation and processing responsive to stored instructions and received communications from said coupled communication interface means;

means for changing an environmental temperature and humidity condition in a space; and peripheral control means for controlling said means for changing an environmental condition coupled to a second communication interface means, said peripheral control means being located remotely with respect to said central processing unit and being controlled by and communicating with said central processing unit via the communication interface means over the power transmission line at periodic time slots assigned to said peripheral control means by said central processing unit.

15. The system as in claim 14 further comprising:

a plurality of peripheral control means, each coupled to an independent communications interface means.

16. The system as in claim 15 further comprising:
address selection means associated with each peripheral control means for selectively enabling a respective peripheral control means to be responsive to the communications received from the central processing unit, said address selection means decoding a predefined address associated with the respective peripheral control means as received from the communications interface means.

17. A system for controlling an environment such as in a greenhouse and for operating over an AC power transmission line, said system comprising:
a plurality of communications means, each of selectively providing communications between other individual communications means over the AC power transmission line;
a central control processor, coupled to one of said communications means, for performing data processing and manipulation responsive to stored data and received communications and for generating environmental commands responsive to stored data and received communications;
peripheral control means, coupled to a second communications means and located remotely with respect to said central control processor, for selectively controlling remotely located peripheral equipment in response to said environmental commands;
said one communications means and said second communications means communicating with one another at periodic time slots assigned to said peripheral control means by the central control processor; and
peripheral equipment, coupled to the peripheral control means, for selectively performing an environmental control function in response to the peripheral control means.

18. The system as in claim 17 wherein at least one of said peripheral control means is a photocell sensor system.

19. The system as in claim 17 wherein at least one of said peripheral control means is comprised of a fan controller system.

20. The system as in claim 17 wherein at least one of said peripheral control means is comprised of a boiler control system.

21. The system as in claim 17 wherein at least one of said peripheral control means is comprised of a pump control system.

22. The system as in claim 17 wherein at least one of said peripheral control elements is a FACT impeller control system.

23. The system as in claim 17 further comprising:
address selection means coupled to said communication means and said peripheral control means, for selectively enabling said peripheral control means to be responsive to the received communications from the communication means responsive to decoding a predefined address signal as received from the communications means.

24. The system as in claim 17 further comprising:
vent control means, coupled to a respective communications means, for selectively controlling the amount which a vent is opened responsive to received communications.

25. The system as in claim 24 wherein said vent control means and said temperature control means adjust the vent opening and ambient temperature within the greenhouse, respectively, responsive to said central control processor.

26. The system as in claim 25 further comprising:
indoor temperature sensing means, coupled to a respective communication means, for sensing the temperature inside the greenhouse and for selectively transmitting a signal representative of the sensed temperature to the central control processor via the communications means responsive to communications received from the central control processor via the communication means.

27. The system as in claim 26 wherein said temperature sensor is further characterized as a temperature sensor and aspirator.

28. The system as in claim 26 further comprising:
outdoor temperature sensing means, coupled to a respective communications means, for sensing the temperature outside the greenhouse and for selectively transmitting a signal representative of the sensed outdoor temperature to the central control processor via the communications means responsive to communications received from the central control processor via the communications means.

29. The system as in claim 28 further comprising:
air circulation means, coupled to a respective communications means, for selectively circulating air within the greenhouse responsive to communications received from the central control processor via the communications.

30. The system as in claim 28 further comprising:
heater means, coupled to a respective communications means, for increasing the ambient temperature within the greenhouse responsive to received communications from the central control processor via the communications means.

31. The system as in claim 30 wherein said central control processor outputs communications via the communications means for controlling air circulation, heater temperature level and activation status, and vent opening and closing responsive to received communications inputs via said communications means from the indoor and outdoor temperature sensors.

32. The system as in claim 31 further comprising:
a rain sensor, coupled to a respective communications means, for sensing the presence of rain outside the greenhouse and for selectively transmitting a signal representative of the sensed condition to the central control processor via the communications means responsive to communications received from the central control processor via the communication means.

33. The system as in claim 32 further comprising:
a wind sensor, coupled to a respective communications means, for sensing the presence of wind outside the greenhouse, and for selectively transmitting a signal representative of the sensed condition to the central control processor via the communications means responsive to communications received from the central control processor via the communications means.

34. The system as in claim 33 further comprising:
a humidistat sensor, coupled to a respective communications means, for sensing the humidity inside the greenhouse, and for selectively transmitting a signal representative of the sensed condition to the central control processor via the communications means responsive to communications received from the central control processor via the communications means.

35. The system as in claim 34 wherein said central control processor outputs communication signals via the communications means to control the vent opening, the heater, and the air circulation, responsive to received communication signals from said wind sensor, said rain sensor, said indoor and outdoor temperature sensors, and said humidistat sensor.

36. The system as in claim 17 further comprising:

a keyboard for coupling input signals to said central processing means responsive to user activation of the keyboard;

display means for providing a visible display of data responsive to display interface output signals from said central control processor;

memory means for selectively providing predefined stored data outputs to said central control processor responsive to selected address signal outputs from central control processor;

read-write memory means for selectively storing and outputting data signals from and to said central control processor responsive to certain address signal outputs of said central control processor; and wherein said central control processor performs configuration control and task sequencing responsive to received data from said nonvolatile memory and said read-write memory.

37. The system as in claim 36 further comprising:

transmission and receiving means for bidirectionally communicating data between said central control processor and said communications interface means.

38. The system as in claim 36 further characterized in that said display means is comprised of a plurality of seven segment display digits.

39. A control system adapted to communicate over an AC power line between a plurality of remote peripheral elements and a central processing unit, said control system comprising:

the peripheral elements including at least one sensor element for sensing and storing the value of an actual physical parameter; each sensor element communicating with a communication interface unit coupled to the power line;

the peripheral elements further including at least one actuator element for controlling the position of an actuator device affecting a controlled parameter, each actuator element communicating with a communication interface unit coupled to the power line;

said communication interface units providing bidirectional communication over the power line between the central processing unit and said at least one sensing element, and providing bidirectional communication over the power line between the central processing unit and said at least one actuator element, said bidirectional communication occurring at periodic time slots assigned to each peripheral element by inputs to the central processing unit; and the central processing unit further adapted to perform a control sequence including an interrogation of the peripheral elements by the processing unit wherein, in response to said interrogation during its time slot, said at least one sensor element replys with an answer indicative of the actual value of the physical parameter it is sensing; wherein, in response to receiving the value of the physical parameter, the central processing unit calculates a desired position of the actuator element which is based at least in part on the physical parameter; and wherein, in response to said interrogation during its time slot, said at least one actuator element replys with an acknowledgement and receives in turn said desired position to control the position of the actuator device;

whereby the central processing unit controls said at least one actuator element and thereby said controlled parameter based upon, at least in part, input from said at least one sensing element.

* * * * *